(12) United States Patent
Xu

(10) Patent No.: US 12,381,887 B2
(45) Date of Patent: Aug. 5, 2025

(54) UNIFIED ACCESS METHOD APPLYING DIGITAL HUMAN BEING CODECHAIN

(71) Applicant: Wei Xu, Shanghai (CN)

(72) Inventor: Wei Xu, Shanghai (CN)

( * ) Notice: Subject to any disclaimer, the term of this patent is extended or adjusted under 35 U.S.C. 154(b) by 493 days.

(21) Appl. No.: 17/763,937

(22) PCT Filed: Sep. 11, 2020

(86) PCT No.: PCT/CN2020/114704
§ 371 (c)(1),
(2) Date: Mar. 25, 2022

(87) PCT Pub. No.: WO2021/057506
PCT Pub. Date: Apr. 1, 2021

(65) Prior Publication Data
US 2022/0321578 A1 Oct. 6, 2022

(30) Foreign Application Priority Data

Sep. 27, 2019 (CN) .......................... 201910927163.7

(51) Int. Cl.
*H04L 9/40* (2022.01)
(52) U.S. Cl.
CPC .................................. *H04L 63/126* (2013.01)
(58) Field of Classification Search
CPC .. G06N 3/08; G06N 10/0637; G06F 16/2315; G06F 9/466; G06F 16/9566;
(Continued)

(56) References Cited

U.S. PATENT DOCUMENTS 10,360,561 B2 * 7/2019 Poon ................... G06Q 20/3229
10,904,234 B2 * 1/2021 Ross ................... H04L 63/0442
(Continued)

FOREIGN PATENT DOCUMENTS

CN 103763178 A 4/2014
CN 103839172 A 6/2014
(Continued)

OTHER PUBLICATIONS

Liu Jia et al. Goods recommendation method and system. CN 103839172A(translation); pp. 1-18; Jun. 4, 2014.*
(Continued)

*Primary Examiner* — Hosuk Song
(74) *Attorney, Agent, or Firm* — Amster, Rothstein & Ebenstein LLP

(57) ABSTRACT

Disclosed is a unified access method applying a digital human being CodeChain, including: obtaining information corresponding to a first principal, and obtaining information corresponding to at least one further principal via a heterogeneous access route; identifying the Globe grid coding medium to obtain the information corresponding to the first principal: digital human being identification information of a partner corresponding to the industrial code server; a matter corresponding to the industrial code server and an Globe grid corresponding to the matter, wherein the Globe grid representing a right to share an income from the matter; and information representing association between the partner and the Globe grid and/or the digital human being identification information of the partner with the Globe grid. Through CodeChain access and forward, the present disclosure seamlessly links the offline real world to the online virtual world, thereby realizing omni-channel management and digitalized distribution of the circulation and dissemination value system. The Globe grid coding medium may further act as an embodiment of digitalized assets, wherein SGR serves as a unit of measurement for equivalent barter, which is circulated and exchanged in a system where respective industrial code servers are interconnected.

38 Claims, 16 Drawing Sheets

(58) Field of Classification Search
CPC .............. G06F 16/955; G06F 16/9554; G06F 16/9574; G06F 21/604; G06F 2221/2141; G06Q 2220/00; G06Q 20/4016; G06Q 20/36; H04L 63/08; H04L 63/101; H04L 63/102; H04L 63/126; H04L 63/10; H04L 67/52; H04L 67/53

See application file for complete search history.

(56) References Cited

U.S. PATENT DOCUMENTS

| | | | | |
|---|---|---|---|---|
| 11,403,623 | B2 * | 8/2022 | Makhotin | G06Q 20/36 |
| 11,588,812 | B2 * | 2/2023 | Cage | G06Q 20/3821 |
| 11,726,965 | B2 * | 8/2023 | Saunders | H04L 9/0637 |
| | | | | 707/826 |
| 11,765,152 | B2 * | 9/2023 | Obando Chacon | H04L 63/0815 |
| | | | | 726/4 |

FOREIGN PATENT DOCUMENTS

| | | |
|---|---|---|
| CN | 105354747 A | 2/2016 |
| CN | 108022154 A | 5/2018 |
| CN | 108120446 A | 6/2018 |
| CN | 108429927 A | 8/2018 |
| CN | 109754256 A | 5/2019 |

OTHER PUBLICATIONS

PCT International Search Report and Written Opinion dated Dec. 16, 2020 from PCT International Application No. PCT/CN2020/114704, with English language translation of International Search Report.

"Chain Code Technology, Chain Code: What's New?," Apr. 9, 2019, accessed from the internet on Dec. 18, 2020 at https://zhuanlan.zhihu.com/p/61836841, 10 pages.

* cited by examiner

UNIFIED ACCESS METHOD APPLYING DIGITAL HUMAN BEING CODECHAIN

CROSS-REFERENCE TO RELATED APPLICATIONS

This application is a U.S. national stage entry under 35 U.S.C. § 371 of PCT International Patent Application No. PCT/CN2020/114704, filed Sep. 11, 2020, which claims priority to Chinese Patent Application No. 201910927163.7, filed Sep. 27, 2019, the contents of each of which are hereby incorporated by reference in their entirety.

FIELD

Embodiments of the present disclosure relate to a unified access method applying digital human being CodeChain.

BACKGROUND

Prevalence of portable smart devices such as smart phones facilitates interpersonal communication, which brings more convenience to people's lives and also triggers Internet revolution. With the advent of various new dissemination manners of information, innovative business models also emerge. However, limited by conventional Internet-based theories, current business models are still implemented through webpage (or APP)-based interaction between humans and servers of operators. Their drawbacks lie in artificially dividing human activities into online activities and offline activities due to insufficient study on characteristics, methods, and models of human-thing interactions in daily life, a consequence of which is that data and models of online activities are isolated from those of offline activities, although they have same business significance.

The act of information dissemination has its own value. With advertisement as an example, the essence of advertisement is the value conversion of information publishing resource. Highly charged advertisement is surely published via a resource that can communicate information to more people under same conditions. That is, the larger number of recipients the advertisement reaches, the higher it is charged. However, conventional advertising means only "spread" information, totally losing control of the subsequent communication process.

For a commodity, each dissemination act in the process from disseminating the advertisement information to yielding a deal makes a contribution to the final deal. With missing of any dissemination node, the information would not reach a potential client, and a deal would not be yielded. This is why information dissemination has its value, while a person conducting the dissemination is entitled to a reward as a return for his act. However, the value of dissemination is always ignored. Owing to lack of efficient, universally adaptable technical means to track effective dissemination acts conducted by disseminators in the whole dissemination process, it is difficult to quantize their values in the dissemination chain.

In a direct-selling system, each level has a clear upstream-downstream relationship, such that it is convenient to assign commissions level by level after a deal is yielded. However, the direct-selling system fails to fully reflect the value of communication, because one must first become a member of the direct-selling system before joining the dissemination network; in this case, it becomes an occupation for a dissemination recipient to get incomes directly from creating orders. Due to pursuit of instant benefits and the impossibility for an individual to sell all goods, this direct-selling business model is objectively limited in dissemination manners and scopes of information (e.g., commodity information). In addition, dissemination acts and commission distributions under this direct-selling system cannot be verified and implemented via technical means.

The information, disseminated from the source publisher to the final recipient who takes an act, surely goes through a chain including different interpersonal circles, while each intermediate node is located at an intersection between two or more interpersonal circles. A social interpersonal network refers to a complex of multi-layered interpersonal circles formed around an individual due to social relationships of different affinity degrees such as kinship, education degree, occupation, interests and hobbies, i.e., one individual is involved in different social communications. Besides point-to-point manners such as personal meeting, phone call, and SMS, current information interaction and circulation among human social intercourses relies more on Internet-based social network platforms.

Although enough information may be found through search engines over the Internet, the findings are not necessarily the desired information. Furthermore, for a common consumer who has no interest in keep himself/herself updated with latest development of the Internet or e-Commerce, he/she would have no enough knowledge of keywords to implement further search. Therefore, this manner has a great limitation in information access.

Information dissemination over a social network has the following characteristics: on one hand, an information publisher or an information disseminator has a certain prediction on whether the recipient would receive the information or further spread it based his or her understanding with respect to an information recipient in a corresponding community, which means that the disseminator performs an active filtering behavior to a certain extent, rendering the information dissemination in the interpersonal circle to be strongly target-driven. On the other hand, in a stable interpersonal circle, each person will be cautious about his/her words and behaviors, so as not to damage the established interpersonal relationship. This means social behaviors including information dissemination are all guaranteed by personal digital evaluation and social credit. Therefore, a disseminator will consciously or unconsciously verify the information disseminated over the social network, particularly in a circle of familiar people, so as to assure trueness of the information as much as possible. Excluding serial fraud, this dissemination has a high trueness and reliability. However, such filtering operations rely on personal judgment and implementation, and there still lacks effective technical means to perform rights control with respect to the conditions of information senders and recipients; moreover, even the rights are set, it is still hard to match and verify the actual conditions of the information senders and recipients with the set rights, such that the conventional information dissemination means are not target driven with poor effect.

Additionally, information interaction of conventional social networks is Internet-based. However, the Internet has inherent defects: the users are not of a real name nature, who are represented by IP addresses. The IP addresses, however, are "identities" that may vary at any time, such that a person may appear as different roles on the Internet. Even a non-human (some animals, intelligent robots, etc.) carries out an operation over the Internet through a corresponding terminal, such non-humans cannot be identified. The non-real name characteristic of the Internet is the largest barrier for business operations. Therefore, various business applications unanimously add ID card number, home address, mobile phone number, fixed phone number, real name and the like to urge subscribers to fill in more detailed information. However, this not only affects user conversion rate, but also incurs a chain reaction in aspect of information security such as personal privacy leakage.

Moreover, an individual cannot verify when a piece of information over the Internet is true or not; therefore, the user will consciously or unconsciously hold a suspicious attitude towards the information on the Internet. In an Internet-based business model, a merchant has already spent massively on maintaining customer stickiness; however, once a commodity or service quality issue arises, regardless of whether such issue is real or false, it still causes customer loss and repeated marketing input, which is why the e-Commerce model/Internet thinking model blindly believes in investing heavily to buy traffic.

The virtual economy ushered by the Internet era is substantively a new means developed by mapping the real economy to a virtual space (but unable to one-to-one map) and leveraging the convenience provided by computer terminals and the Internet so as to respond to and dig out various consumption demands. However, the various kinds of Internet-based business models can hardly combine the network virtual world with the real world closely. When a person sits before a computer to start using the Internet with a mouse, dimensional shift occurs, i.e., the person is shifted from the real physical world to the virtual Internet. This virtual experience ends when the person puts away the mouse to leave the computer, and then the person returns to the real world. Such shift always occurs when people conduct activities in daily life with the Internet. Due to the drawbacks mentioned above, development of the Internet-based economy is restricted, and the Internet technologies can hardly be extended to conventional industries.

However, the social nature of human beings decides that their normal life exists in the offline real economic circle, generally within a sensing range not exceeding a certain distance centered about an individual. Therefore, there is an urgent need for a solution capable of providing field/real object experience in the offline (e.g., a certain shop or scenic spot) or game scene while capable of finding a corresponding resource (e.g., commodity information) in the virtual world, so as to associate an activity in the real world with the virtual world anytime and anywhere. However, currently there still lacks effective technical means to address this issue.

Meanwhile, the value of Internet-based economy (e.g., a social website) is jointly contributed by mass consumers; however, such consumers do not share the value of the website company. This problem needs to be solved.

The manner of accessing a virtual world in the Internet may be entering a link (URL: unified Resource Location) in a browser. The mobile Internet offers a simpler and more straightforward pattern: two-dimensional barcode. The two-dimensional code is a specific geometric pattern formed by black-and-white images distributed according to a preset rule in two-dimensional directions to record data and symbol information. Mobile phone two-dimensional codes are applications of two-dimensional code technologies on mobile terminals, which enable users to quickly access the Internet in any networked real world.

Chinese patent application No. 200510033918.7, filed on Mar. 31, 2005, entitled "MOBILE TERMINAL SHOPPING METHOD AND SYSTEM THEREOF," discloses a method and a system for implementing mobile terminal shopping with two-dimensional codes, wherein a mobile terminal captures a two-dimensional code through a built-in camera and decodes it; then the mobile terminal sends a payment request message to a payment subsystem, and the payment subsystem completes the payment.

Chinese patent No. ZL200480005625.1, filed on Mar. 8, 2004, entitled "METHOD FOR PROVIDING MOBILE SERVICES USING CODING IMAGE," discloses a method and a system for providing mobile services using a coding image, and specifically discloses a method and a system using a two-dimensional code to provide a content provision service, a geographical information provision service, a product information provision service, a taxi call service, a personal contact information provision service or a payment service, wherein a mobile terminal captures a two-dimensional code with a built-in camera and decodes it; then, the mobile terminal sends a service provision request message to a server of a service provider, such that the server of the service provider provides by itself a service to the mobile terminal, or the server of the service provider communicates with a further server, such that a service is provided to the mobile terminal.

However, a smart phone, as a main means for on-site sensing in the mobile Internet, cannot overcome the inherent drawbacks of the Internet. A further problem for current smart phones is that the process for a mobile phone to sense a two-dimensional code is too complex, for example, there at least needs 6 or 7 times of clicking operations from unlocking the mobile phone screen to open an APP's two-dimensional code canning function. Secondly, a typical consumer cannot identify a correspondence relationship between the two-dimensional code spotted and a mobile phone application; therefore, scanning is always performed via some common code scanners, such that the obtained two-dimensional parsing results are all webpage links; upon clicking such a link, it is the mobile phone browser that is first opened, instead of the mobile APP that may execute a corresponding function. All of such problems significantly affect use experience. Moreover, wearable devices such as Google glasses and smart watches are actually still transformed smart phone, just being more portable, which also easily cause a great threat to the privacy of other people.

Currently, it is hard for conventional technologies to effectively associate or verify a user's identity with an operation executed by a device such as a smart mobile phone or with the real environment where the user is located, which is adverse to, for example, track an information dissemination act of the user, and adverse for other relatives or friends in the interpersonal circle to identify the user's identity; besides, conventional technologies also lack effective manners for an external regulation authority to monitor and supervise information interactions between the user and other users or an application server, as well as the operations executed by the user.

The conventional Internet is unexceptionally implemented based on IP links; while population of mobile terminals enables everyone to have a portable smart device, such that where there is a need, the portable smart device can access information as per the instruction (will, social status or social attitude) of the person and transmit such information to a business system.

A negative aspect of the conventional Internet-based economy lies in that the service provider easily establishes an Internet monopolistic barrier in providing an Internet portal, payment services, commenting and rating services, classification services, social networking services, and e-commerce platforms. Namely, although the Internet is technical flat, in practical applications, due to information explosion in the Internet era, a user has to rely more on various universal services on the Internet to find a desired service. As such, the user not only loses its ownership of personal data, but also has to passively accept the inequalities in quality and price imposed by various monopolistic Internet commercial services. Particularly, individual users create values to the Internet service company, but the increments of the values are taken by the service company, rather than the individuals who create the values.

For a traditional company, its dealers are likely unable to enjoy the earnings of the whole platform.

For an Internet company (e.g., Facebook), a majority of its value is contributed by all subscribers through browsing, disseminating, and participating, who also open their privacies to the public. Theoretically, they should be awarded considerations. However, except the privilege of using the Internet functions, they are not entitled to share the value of the whole platform (e.g., hundreds of billions of stock values).

In recent years, with development of the mobile Internet, people start accessing the Internet using various things around them. Code scanning brings the user an experience of "what you see is what you get", which gradually breaks the information monopolistic barrier established by Internet service providers and a new Internet economic model featured by sharing emerges. Due to its flexibility, the share economy has been developed rampantly since the emergence of its concept, and is quickly populated to the mass. However, since the share economy still uses the Internet technical infrastructure, various problems constantly arise.

For example, two-dimensional code viruses, forged two-dimensional codes, information tampering, personal information theft, paid information posters, all of which cause problems such as illegal P2P finance, illegal virtual currencies, illegal pyramid marketing, illegal information sharing. Particularly, those problems concerning the fundamental economic activities in the life and work of common people bring new challenges to the stability and solidarity of the country and to the harmonic life of people.

With promotion and popularity of two-dimensional codes, they are increasingly applied in an array of fields such as code-scanning payment and bike sharing, which has changed the access manner to a certain extent and becomes an infrastructure for building a new business model with IoT. However, use of two-dimensional codes is mostly based on applications on smart phones, and a user has to find a corresponding App based on the nature of the target object and then initiate the camera to scan and recognize the two-dimensional code. The whole process needs extensive human involvement, still inconvenient for use.

Besides, a two-dimensional code is limited in data storage capacity, while the specifications and patterns for creating various two-dimensional codes cause manufacturing of code readers and backend servers even more complex. For another example, a business process such as WeChat payment which is implemented solely dependent on the "two-dimensional code ONE SCAN" technology has a serious defect: the two-dimensional code may be distributed randomly and generally includes a link that is directed to a second server which actually provides a service. However, a user cannot identify whether the second server is reliable when scanning the code via an APP such as WeChat. Under this mode, two-dimensional code phishing and fraud easily occur by hacking means such as data theft and tampering with a forged server.

A conventional code-scanning access can only be implemented by scanning a two-dimensional code generated by a "two-dimensional code server" to access a corresponding backend server of a mall, i.e., the two-dimensional codes generated by the same "two-dimensional code server" only provide access to its own mall, such that the utilization of front-end posted codes is not high; besides, only access to one specific mall after value chain dissemination cannot maximize the commercial value.

Promotion and popularity of two-dimensional codes, particularly the popularity of mini programs, enables offline promotion of two-dimensional code scanning, and the accessed application scenarios become more and more abundant, which is different from online centralized access in traditional Internet businesses; instead, these application scenarios are ubiquitous anytime and anywhere. The advantage of mini program two-dimensional code scanning access lies in that a consumer can directly access a merchant service under various scenarios without a need of registering and downloading steps, and he or she can exit the mini program after use.

However, different mini programs are currently hosted in different servers based on different manufacturers, such that a real consumption of a same consumer is completed in different transaction servers, which brings troubles of switching between different servers to the consumer (for example, the rewards point and coupons cannot be commonly used, and the delivery address have to be entered repeatedly); besides, the consumer's diffusion of different merchant 2D codes, which constitutes a contribution to advertisement dissemination and finally leads to a purchase transaction, does not receive a due comment and reward.

Currently, all of the Internet/IoT-based technologies use IP addresses as underlying connections, and all supporting network access devices are managed based on IP addresses. Such networking enables that IPs become nodes of the network. In other words, it is the machines (including networked computers, mobile phones, self-piloting automobiles, flights, refrigerators, air-conditioners, etc., even a part human part machine with a chip implanted into the brain) that are existent in the network space at any time and any location (or at multiple locations); or, the machines are not existent anywhere. However, because the machines are non-human and detached from the human society, many chaos arise (hackers, paid posters, anonymities, etc.); meanwhile, a unidirectional "point-to-point link" cannot faithfully reflects the human society characteristics of a community formed based on social networking.

In fact, during an information dissemination process, human intervention may impart more meanings to the information. However, conventional technologies described above can hardly embody the "value" of "human society." With chained dissemination (characterized by human-centered dissemination based on personal relationship network), an information recipient may not only receive the original information, but also may obtain attribute information assigned by a disseminator; besides, the recipient may make a more reasonable decision and action based on more associated information obtained from the dissemination chain. Furthermore, such attribute information not only enables the recipient to obtain the dissemination route of the information but also enables him to make a judgment on the authenticity, quality, and reasonableness of information content.

However, the attribute information is superimposed by the disseminator over the original information, which has the following characteristics: 1) subjectivity: the value assigned to the attribute bears the disseminator's strong subjectivity, which varies with time, conditions of the disseminator, and other objective elements. 2) forgeability: the credibility of the information can be changed very easily to pursue personal interests. 3) low dissemination efficiency: due to limitation of access range, the chained dissemination is slower and more inefficient than publish/forward over the Internet, such that it has a low utilization. 4) cost issue: to main reliability of the information on the dissemination chain, a very high verification cost is incurred, which would cause linear increase of the cost of accessing the information, thereby affecting the scope and frequency of use of the information.

Typical problems include blockchain technology and Bitcoin. As a typical transaction ledger information which requires a very high reliability to circulate over the Internet, the blockchain technology uses a cryptography algorithm and a voting model to verify authentication of the transaction information, and builds, over the Internet, a full set of distributed chained database containing all transaction histories; however, with elapse of time, the difficulty of cryptography algorithm and the search difficulty of the chained database increase exponentially. Apparently, such mode can only be maintained by continuous appreciation of Bitcoin, which apparently goes against the objective law.

The revolutionary significant of the blockchain lies in its solution of information network decentralization, such that credible information with network consensus can be transmitted based on the consensus; however, its problems are also very prominent: 1) high cost: enormous computational power is wasted on meaningless cryptographic algorithms, which significantly increases social costs; 2) anonymity: users, service suppliers, and miners are all anonymous, such that it is inevitable for anonymous users applying the blockchain to illegal activities, and it is also impossible to block dissemination of illegal and forged information from an information initiator over the network. The second problem is prominently reflected by extensively applying the blockchain-based Bitcoin to illegal money laundering and cybercrime. Valuation and endorsement of bitcoins requires verification by robot groups (i.e., IP address-based "community"), which is detached from basic attributes of the human society, such that the above problems cannot be solved thereby.

SUMMARY OF THE INVENTION

Embodiments of the present disclosure provides a unified access method applying digital human being CodeChain, which realizes a unified mall mode featuring multi-center heterogeneous access and provides a management featuring omni-channel and Globe grid code.

The present disclosure provides an access method, comprising: obtaining information corresponding to a first principal and heterogeneous access information, wherein the heterogeneous access information corresponds to a heterogeneous access route; and obtaining information corresponding to at least one further principal via the heterogeneous access route.

In any optional example of the access method, the information corresponding to the first principal refers to first information corresponding to a matter related to a first industrial code server; and the information corresponding to the at least one further principal refers to information corresponding to a matter related to at least one further industrial code server.

In any optional example of the access method, accessing a first page corresponding to the first principal to obtain the first information and the heterogeneous access information; and accessing a second page corresponding to a second principal via the heterogeneous access route corresponding to the heterogeneous access information to obtain second information corresponding a matter related to a second industrial code server;

wherein the first industrial code server corresponding to the first principal and the second industrial server corresponding to the second principal refer to different industrial code servers.

In any optional example of the access method, obtaining the second information and the heterogeneous access information from the accessed second page, and accessing a third page corresponding to a third principal via the heterogeneous access route corresponding to the heterogeneous access information to obtain third information corresponding a matter related to a third industrial code server or obtain the third information and the heterogeneous access information.

In any optional example of the access method, the third principal refers to a principal other than the second principal; the third industrial code server corresponding to the third principal refers to an industrial code server different from the second industrial code server;

or, the third principal refers to a principal other than the first principal and the second principal; and the third industrial code server corresponding to the third principal refers to an industrial code server different from the first industrial code server and the second industrial code server.

In any optional example of the access method, from the page corresponding to any principal, accessing a page corresponding to at least one further principal other than the current principal via the heterogeneous access route corresponding to the heterogeneous access information, or accessing a unified page; wherein the unified page includes access routes corresponding to a plurality of further principals other than the current principal so as to obtain information corresponding to the plurality of further principals, respectively.

In any optional example of the access method, the unified page is managed by a unified management server of a core system; and the unified management server of the core system is in communicative connection with the industrial code servers corresponding to respective principals.

In any optional example of the access method, by interacting with any of the industrial code servers, accessing the page of the principal corresponding to the industrial code server, and/or obtaining the information corresponding to the principal;

or, based on the information corresponding to any principal as obtained, interacting with the industrial code server corresponding to the principal, and/or accessing the page corresponding to the principal;

or, by accessing the page corresponding to any principal, obtaining the information corresponding to the principal, and/or interacting with the industrial code server corresponding to the principal.

In any optional example of the access method, each industrial code server has one or more related matters; the matter has a corresponding Globe grid, and the Globe grid represents a right to share an income from the matter.

In any optional example of the access method, each industrial code server has one or more related matters, wherein each matter is associated with one or at least one partner; and the partner has an identity for identifying itself.

In any optional example of the access method, each matter has an associated partner, wherein information of the principal corresponding to the matter is under management of the partner; or, each matter has a plurality of associated partners, where information of the principals corresponding to the matter is managed by one of the partners.

In any optional example of the access method, the page of each principal corresponds to one or more of its coding mediums.

and any one or more of the following is implemented by recognizing the coding medium:
  accessing the page of the principal corresponding to the identified coding medium;
  or, obtaining the information of the corresponding principal and/or obtaining the information of the corresponding principal and the heterogeneous access information;
  or, interacting with the industrial code server corresponding to the corresponding principal.

In any optional example of the access method, the coding medium refers to an Globe grid coding medium;
  and by successfully recognizing any one of the Globe grid coding mediums, the following information corresponding to the Globe grid coding medium is obtained:
  digital human being identification information of the partner corresponding to the industrial code server;
  matter corresponding to the industrial code server; and;
  information representative of association between the partner and the Globe grid and/or between the digital human being identification information of the partner and the Globe grid.

In any optional example of the access method, disseminating the Globe grid coding medium online and/or offline;
  wherein one or more of the following information is further obtained by successfully recognizing the Globe grid coding medium:
  promotion content, which is related to the corresponding matter of the industrial code server or related to a theme specified by the matter;
  time information corresponding to the partner;
  location information corresponding to the partner;
  digital human being identification information corresponding to the disseminator;
  time information corresponding to the disseminator; and
  location information corresponding to the disseminator.

In any optional example of the access method, obtaining access information needed to access a corresponding Code-Chain network by successfully recognizing the Globe grid coding medium, wherein the CodeChain network is associated with the industrial code server or the corresponding matter of the industrial code server;
  wherein when accessing the CodeChain network based on the access information, the industrial code server may at least obtain the digital human being identification information of the partner corresponding to the Globe grid coding medium to manage the matter, Globe grid, profit sharing, and partner-related data information.

In any optional example of the access method, when accessing the CodeChain network based on the access information, the industrial code server further obtains any combination of one or more of the following information:
  time information corresponding to the partner;
  location information corresponding to the partner;
  time information corresponding to an accessing party;
  location information corresponding to the accessing party; and
  digital human being identification information corresponding to the accessing party.

In any optional example of the access method, determination on whether specified conditions have been met is performed by one of or cooperation between more of the following servers:
  the first industrial code server corresponding to the first principal;
  or, the industrial code server corresponding to at least one further principal;
  or, a unified management server docked to the industrial code servers corresponding to respective principals;
  or, a third-party server;
  and formulation of specified conditions is performed by one of or cooperation between more of the following servers:
  the first industrial code server corresponding to the first principal;
  or, the industrial code server corresponding to at least one further principal;
  or, a unified management server docked to the industrial code servers corresponding to respective principals;
  or, a third-party server.

In any optional example of the access method, whether the specified conditions have been met includes:
  whether any or each of the accessing party, the partner, and the disseminator has executed a specified operation;
  and/or, whether one or more of the time information, location information, and digital human being identification information corresponding to any or each of the accessing party, the partner, and the disseminator meets the specified conditions.

In any optional example of the access method, when determining that the specified conditions related to the accessing party are met, one or more of the following are implemented:
  allowing the accessing party to obtain the information corresponding to the first principal;
  or, allowing the accessing party to obtain the heterogeneous access information;
  or, allowing the accessing party to obtain the information corresponding to at least one further principal via the heterogeneous access route.

In any optional example of the access method, comprising any combination of one or more of the following: distributing, by the industrial code server, the income corresponding to one or more matters to the partners;
  recording, by the industrial code server, all or fractional income from the corresponding to the matter as income distributable to the partners;
  distributing the income to the partners when the industrial code server determines that the specified conditions have been met;
  adjusting the income distributed to the partners when the industrial code server determines that the specified conditions have been met; and
  distributing, by the industrial code server, the income among the partners evenly or on a pro rata basis based on set weights.

In any optional example of the access method, the industrial code server corresponds to a plurality of classes of partners, and distribute the income to class levels evenly or on a pro rata basis based on set weights; the industrial code server distribute the income to the partners of the same class evenly or on a pro rata basis based on set weights.

In any optional example of the access method, the all or fractional income of one of the matter corresponding to the industrial code server is not distributed to designated partners, but invested to another one or more matters corresponding to the industrial code server so as to obtain the income from the another one or more corresponding matters and then distribute the income to the designated partners.

In any optional example of the access method, the disseminator is a partner, or the disseminator is other than a partner; and a plurality of stages of disseminators constitute a dissemination chain, wherein the industrial code server manages the dissemination chain corresponding to its related matter.

In any optional example of the access method, the industrial code server determines a quantity of distributed Globe grids with respect to the matter as per territory.

In any optional example of the access method, a plurality of industrial code servers correspond to one core server of the unified code issuance management center; and distribution of Globe grid coding mediums of respective industrial code servers is solely controlled and managed by the core server.

In any optional example of the access method, the Globe grid coding mediums of respective industrial code servers serve as sub-versions; and the core server further distributes a global Globe grid coding medium, which corresponds to respective Globe grids of the industrial code servers so as to share the income from the matters corresponding to respective industrial code servers.

In any optional example of the access method, transaction transfer of the Globe grid coding medium corresponding to the industrial code server is under unified management of the server of a CodeChain digital asset exchange of the unified code issuance management center, wherein the Globe grid coding medium corresponds to a Special Goods_Drawing Right (SGR), which is a unit of measurement for a real right-based smart contract.

In an optional example of the access method, the matter corresponding to the industrial code server includes a promotion page and setup of a mall corresponding to the promotion page; one becomes a partner corresponding to the industrial code server by purchasing a commodity, or becoming an agent, or having a designated identity.

In any optional example of the access method, a terminal device which may successfully identify the Globe grid coding medium, or a terminal device which interacts with the industrial code server or a backend server authorized by the industrial code server based on the information obtained from successfully identifying the Globe grid coding medium, can obtain data information which corresponds to the Globe grid coding medium and is matched with user rights of the terminal device.

In any optional example of the access method, the terminal device is selected from any one or combination of the following: a smart phone, a tablet computer, a personal computer, a wearable device, and a smart home appliance; wherein the wearable devices includes smart eyewear.

In any optional example of the access method, the Globe grid coding medium is generated based on a preset coding rule, which is a bare-eye visible or invisible optical lattice diagram drawn, in a form of one-dimensional code, two-dimensional code, or multi-dimensional code, is static, or changes with light-shadow ray or frequency;

or, the Globe grid coding medium is a three-dimensional stereoscopic code whose surface has a three-dimensional stereoscopic structure formed according to a preset coding rule; or, the Globe grid coding medium is a digitalized optical wave or acoustic wave or a radio wave or a combined wave of the above, generated in a specific rule or a specific frequency variation manner based on a preset coding rule.

The present disclosure provides a digital human being eyewear adapted to the access method according to the present disclosure, and any of its optional examples, and its application method.

The digital human being eyewear captures and recognizes an object to access a first backend which manages information of the object, and provides, to the first backend, first basic information that may label any one or more of current location, time, and identification information corresponding to the digital human being eyewear or its user, wherein the first basic information is used when the first backend requests a second backend to issue a meta code; wherein the meta code corresponds to the information of the object managed by the first backend, or corresponds to the information of the object managed by the first backend and the first basic information; (the eyewear has an optical force sensing capacity with the optical tweezer principle);

the digital human being eyewear captures and identifies the meta code to access the first backend and provides, to the first backend, second basic information that may label any one or more of current location, time, and identification information corresponding to the digital human being eyewear or its user, wherein the second basic information is used when the first backend requests the second backend to issue a new code; wherein the new code corresponds to the information of the object managed by the first backend and the second basic information;

wherein the meta code or the new code corresponds to the coding medium in the access method according to any one of claims 12~29; and the second backend corresponds to the industrial code server or corresponds to the core management server linked to a plurality of industrial code servers.

In an optional embodiment, the first backend transmits the first basic information provided when the digital human being eyewear accesses to the second backend to request for issuing the meta code;

the digital human being eyewear captures and identifies the meta code to access the first backend, and the first backend requests the second backend to issue the new code when determining that the first basic information satisfies a predefined rule; and the second backend correspondingly generates the meta code or the new code according to the request transmitted from the first backend to issue the meta code or new code, saves the meta code or new code, and transmits the meta code or new code to the first backend to save.

In an optional embodiment, when capturing and identifying the object for the first time, the digital human being eyewear accesses the first backend to provide the first basic information, wherein the basic information is used when the first backend requests the second backend to issue the meta code; and when capturing or identifies the object for the second time, the digital human being eyewear accesses the first backend to obtain information corresponding to the meta code, and/or provides the second basic information to be used when the first backend requests the second backend to issue the new code.

In an optional embodiment, the second backend supports searching, querying, and analyzing of one or more of the following information: the information obtained from capturing and identifying the object, the information managed by the first backend, the first basic information, the second basic information, the information corresponding to the meta code, and the information corresponding to the new code.

In an optional embodiment, the object includes a human face, an article, a landmark, and a house number including a store sign.

In an optional embodiment, the core server of the unified code issuance management center corresponds to a plurality of industrial code servers; release of the Globe grid coding mediums of respective industrial code servers is solely controlled and managed by the core server;
  the digital human being eyewear corresponds to the terminal device in any embodiment of the access method.

Embodiments of the present disclosure provide the access method and an application method for any optional example of the access method.

In an exemplary application method, an accessing party obtains information of a commodity corresponding to the first merchant via a mobile terminal and obtains heterogeneous access information; wherein the heterogeneous access information corresponds to a heterogeneous access route; and the accessing party obtains information of a commodity corresponding to at least one other merchant via the heterogeneous access route; and
  the first merchant corresponds to the first industrial code server; wherein the at least one other merchant corresponds to at least one further industrial code server, the first industrial code server and the at least one further industrial code server being docked to one unified management server.

In an exemplary application method, the accessing party obtains an access route for obtaining the information of the commodity corresponding to the first merchant via a dissemination chain including a plurality of tiers of disseminators; and
  a disseminator provides a promotion code corresponding to the access route, the promotion code being an Globe grid coding medium; and the accessing party recognizes the Globe grid coding medium via a mobile terminal.

In the exemplary application method, each industrial code server corresponds to one or more merchants; each merchant corresponds to an Globe grid; and each Globe grid is associated with one or at least one partner;
  when a specified condition is met, the industrial code server grants an income to an Globe grid partner, and/or grants an income to a disseminator included in the dissemination chain corresponding to the Globe grid;
  wherein whether the specified condition is met includes:
  whether any or each of the accessing party, partner, and disseminator has executed a specified operation;
  and/or, whether one or more of time information, location information, digital human being identification information corresponding to any or each of the accessing party, partner, and disseminator satisfies the specified condition.

Embodiments of the present disclosure provide a coding medium, preferably an Globe grid Code coding medium, adapted to implement the access method according to the present disclosure, any optional example of the access method, and the application method thereof.

Embodiments of the present disclosure provide an industrial code server adapted to implement the access method according to the present disclosure, any optional example of the access method, and the application method thereof.

Embodiments of the present disclosure provide a server docked to a plurality of industrial code servers so as to cooperate with the industrial code server to implement the access method according to the present disclosure, and any of its optional examples, and its application method.

Embodiments of the present disclosure further provide a system comprising a plurality of industrial code servers and a server docked with the plurality of industrial code servers. The system is adaptable to implement the access method according to the present disclosure, and any of its optional examples, and its application method.

Embodiments of the present disclosure provide a further system comprising a plurality of industrial code servers and a server docked with the plurality of industrial code servers. The system is adaptable to implement the access method according to the present disclosure, and any of its optional examples, and its application method.

Embodiments of the present disclosure provide a mobile terminal adapted to implement the access method according to the present disclosure, any optional example of the access method, and the application method thereof. The mobile terminal according to the present disclosure is adaptable to cooperate with any system described above to implement the access method according to the present disclosure, any optional example of the access method, and the application method thereof.

Embodiments of the present disclosure further provide a digital human being eyewear alternative to the mobile terminal, the digital human being eyewear is adaptable to cooperate with any system described above to implement the access method according to the present disclosure, any optional example of the access method, and the application method thereof. The digital human being eyewear and mobile terminal according to the present disclosure may be used by an accessing party, a disseminator, a partner, and operating parties of respective servers.

The present disclosure further implements a game by applying the Globe grid and applying the access method according to the present disclosure, any optional example of the accessing method, and the application method. The server, mobile terminal, digital human being eyewear and system provided by the present disclosure may be used to implement, manage, and operate the game.

The industrial code server according to the present disclosure, and the server, the mobile terminal, and the digital human being eyewear docked with the industrial code server, are provided with appropriate software program and/or hardware devices to independently or cooperatively perform their respective functions so as to implement the access method according to the present disclosure, and any of its optional examples, and its application method.

Like the digital human being, the Globe grid in the present disclosure is termed based on an industrial code server of a specific subject. The "digital human being" may simultaneously refer to one or more of: a partner, an accessing party, a disseminator, a consumer, an owner of a digital asset account, and a user of the digital asset account.

In embodiments of the present disclosure, seamless docking between products and consumers may be realized by developing an Globe grid Code partner system of the CodeChain server, thereby enhancing efficiency and saving costs. A consumer's shopping and consumption in the CodeChain Mall in the early stage of partner system development is more than consumption, shopping and understanding CodeChain, but a procedure of becoming a partner to contribute a circulation and dissemination system so as to share the income of the CodeChain server platform; the partner may be enrolled by purchasing a commodity, or by franchising, or may be distributed to a specific group. A traditional manner of distributing an income from shopping is terminated upon each settlement; however, according to the mode provided by the present disclosure, the income is always distributed in the server or the entire system.

An "Globe grid" may be formed in such a manner: categorizing based on regions and attributes, systematically managing such as consumptions and behaviors management in a specific region, and forming a 5 W digital human being behavior, generating a new code with location, time, and identity as main digitalized features, and forming a chain between codes to manage a value chain. As the digital human being is an abstract definition in a four-dimensional space based on a theme, social status (state) and social attitude (open or not, open to whom, open in what scenario, etc.), under the precondition of protecting the privacy of the three-dimensional world (the digital human being does not need privacy information of the user's three-dimensional world (e.g., name, gender, mobile phone number, ID card, bank card number, etc.); instead, it uses the digital human being ID. The digital human being ID may uniquely identify, based on the theme, the identity of the user in the theme server (industrial code server). The digital human being ID may also be used to communicate with the theme server to complete behavior recording. With the digital human being ID, the account of the digital assets may be assigned and the digital assets may be used. The digital human being ID may be regarded as an identification of the three-dimensional world human behavior mapped in the four-dimensional world; a same person may have multiple digital human being IDs, because there is no mutual connection between a plurality of themes, and to map the digital human being ID1 back to the three-dimensional world and then map to another digital human being ID2, the person's consent must be first obtained with privacy protection). For example, via an intermediate account ID for identifying the digital human being, such as the mobile phone number, the mobile phone IMEI number, and the digital human being glassware ID in the three-dimensional world. It may accomplish the value system of circulation and dissemination. Therefore, compared with direct-selling and pyramid-selling, the digital human being-based management may realize performance-based distribution without registering for join-in, paying fees, or recording at fixed stages (i.e., stages based on each behavior), i.e., obtaining the profits from sharing, which has no threshold to join in, breaks the fixed pyramid, and realizes settlement per order. The 5 W-based Globe grid may encourage a partner to increase distribution points in the area he lives to propagate extensively and gain profits, which is a new "means of production" (becoming a "partner" through distribution and becoming a partner from a common consumer satisfying a certain requirement), and by code-scanning access, heterogeneous link, and roaming, a new relation of production may be established. That is, in the current system, one who becomes an accessing party via CodeChain access is not only a common consumer, but also a disseminator, and even becomes a "partner" of the industrial code server as long as "a certain requirement is satisfied," e.g., the consumption amounts to a certain amount, and the dissemination reaches certain times, etc., and thereby a new benefit distribution relationship is established.

As a consumer's consumption behaviors in a mall, including access point, access manner, and source, are recorded throughout the process, the income generated from the consumer's purchase may be accumulated under the consumer's account if the platform value increases; as such, when the earnings reach a certain level, the consumer may consume freely on the platform. Different from common rewards points, which do not enjoy the benefits of the vale created by the platform, the consumption amount of the consumer in the present disclosure is existent throughout the value chain system, and the contribution value may be quantized; therefore, the consumer may obtain a higher "consumption"-created value. Therefore, because the value is created by joint participation, the partner (including those from eligible consumers) may be entitled to the benefits of the whole platform. While for a traditional company, the franchisee is not necessarily entitled to the benefits of the while platform; for an Internet company (e.g., Facebook), a majority of its value is contributed by all subscribers through browsing, disseminating, and participating; besides, they shared their privacies. However, except the privilege of using Internet functions, they are not entitled to share the value of the whole platform (e.g., hundreds of billions of market valuations).

The partner of the "industrial code server", according to the issued Globe grid code, may not only obtain the "access to the mall," but also may share the benefits from the consumptions of all partners (i.e., the entire mall); the difference between the "mall" corresponding to the industrial code server and the current Internet mall (e.g., Tmall) is that the Internet has a centralized access such that "the circulation and dissemination procedures cannot be recorded, and the performance-based distribution effect of dissemination cannot be exerted" (although Taobao spreader is there, it only has one tier); while the "mall access" of the present disclosure corresponds to various two-dimensional codes (the two-dimensional codes are associated with Globe grids; the promotion page may be bound to a unified mall, a single merchant, or multiple merchants, such that one consumption or multiple consumptions of a consumer accessing via the two-dimensional code on the promotion page are associated with the Globe grid code, and thus may be distributed with the benefits) on the promotion page (which may appear like a common webpage, but corresponds to a unique promotion page two-dimensional code; the two-dimensional code may be displayed or may be hidden in the backend server; when the consumer accesses the promotion page by code scanning/clicking, the industrial code system is automatically superimposed with the digital human being DNA, e.g., the unique identification of a theme (specific WeChat service number)-based WeChat, to create a new two-dimensional code).

The traditional mode corresponds to the processes of the commodity, mall, traffic, and consume, where the mall earnings are irrelevant to the consumers or the traffic. However, the present mode corresponds to the processes of commodity, industrial code server (digital human being platform, mall), the Globe grid partner group (in replacement of traffic), and the consumer, wherein the contribution value of the consumer participation to the whole mall may be quantized, such that the values can be repeatedly counted; in this way, the benefits of the mall are not only associated with the partners and consumers, but also associated with the suppliers and the "industrial code server" providing services.

Besides, in the present disclosure, the system allows circulative consumption; compared with the consumption capital which only has one single consumption node (consumption value chain), the partner as the value chain of the circulative dissemination system and as the value chain of the whole mall service system can be quantized. Therefore, with the CodeChain link, the present disclosure enables a digitalized "upgraded consumption capital" that may include a plurality of parts.

The mode provided by the present disclosure enables the platform in the early stage to accomplish accumulation of development funds in low costs based on themes. The earnings from the partner's shopping behavior are open and transparent, used for business development (e.g., platform R&D, team building, etc.), establishing, in the name of the theme, an industrial fund accessing the theme, and investing on products of the theme, such that the mall obtains a more cost-effective product; then the mode boosts a virtuous cycle. Further, the fund may also be used to purchase an industrial listed company of the same theme in the stock market to get premiums in the capital market; the premium earnings may also be mapped to the partner's benefits; in this way, a virtuous mode of whole-people shareholding and capital serving for industry are open, which avoids the current myth that the listed companies have no better way to use the raised funds but put them in finance.

The digital human being eyewear-based code-scanning access mode is CodeChain access. Codechain is an upgrade of blockchain, and the underlying logic of the CodeChain is based on digital human being, where a new code is generated based on each act of the digital human being, and linking between codes form a chain to realize a digital management of the act-based human society value system. However, the bottom layer of the blockchain is IP, which is a robot incapable of recording human acts; therefore, the blockchain can hardly serve real economy and human society. Compared with the decentralization of the blockchain, the CodeChain system has a management center (serving as a core server management) referred to as "unified code issuance management center" (shortly putted as code issuance center, or code issuance management center; individual CodeChains form a circulation and dissemination full system of a product; individual Globe grid partners constitute a circulation and dissemination agency system of "an industrial code" server; individual CodeChain servers (industrial code servers of respective businesses) constitute the whole economic ecological system; individual servers perform CodeChain digital asset transactions (labelled assets) via interconnectivity, where a code of the CodeChain server embodies the digital asset; the "Special goods_Drawing Right" (SGR) serves as the measurement unit of the digital asset based on simple barter trade at equal value, which is circulated and exchanged in various CodeChain server systems.

Then, a bank exchanging between SGR and legal tender may be established as CodeChain digital bank; and an insurance payout where the SGR cannot be exchanged for a real object is referred to as a digital insurance payout (an insurance company of this type is referred to as a CodeChain digital insurance company).

All of the above codes may be generated by the code issuance center and have certain management functions (e.g., total amount control of issuance by an industrial code server, guarantee approval, circulation permission, entry or close, whether the industrial code server accesses to the exchange, whether the industrial code server can be connected to the digital bank, and whether the digital insurance can be exchanged with SGR, etc.); therefore, the code issuance center may function similarly as an Internet root server (at the level of code management in replacement of IP) and also function to issue and manage circulative currency like a central bank (e.g., central bank digital currency such as Digital Currency Electronic Payment DCEP); moreover, it also function to manage human acts;

Currently, the common code-scanning access protocol is still an Internet protocol. However, the present disclosure uses a CodeChain access protocol, which may constitute a new digital human being network system free of IP based on 5 W access. Preferably, a device supporting the CodeChain access protocol uses a digital human being eyewear. The present disclosure provides a complete system from an access terminal (smart phone, digital human being eyewear, etc.), access protocol (CodeChain access), CodeChain server (in replacement of website), to a code issuance management center (in replacement of an Internet management center), which is an upgrade to the Internet, offering downward accommodation and seamless link, thereby thoroughly perfecting network security construction.

The present disclosure enables scene (5 w)-based specific theme access through various quantum sensing access manners, which can accurately trace back respective nodes during the information dissemination process and implement value quantization (colloquially "morality index") of the qubit quantum state based on information dissemination and transmission, as well as conversion between information and energy. The energy herein does not refer to the thermodynamic energy, but a "source power" acting upon human society to construct a new human society relationship, and drive the society to advance and operate by developing a new productivity (enrolling a quantum CodeChain).

Specifically, the core of the digital human being network is a social person, who is not existent in isolation, but always based on a specific theme (the human society is a multi-theme presence), a specific social status, and a social attitude (i.e., open degree); the social person may help others or obtain help from others, or both, or close, to establish an interpersonal relationship, thereby constructing a social relationship of the digital era.

The mode according to the present disclosure realizes reconstruction of a new economy based on the CodeChain idea: by building a service system (we refer it as "industrial codes") of different industrial fields, the manufacturer, consumer, dealer, and server provider of the industry are linked within a same system to build a new economy ecological system of "digital human being economics" with a completely new market economy operation mode; an alliance is created based on the numerous industries to foster and accelerate the construction of a common interest group for various participants, thereby really implementing the social practice of constructing common interest group with all-people participation; meanwhile, the new economy advocates a spirit of "one for all, all for one" to serve the people, which, as a code of act, not only improves moral standards, but also provides an approach for eliminating poverty.

The heterogeneous access for traffic referral and unified mall mode provides a management featuring full channel plus Globe grid, which may open up multiple categories and full industries and integrate online and offline, seamlessly implementing O2O+SNS, thereby providing a new solution of new e-business new retail and creating a "digital human being new economy ecological system." The core business functions are integrated on a unified platform; and only a few key management functions are reserved for respective backend servers of a number of enterprises.

A traditional e-business generally has an online single channel management; a traditional practice is that respective manufacturers stick "website/public WeChat account" on product packages; the user has no motivation to forward such information, such that the traditional practice lacks the effect of "what you see is what you get." In the traditional centralized access mode, an Internet mall (e.g., Tmall) usually has a centralized entry, which only focuses on the post-access result, but neglects or cannot implement a full-channel full-scene access, such that the promotion always requires a huge traffic fee but has very little effect; further, Taobao spreader requires an entry threshold, with limited link presentations and access manners.

The digital human being cloud platform (industrial code server) according to the present disclosure may manage multiple channels covering offline agency, franchising, self-operation of enterprises and merchants, and may also realize performance-based distribution rewards based on the "dis-semination chain" by setting "Globe grid partners"; the created digital human being new economy ecological system improves the value and profits of brand enterprises; the customer base of the brand enterprise is expanded by digitalization and rewarding loyal customers, and the whole process is digitalized and traceable. The present disclosure turns advertisement from expense to assets. New data are obtained, business acts are optimized, and the brand is closely connected with the consumers. More loyal fans are created by interaction with brand fans. In this way, the procedures of "production, consumption, transaction, and service" are integrated.

The value chain access manner according to the present disclosure requires each access to be through "value chain two-dimensional code," or by scanning (face to face)/or clicking (clicking in the system) or long pressing (in specific social software); such access inherits the original "agency" gene and is also superimposed with his own gene; in this way, not only single-product access but also the shopping generated by single-product access to the entire mall may get a commission granted by the value chain. As such, every one may automatically become a "quasi Taobao spreader" by scanning a two-dimensional code or by scanning a WeChat friend circle, thereby increasing infinite traffic, which solves the difficulty of traffic exhaustion of an e-commerce merchant.

Compared with the traffic incoming mode of the traditional centralized access: the advantage of code stickers on offline product's packaging such as egg code and pancake sticker code lies in multi-center access, what you see is what you get, which is free traffic accessing the "unified mall"; compared with the extortionate price pure online promotion of Wechat merchants, the frontend access to the "unified mall" includes offline value access promotion and online friend circle senseless access (i.e., a two-dimensional code carrying his own digital human being DNA may be generated without registration, without paying fees, even without following the platform per se), enabling multi-tier dissemi-nation and seamless fusion of offline and online.

The advantage of unified mall further lies in full-channel full-media seamless fusion and turning advertisement plac-ing to be asset: a mobile terminal such as a smart phone is not a pure Internet connection tool due to the characteristic of sensing access, but a sixth sense organ of a human being; while "ONE SCAN" may be regarded as an alternative upgrade to the "mouth clicking" relative to a computer screen in the offline physical, real world, thereby forming an interaction; in this way, the TV, computer, and mobile phone become an integrated new media; besides the traditional advertisement income, extra functions and incomes are superimposed: TV interaction, voting lottery questionnaire; newspaper mall, sample and shopping coupons. With the traditional media as the core, a new CRM is established to link potential consumers and interact via the mobile Internet of Things, such that the traditional media (especially outdoor media) has a 5 W attribute and a natural traffic source, thereby becoming a new access port and being entitled to obtain a transaction commission. In particular, a traditional outdoor media usually lie in a shopping center in a golden area and has a huge human traffic; if a "IoT QR code" is posted, an access to the unified mall is obtained to realize transaction (the consumer accesses by code scanning and finishes the shopping; then, he will access the unified mall to purchase more products, and the outdoor media becomes a touch point); in this way, the outdoor media can not only collect traditional advertisement presentation fee and but also may obtain transaction commissions. The present dis-closure may realize construction of a human-oriented IoT world of "one code as one access, one chain as one world."

DETAILED DESCRIPTION

Figure 1:
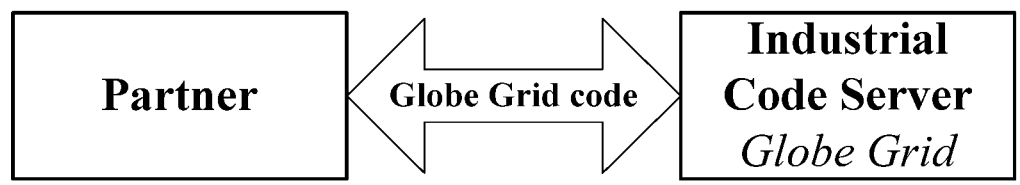
FIG. 1 is a schematic diagram of using a Globe grid to associate a partner and an industrial code server Globe grid qualification.

Now, an embodiment of an Globe grid partner mode will be described. The industrial code server is associated with a to-be-implemented matter. Hereinafter, establishing a mall is regarded as a matter, and a corresponding industrial code server may access some data information required in implementing the matter (and/or its associated matter) to perform Globe grid and partner management.

The exemplary mall may be a proprietary mall or a multi-merchant mall, or may be an e-commerce mall or a physical mall (at least capable of providing online and/or offline necessary data to backend servers such as an industrial code server). The commodities may be physical, virtual, or provision of a certain service, which are not limited herein.

The partner refers to a person (natural person, legal person, etc.) which has a right to share the earnings obtained by the industrial code server from one (or more) corresponding matter. Globe grid rights as a warrant represents the partner's right to earnings; the partner's earnings are reflected in the following parts: 1. the partner is entitled to a portion of earnings (which are represented as % of the sales revenues, % of pre-tax profits, etc.) where the partner contributes to the development and investment of the whole server system of the industrial code; 2. a portion of the profits of the server is put into a special industrial fund, where the partner corresponds to one of the LPs (Limited Partnerships) of the fund; 3. the fund may further go into the capital market, where the partner is equivalent to a shareholder (with an appropriate stock percentage); 4. Relevant earnings from investing on upstream and downstream enterprises in the industrial chain. As the partner has a characteristic of digital human being, the full process of the value chain system may be quantized and traced during the whole process, thereby realizing performance-based distribution. One kind of partners may be consumers. Because consumption of a consumer in the industrial code server also contributes to creation of the overall value chain system, such consumption may also be quantized and meanwhile entitled to the partner's earnings.

The industrial code server is a kind of CodeChain server, which is configurable to manage grant, selection, and determination on the entitlement of a corresponding Globe grid based on a preset digital human being platform.

The digital human being refers to a group of proxy services the CodeChain network grants to a specific person, which may be regarded as a server or an initiating operation end controlled by the holder and representing a "person" in some behaviors, so as to perform digital information transmission with the system on behalf of the person. The digital human being acts and joins in a digital human being network with a specific theme-based digital human being ID (digital human being DNA) as the identity, and has an attribute of a social attribute that takes 5 W (why, what, where, who, when) physical time-space as the radium of the initiating social network. The data of the digital human being may be saved in different business systems; therefore, the digital human being identify is implemented in a chain form, i.e., the digital human being may simultaneously have "multiple themes," so as to perform corresponding access to the unique identity chain based on the specific theme.

Figure 2:
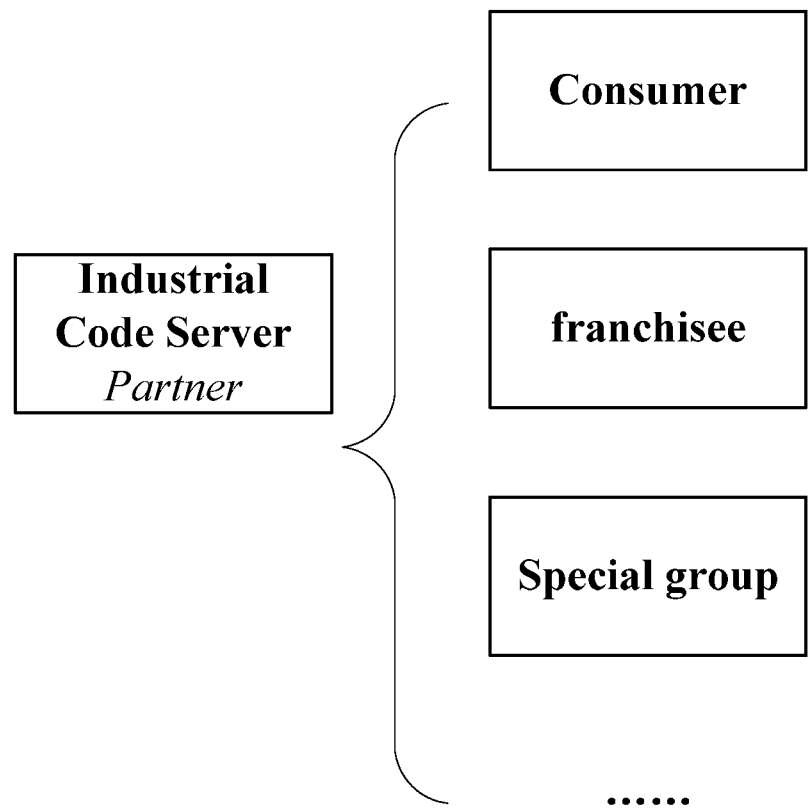
FIG. 2 is a schematic diagram of multiple kinds of partners of an industrial code server.
Figure 7:
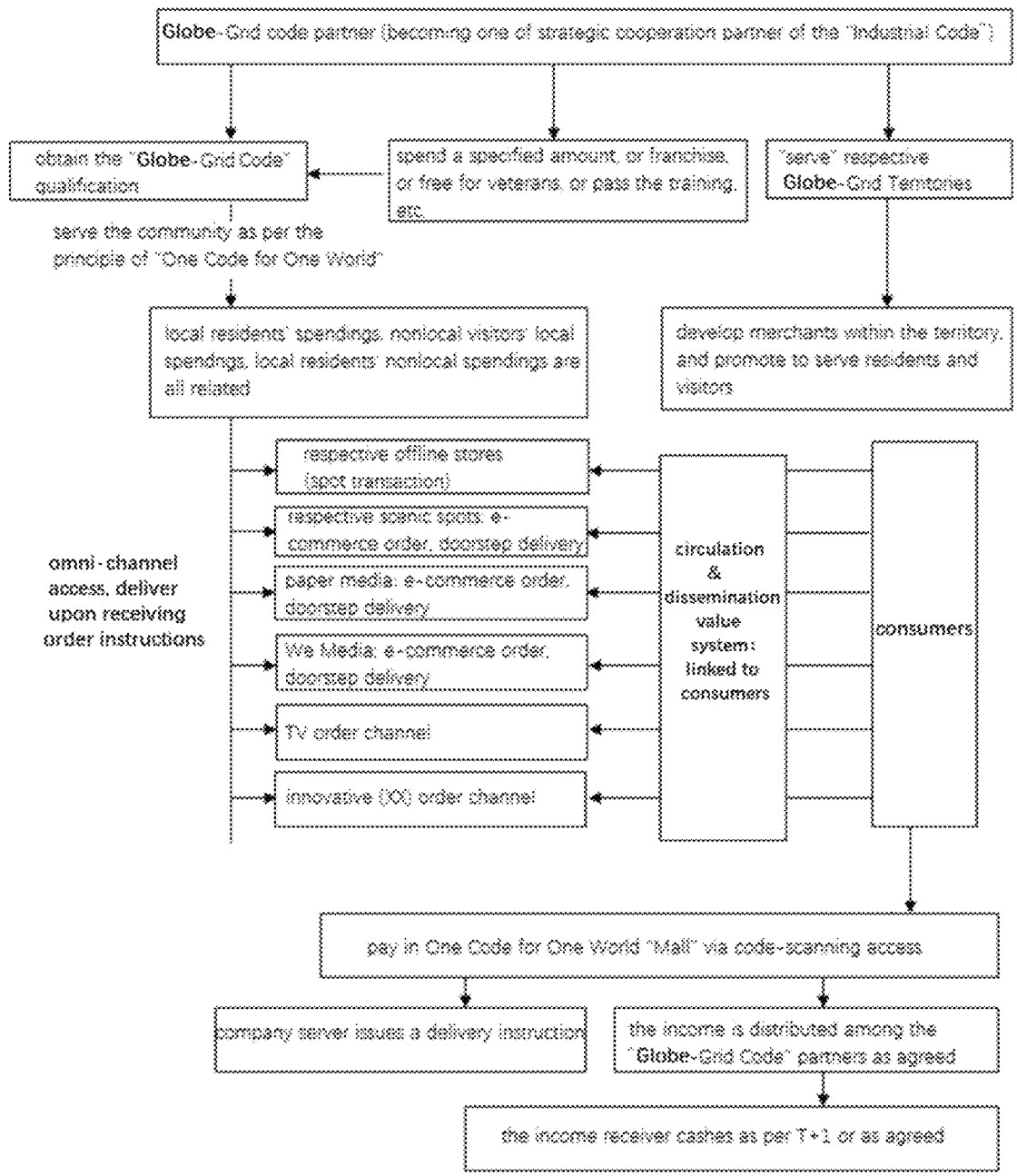
FIG. 7 is a schematic diagram of an exemplary Globe grid code partner mode.

As shown in FIGS. 2 and 7, one kind of partners are consumers, because after they shop in a mall corresponding to the industrial code server (e.g., it may be required that their consumptions reach a specified amount), they are entitled to a Globe grid corresponding to the industrial code server. Another kind of partners are established based on their identity peculiarities, e.g., those whose identities are authenticated as veterans, students, the handicapped, and vulnerable groups are entitled to a corresponding Globe grid when they were identified as partners by the industrial code server (without requirements of consumption).

Actually, the industrial code server may identify any person (including a consumer or an organization) as a partner, for example, "four parties" associated with its corresponding matter, i.e., manufacturer, consumer, dealer, and service provider, but not limited thereto. Hereinafter, When referring to "partners", different kinds of partners will not be differentiated unless otherwise indicated.

The industrial code server may establish an individual as a partner when some specified subjective and/or objective conditions are satisfied. The conditions may include the statuses of the industrial code server and/or the partners, results of their independent or coordinated operations, or external statuses without direct associations with the industrial code server and/or partners. For example, the aggregate shopping amount of a consumer has reached a specified amount, or the time or location with respect to the consumer's registration or shopping; or a requirement that an individual be trained on partner qualifications and pass the training.

To this end, the industrial code server may access various information of an candidate individual partner and parameters such as time/space to compare with a set condition, and confirms granting of the Globe grid qualification if the condition is met. The industrial code server may access the parameters from various approaches, e.g., from a candidate partner (or the terminal device used thereby) (by data information interaction, etc.), and/or from a cooperative party (a merchant, a bank, a third party payment institution, an identity authentication agency, a government authority, etc.), or from further processing the necessary data source for the interaction between the industrial code server and various interacting parties, which will not be exhausted here.

In some examples, for a certain theme related to the matter corresponding to the industrial code server, the corresponding issuance quantity of the Globe grid qualification may be determined by territories. Dependent on different application scenarios, the theme may cover the whole wall, or one or more merchants therein, or one or more commodities, or one or more promotion activities, etc. The concept of territory is not limited to a traditional geographical sense, which may be delineated according to different application situations, e.g., specifying by city; then, the Globe grid attribute may also be attached with information corresponding to the territory and the serial number of its Globe grid in addition to representing the theme of the industrial code server and the corresponding matter, and its status of binding with a partner.

It may be appreciated that when some new conditions are met or some original conditions are not satisfied, for example, the corresponding theme does not exist (some activity ends or a commodity is off the shelf) and the time/location/identity peculiarities do not satisfy relevant requirements, the industrial code server may perform partner management in accordance with preset setting, for example, canceling the corresponding partner's status, or modifying its weight to adjust its share proportion, etc.

In the present application, one association form of the Globe grid is Globe grid code (FIG. 1). Exemplarily, a partner may access the personal center of the digital human being platform via any terminal device interactable with the industrial code server to, within its privileges, process data information associated with the partner, request and obtain a corresponding Globe grid, and obtain a service provided to the partner when performing a corresponding action, etc.

The Globe grid code may be any coding medium, which is generated by a coding rule uniformly recognized by respective interacting parties and can be parsed by a matched decoding rule. It may be specified that decoding cannot be done for an unmatched rule; or, although the data of the coding item can be decoded, what are displayed are only a string of "meaningless (deemed by those who cannot interpret)" characters, or an error message is provided, or a device or means to correctly parse the code may be notified (e.g., providing an approach to down a correct APP); but valid content (instruction flow, link address, etc.) corresponding to the coding item cannot be further parsed out. This embodiment is implemented by using a two-dimensional code, particularly a CodeChain two-dimensional code.

The coding mediums may be barcode images such as one-dimensional code, two-dimensional code, multi-dimensional code, which are visible to naked eyes, or an optical lattice diagram which expresses the code information and is drawn with a fluorescent pen and represented in various forms such as: light-shadow rays, visible light, UV light or infrared light, polarized light, refurbish frequency, etc., or a digitalized acoustic represented with a specific rule/frequency change.

The present disclosure has no specific limitation to the content corresponding to the coding information of the Globe grid code. The Globe grid code is at least associated with the Globe grid attribute of the industrial code server, the code information of the Globe grid code at least including a coding item corresponding to the obtained attribute information. For example, the Globe grid code is associated with the partner, then the coding information of the Globe grid code may include the coding item of the identification information of the corresponding partner, or at least the coding item that may be mapped to or available for querying the identification information of the partner. The identification information herein preferably refers to unique identification information within a local or global range.

Exemplarily, after the Globe grid code is successfully identified, the attribute of the Globe grid or other associated data information may be known (at least at the backend server); when it satisfies corresponding permission requirements, the attribute of the Globe grid and the relevant data information may be managed globally or locally. The backend server may be an industrial code server, or a backend of an authorized agency or a superior competent department, but is not limited thereto.

Exemplarily, any person or agency, not limited to the partner per se or a person or agency associated with the partner may obtain the content corresponding to the Globe grid code which is allowed to be disclosed thereto by the industrial code server via a terminal device that may successfully identify the Globe grid code or via a terminal device or server that may interact with the backend server based on the successfully identified information: for example, all or part of the Globe grid or other associated data information; or such content corresponding to the Globe grid code is not directly provided, but provided after being screened or processed by the backend server.

For example, after scanning a certain Globe grid code and interacting with the industrial code server, a request for authenticating the partner identity can be initiated; the industrial code server accepts the request and checks the identity, and then returns the authentication information, instead of directly disclosing the personal information of the partner as recorded in the backend server.

The present disclosure has no limitation to the terminal device, which may be a smart phone, a laptop, a personal computer, a smart glass (a digital human being eyewear), a wearable device such as a watch, and a smart home appliance, etc., which may also several devices used in cooperation (e.g., The functions of scanning code, decoding and interaction are assigned to difference devices).

Figure 8:
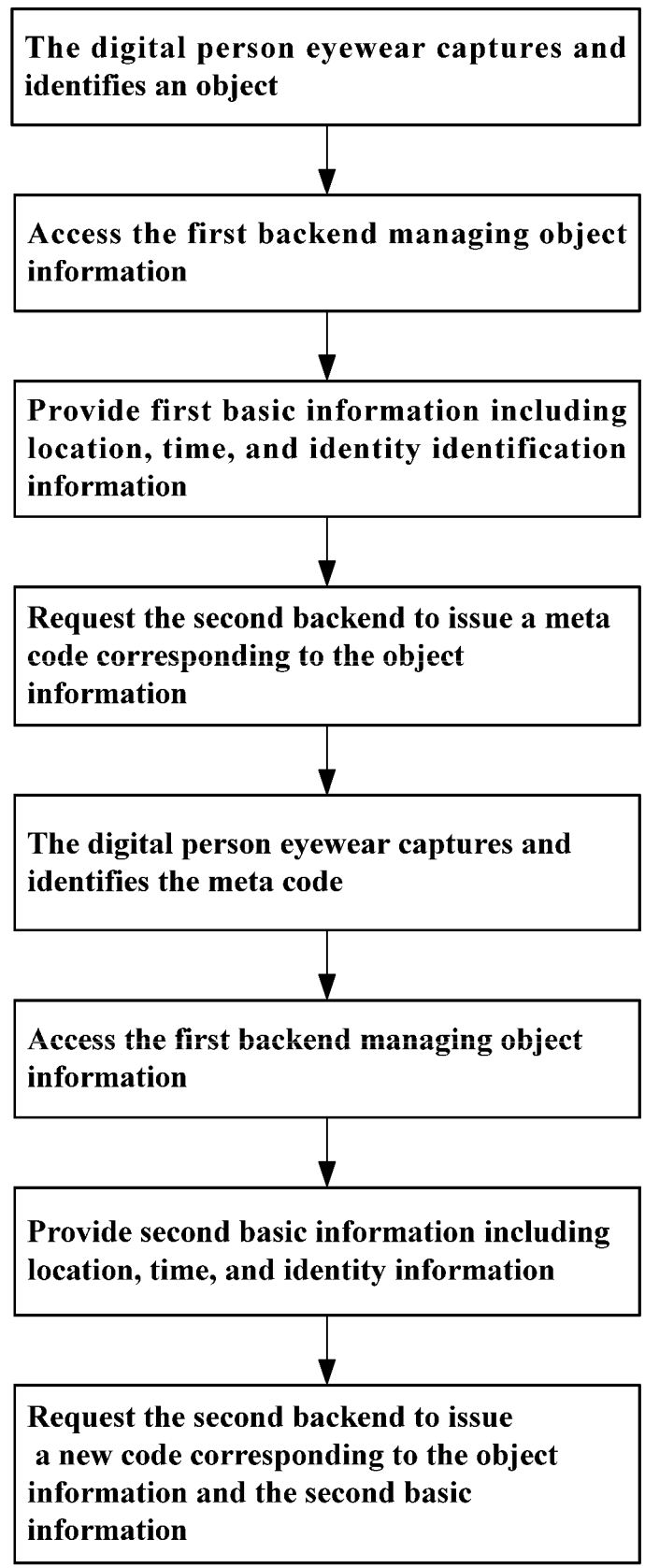
FIG. 8 is a schematic diagram of an exemplary interaction flow of a digital human being eyewear.

As shown in FIG. 8, the digital human being eyewear may complete access to the "Globe grid code" after the first capturing to access the backend server (meanwhile, "meta code of the source code" is generated for the first time by recording the 5 W information).

It involves digital human being eyewear product hardware, mobile APP (including Android and Apple IOS), and cloud end data processing platform (including Web server, load balance server, database server, GPU cloud computation server hardware resource, and relevant software).

1) Basic functions of the digital human being eyewear and the first backend server, including location, time, identity, etc.: the digital human being eyewear captures to (analogously) identify information managed by the first backend server, such as a human face, an object, a scenic spot, and a landmark, etc.; or, in the field, a store object identification implemented by use of the digital human being eyewear in conjunction with "map LBS management" (under the precondition of communicating with the code issuance management center) is accessed to the first backend (marking location, time, and identity to obtain 5 W basic information), transmitted to "a second backend server" (i.e., the unified code issuance management center) to request for "code issuance" (i.e., "meta code," the first source code for anything and any matter, which may include information such as location, time, and identity when necessary).

"The second backend server" (unified code issuance management center) accepts the "code issuance request" to generate a "code" (meta code, which may be tracked as source in the subsequence access uniformly managed by unified code issuance) including the information managed by the first backend server; the code may be transmitted to the first backend server for being saved, and is meanwhile saved in the second backend; besides, the code also supports search, query, and analysis (the information identification by the first backend server includes identifying a human face/an object/a scenic spot landmark, etc., and the second backend may determine whether the human face/photograph is the same person, and then a determination result is returned to the digital human being eyewear/APP).

2) the digital human being eyewear captures to identify the meta code and/or globe grid code including the information managed by the first backend server (digital identification, commonly referred to as code scan) and accesses the first backend (marking the location, time and identity before determining whether the code satisfies a predefined rule); then the meta code and/or matter code is transmitted to the "second backend server" (which may be the unified code issuance management center or an agency authorized by the center) to request for "secondary code issuance" (i.e., superimposing new 5 W information based on the meta code); the "second backend server" (code issuance management center) accepts the "code issuance request" to generate a new "code" including the information managed by the first backend server; the new "code" may be transmitted to the first backend for being saved, and is meanwhile saved by the second backend server.

Figure 3:
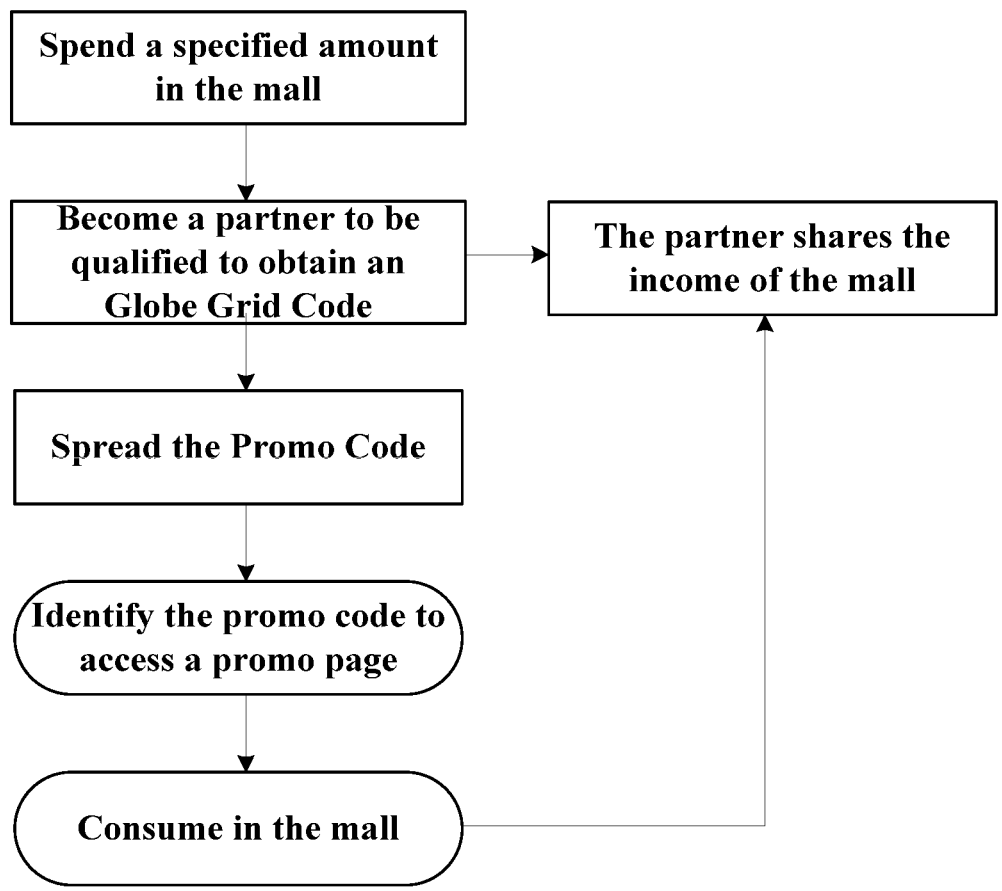
FIG. 3 is a schematic diagram of the flow of implementing earnings allocation to partners.

In some preferred embodiments, as shown in FIG. 3, a promotion code (payment, collection, and recharge are included in one subset of the functions), which serves as an entry to access the mall, such that the coding information at least includes a coding item that can correspondingly obtain the promotion content and (all or part) of the Globe grid attributes corresponding to the Globe grid. For example, based on the coding item corresponding to the promotion content, a website linked to the promotion page, or an instruction that can drive the browser of the terminal device to directly display or to be redirected to the promotion page, and among other things, can be obtained. For another example, based on the coding item corresponding to the partner identification information in the Globe grid attributes, the identification information and the disclosable information of the partner bound thereto may be known (at least at the backend server), and if permitted, the data information related to the partner may be managed or updated.

After the terminal device successfully identifies the promotion code or successfully obtains the information obtained from identifying the promotion code, any person or agency may access the corresponding promotion page. In different examples, the promotion page may be bound to the whole mall, a single or multiple merchants, a single or multiple commodities, etc.; the promotion page may introduce and display relevant information about the mall, the merchant, the commodity, and the promotion activities or may further support commodity vending or be linked to a corresponding sales page in the mall. Or, for a privileged user, it is also supported to display some data information corresponding to the partner on the promotion page or other designated page, or to provide a link to the digital human being platform, etc.

The coding information of the promotion code and the coding information of the Globe grid code may overlap (e.g., partner identification information, but not limited thereto). For another example, the coding information of the Globe grid code also includes a portion for obtaining the promotion content, which, in practice, may also be used as a promotion code. Or, the promotion content is not encoded, but reflected in the feedback information obtained from the backend server after successfully recognizing the promotion code.

In a preferred embodiment, with the (all or part) of the content corresponding to the coding information of the Globe grid code as the basis, the promotion information and/or auxiliary information may be superimposed thereon as needed. The specific form or content of the auxiliary information may be set as needed, e.g., one or a combination of the parameters such as time, location, and identification information of a party, which may be related to coding, or may be related to decoding and parsing. Based on different auxiliary information, the correspondingly presented promotion contents are also different, which are more distinctive and pertinent. The partner's terminal device may access the digital human being platform's personal center to request and obtain the desired promotion code.

An appropriate coding medium as the Globe grid code or promotion code, particularly a two-dimensional code, can be processed through artistic design into an "advertising image/ artistic work" attached with textual introduction, which may attract attention to boost offline dissemination, and meanwhile may be seamlessly linked online; one of its important advantages lies in wide spreading via multiple channels online and offline, because it may be printed and posted offline to be presented in various media and may also be sent and forwarded via various social networks. For example, the coding medium may interact with the backend server to obtain the feedback content matched with its coding information via access manners such as scanning or staring the two-dimensional code, or clicking the two-dimensional code or a hyperlink of the same origin. The online interaction and dissemination processes may also be further combined with digital human being identification information of various parties to keep a digital trace for retrospection.

Therefore, any user (not limited to the partner per se or its associated party, e.g., a digital human being identifying its promotion code, etc.) who identifies the Globe grid code or promotion code will at least present its identification information of related partners, which may be known by the industrial code server upon subsequent operations such as accessing a mall or consumption, for managing and updating the data information of the partner associated with the Globe grid code.

Preferably, the profits from various matters (e.g., the mall) corresponding to the industrial code server are credited as allocable benefits as per a prescribed proportion when the set objective or subjective condition is met, wherein the allocable benefits may be allotted among all kinds of partners evenly or as per weight proportions; among the same kind of partners, the benefits may also be allotted evenly or as per weight proportions. It may be prescribed that after the set subjective or objective condition is met, e.g., the partner first executes a designated operation, the benefits share may be granted to the partner.

The contributions (not limited to consumption and spreading) of respective partners are all recorded in the partner data information by the industrial code server, and their contributions may be credited as benefits or granted a corresponding allocation according to a prescribed manner. The industrial code server may also prescribe that when the access to the mall via a promotion code reaches some subjective and/or objective conditions, e.g., generating a designated number of access times or generating a designated sales revenue, the share ratio of the corresponding partner can be raised. This reflects the principle of more pay for more work, facilitating motivating the partners to spread the promotion code.

Besides, for a user who accesses the CodeChain network of a corresponding industrial code server by identifying a first promotion code or further becomes its partner, a second promotion code generated corresponding to the user not only includes the digital human being identification information of the user per se, but also may be superimposed with the identification information of the partner (recommender) of the first promotion code such that when computing the two-dimensional code-based consumption and dissemination contributions, the backend server may allocate the shares of the user and its recommender based on weights. The allocations with respect to two-tier, three-tier, . . . , and N-tier recommendations may be derived likewise, which will not be detailed here.

That is, under the precondition of "CodeChain" access, with a specific 5 W (IoT space-time) as the starting point, implementing CodeChain full-channel (offline-online integrated link) access based on a specific theme (advertising of a specific product or activity). It not only forms a traceable "meta code" (source two-dimensional code," the access grid of the IoT world), but also generates and superimposes "a new two-dimensional code and/or hyperlink of the accessing digital human being" over the original two-dimensional code through the "two-dimensional code ONE SCAN" and "Moment tapping" of the social network, thereby constructing a new "digital human being network" system, such that "the contribution degree of each link of circulation dissemination" can be quantized and tracked, thereby implementing "capitalization of the advertisement investment, valuation of circulation dissemination."

Hereinafter, an embodiment of unified mall access implemented by the present disclosure will be described.

The product two-dimensional code is preferably in a physical form that the user can access in an offline scenario, e.g., affixed to a physical object, e.g., product body, product package, advertisement, shop post, etc., but not limited thereto, and the scenario of accessing and identifying the product two-dimensional code via online channels such as sharing and forwarding via various social networks or media presentations, etc.

After the user scans and identifies the product two-dimensional code via various mobile terminals, he can access a single-category mall of a corresponding single product and perform various functions and operations supported by e-malls such as viewing and purchasing the kind of single product. The corresponding page may be presented via the mobile terminal that performs scanning and identifying, or transmitted by the backend server or the mobile terminal of the single-category mall to a designated other device (e.g., personal computer, digital human being eyewear, smart phone, smart home appliance, etc.) to be presented; the subsequent actions which require further interaction with the backend server, such as placing an order and payment, may be implemented by the mobile terminal, the other device, or the mutual cooperation between the mobile terminal and the other device.

For example, when a consumer spots an egg code (a product two-dimensional code; in the corresponding single-category mall, an egg-specific e-commerce merchant operates and provides services) printed on the egg (or its package) or an egg code on an advertising post in a physical store, he uses a mobile terminal to scan the code to access the page that may present the single-category mall for purchasing eggs, wherein the page supports purchase operations such as placing an order, and payment, etc.

Identifying the product two-dimensional code of a single product further provides a heterogeneous access route to the user. Via this heterogeneous access route, information of other kinds of single products may be obtained, and if desired, interaction with the single-category mall backend server of other kinds of single products is enabled. For example, on the page presented by identifying the egg code, another single-category mall corresponding to a pancake code may be jumped to (e.g., by clicking a button, or various other preset interaction manners), wherein the pancake code is another kind of product two-dimensional code, and its corresponding single-category mall is actually a same unified mall, i.e., a different presentation manner of different branch websites of the website with the same domain name, which are only different in URLs, but are substantially identical in other contents, and the branch website calls the master station data of the unified mall; then an e-commerce merchant specialized in selling pancakes operates and provides services; the jumped-to new page supports viewing information of other industries, placing orders to purchase single products of other kinds (in this case, pancakes).

Similarly, if the user directly identifies the pancake code, he first accesses the single-category mall page (substation) for purchasing pancakes, and it is also supported to further link to/jump to the single-product or substation page of other single-category malls corresponding to other kinds of single products (egg code, seafood code, etc.).

Figure 12:
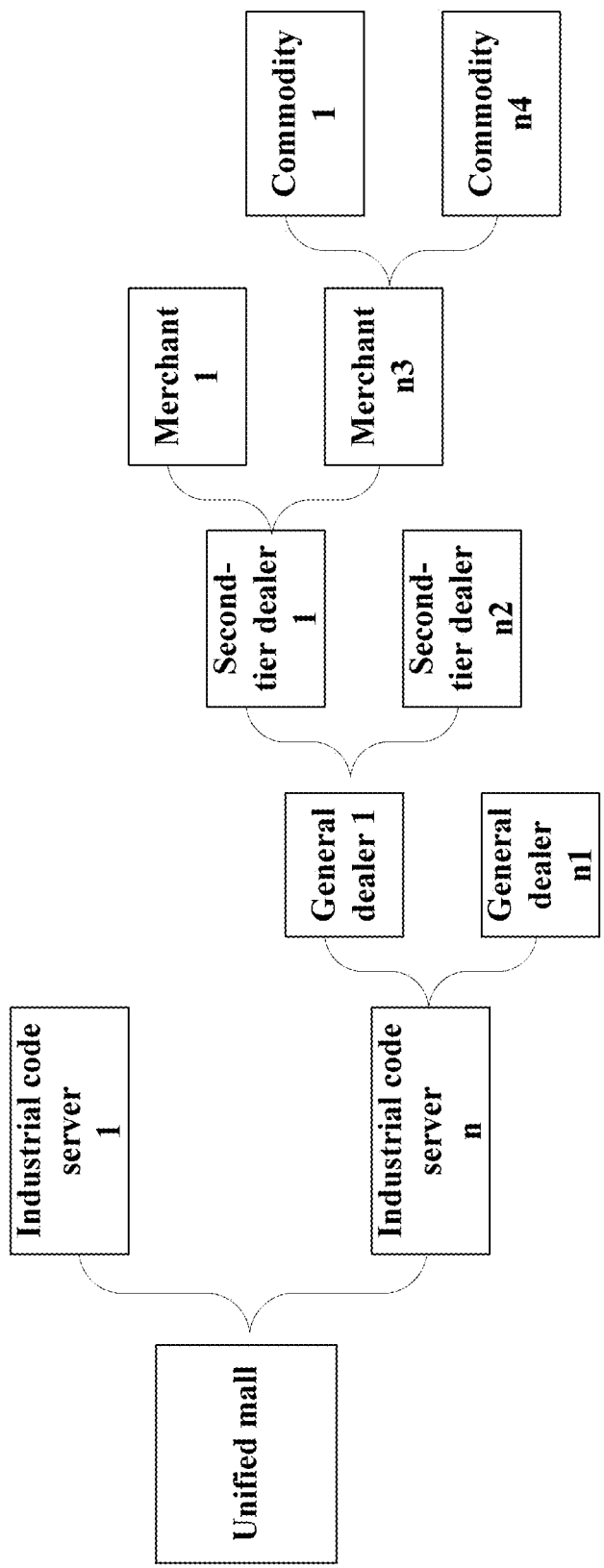
FIG. 12 is a schematic diagram of an exemplary relation-ship between an industrial code server and a merchant under a unified mall mode.

The frontend of the single-category mall is a server of the promotion page accessed by code scanning or by clicking a shared and disseminated link, which therefore is associated with the industrial code server corresponding to the single product; one industrial code server may correspond to a plurality of merchants (preferably of the same industry). Exemplarily, there may further include a plurality of stages of agents between an industrial code server and a merchant, as shown in FIG. 12. If an industrial code server corresponds to a plurality of general agents, while the general agent corresponds to a plurality of second-tier agents, and the second-tier agent corresponds to a plurality of merchants; each merchant may vend one or more varieties of single product (preferably of the same industry), while each product may correspond to a number of channels; a merchant or channel of a relatively large scale may run a self-owned enterprise server or rent a cloud server to set up an independent industrial code server or be docked with the industrial code server of the industry; while merchants or channels of a smaller scale do not run a server, but rely on the functions, privileges, modules or interfaces allocated thereto by the industrial code server of the industry to operate, manage, provide service, maintain data, as well as perform other processing.

Based on the above mode, supposing a large enough number of categories of product two-dimensional codes are provided, they can not only correspond respectively to the industry (or single product of the industry), but also can provide a heterogeneous access route to obtain information of another industry (or single product associated with another industry); in this way, the online and the offline are integrated, and various industries are linked, which effectively reduces the drive-traffic cost and realizes cross-industry cooperation, resource streamlining, and benefits sharing.

Figure 13A:
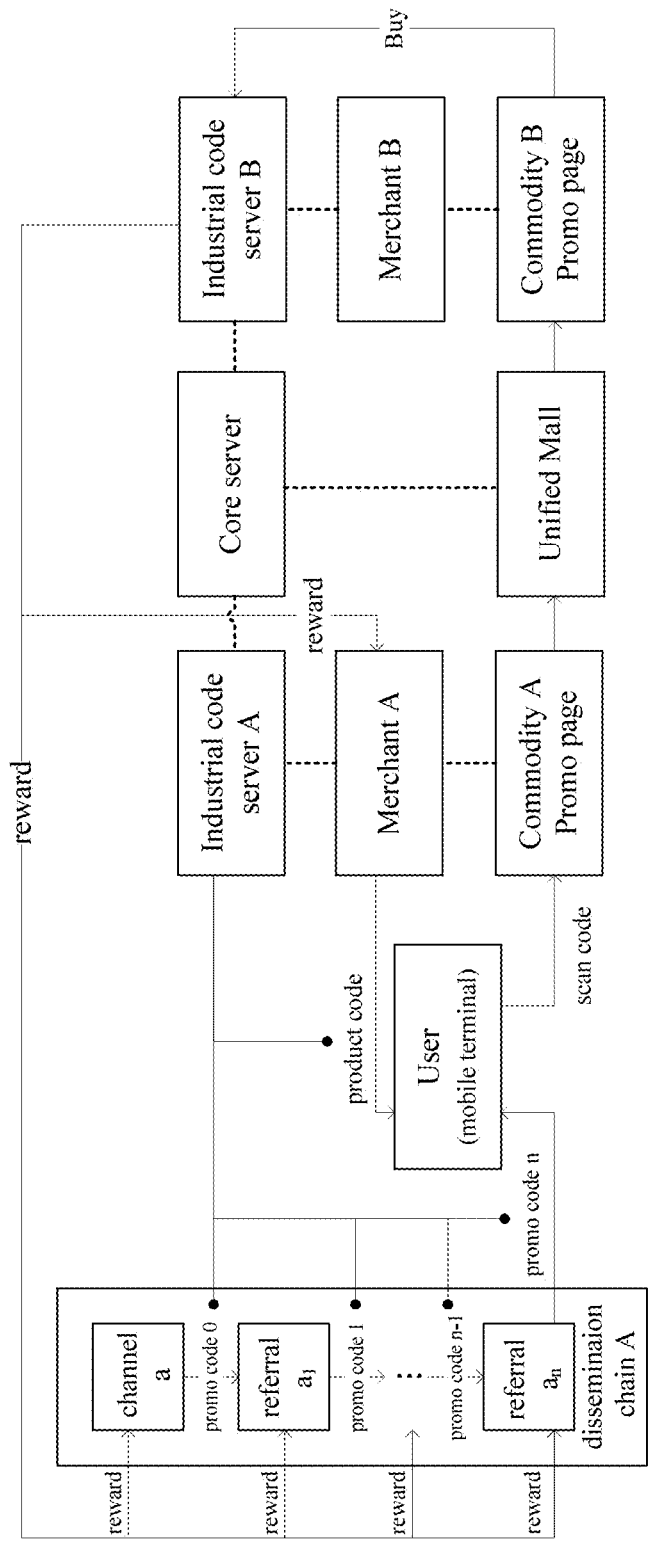
FIG. 13a and FIG. 13b are schematic diagrams of two exemplary flows including a spreading chain.

The heterogeneous drive-traffic access mode may be implemented by further building an "on-code unified mall" (hereinafter referred to as a unified mall). As shown in FIG. 13*a*, the unified mall integrates the single-category malls corresponding to various industries and single products and presents them under different sectors of the unified mall (i.e., various industrial code servers correspond to various substations, which exhibit different decoration systems when being accessed); the unified mall supports accessing a page corresponding to the single product A in the unified mall by identifying the product two-dimensional code corresponding to single product A (introducing the single product or information related to the industry it belongs and supporting operations of ordering and purchasing the single product), and allows redirecting to a page corresponding to another single product B, C, . . . , in the unified mall by performing a designated interactive operation on the page corresponding to single product A. The various single products may be physical or virtual objects, or may be a service or a right, etc., which is not limited here. The unified mall provides independent operation systems for the industrial code servers of various industries.

By identifying the product two-dimensional code of a certain single product, the digital human being platform of the industrial code server is first accessed, and then the "single-category mall" is accessed (the frontend of the single-category mall is the server of the promotion page accessed by code scanning or clicking a shared and disseminated link, which is thus associated with the industrial code server corresponding to the single product, wherein the industrial code server is configured to generate a promotion page link and/or two-dimensional code for each single product, wherein the generated two-dimensional code incorporates various channels so as to perform statistical analysis of various channels, different regions, and multi-tier dissemination chains, etc.), thereby providing a heterogeneous access route to the user. Via this heterogeneous access route, information of other kinds of single products may be obtained, and if desired, interaction with the single-category mall backend server of other kinds of single products is enabled, i.e., accessing to the "on-code unified mall."

The single-category mall here is a server platform (i.e., a digital human being platform) presented at the front end, which can perform recording of various channels and multiple dissemination paths (i.e., each code scanning/clicking will superimpose the DNA of the digital human being to generate a new two-dimensional code, thereby implementing whole-process action traceability); the consumer's operations on ordering and purchasing seem to be executed by accessing the single-category mall; however, in actuality, it is a link between the digital human being platform and the on-code unified mall. That is, the single-category mall does not exist in actuality. Single-category malls are only different substations set up in the same "on-code unified mall" which exhibit individual designs.

Moreover, individual digital human being platforms and industrial code servers are owned by companies of different industries, and they have their own membership management, credit management, agent card, and coupon distribution management systems; the unique ID accessed to the unified mall may be preferably a mobile phone or other uniquely identifiable ID; the rewards points from different industrial codes may be freely exchanged via a third party server, thereby forming interconnect; in this case, the third-party server that interconnects with various industrial code servers is referred to for example a server "enabling interconnect between core functions of the unified mall," for example a bid & buy website server (which is linked to a plurality of industrial code server to access a "unified digital assets exchange"). In the exchange, the products of various industrial code servers, the Globe grids of various commodities, and the quantification indexes of performance competence of smart contracts of various commodities or agents, can all be exchangeable principal matters, thereby realizing a real interconnect featuring asset digitalization and asset tokenization; for example, pancake code reward points may be exchanged to an SGR (here, SGR represents a reward point general name of a server) via the "core server" (its status corresponds to the unified mall, simultaneously accessed to a plurality of industrial code servers, but performing different functions from the unified mall), while the SGR may be further exchanged to a seafood code reward point.

In different examples, the backend server of the unified mall may directly have the transit path on a certain single-product page correspond to a single product under another designated industry, or correspond to a single product under any of a plurality of other industries, so as to directly redirect the user to a new page; in an alternative embodiment, all transit paths corresponding to a plurality of other single products may be first aggregated onto a same redirect page, where contents such as introductions of the plurality of other single products or relevant industries, as well as links, may be simultaneously presented, to enable the user to select another product selected to be further viewed on the transit page, and then redirect the user to access a new page.

The other single products that are redirected from one single product or other single products presented on the transit page may be relatively fixed, or may vary randomly or regularly. For example, regardless of being redirected from which single product, the plurality of redirected single products are all random, or are a plurality of fixed single products assigned by the unified mall backend server. Or, by setting a predetermined rule, a plurality of redirect-enabled single products may be provided flexibly and pertinently based on the following facts: for example, time (actual time, or the time when the user accesses, is redirected, or performs a designated operation such as the single product of a commodity hits the shelves, etc.), location (physical address of the user or operator, location of registering with, logging in, or performing a designated operation such as the single product of a commodity hits the shelves, etc.), accessing party (preferably distinguished with the user or his mobile terminal's digital human being identification, etc.), the operator of the initially accessed single product (preferably distinguished with the operator's digital human being identifier, etc.), access source (e.g., the identified two-dimensional code, etc.), access manner (e.g., the model and brand of the terminal device in user, etc.; or accessing by clicking a link or scanning a two-dimensional code, etc.), which will not be exhausted here.

The essence is as such: the consumer may access substation A of the unified mall by scanning a code via product A (attached with the two-dimensional code issued by industrial code server A); the consumer may access the unified mall via the same mobile phone number to view all products, entering an Internet of Everything state, i.e., purchasing of the commodity in each mall is associated with a code accessed via external code scanning (chain of codes); i.e., the whole "dissemination chain" will be recorded for each purchase. As the dissemination chain is attached with a value, it is also referred to as a value chain. The principle of value chain creation is as such: a promote page link (and/or the two-dimensional code) created each time when each user (e.g., WeChat user) scans a code/clicks an industrial code server (e.g., a specific WeChat service account) may be recognized and superimposed with the digital human being's DNA (e.g., WeChat OPENID) to create a new two-dimensional code; and elements including upstream code, present code, time, and character will be recorded in the industrial code server, thereby realizing code-to-code link; in this way, the whole process of the consumer's act can be traced and recorded via the chain formed by each link formed by upstream code and present code).

Further, when for example consumer A completes code-scanning access via a product two-dimensional code A1 of a product (e.g., an egg code), he would access the single-product shopping detail page A1X (completing order and buy); when he clicks the "Mall Homepage," he may access the "unified mall"; then he can view and search all products and label the product of interest as "My Recommendation—Product"; then, the mall provides a "Package of My Recommendations" button, clicking of which may create a two-dimensional code AX11 that includes promote page two-dimensional codes of 10 "My Recommendations A2, A3 . . . A11" available for others to click for sharing and dissemination or to scan code for access, which would present the 10 products in My Recommendations; meanwhile, the two-dimensional code AX11 is superimposed with the consumer A's digital human being DNA, or superimposed with the "Agent AA1 Two-Dimensional Code" (or the owner of the merchant's Globe grid) at the first tier, such that when your friend completes buy via the consumer's sharing in "My Recommendations", the consumer A and the agent AA1 (or Globe grid owner) may be rewarded with the commissions of this deal, thereby realizing that everyone can "start a store, only with 10 products" to exert his own dissemination effort to create values. Further, "My Recommendations" may also be presented in a list of Persons Directly or Indirectly Participating in Reading/Sharing (nickname corresponding to OPENID) viewed in My Promote Effect, so as to find the participant/sharer, as well as his "My Recommendations," in the records of Viewing and Promoting Product A, thereby realizing cross-traffic drive featuring "use the digital human being's act process as the entry point," which further increases credibility.

To facilitate understanding the value chain, an example is provided here for illustration: a consumer scans or clicks a product two-dimensional code issued by the industrial code server A (e.g., a WeChat service account), and accesses the industrial code server A to superimpose the digital human being DNA (e.g., WeChat OPENID), thereby automatically creating a new two-dimensional code to propagate; besides, the industrial code server A records the whole process; and each access of the consumer to the mall and each buy in the mall can be traced to the whole process of the external (e.g., other user) code scanning and/or sharing and dissemination, such that each act can be rewarded, which thus gives a "value chain"; therefore, the consumer may access/enter an IoT "unified mall" from any product (corresponding to a two-dimensional code) by "value chain" access, i.e., each access to a commodity in the mall is an access with a "value chain link," totally different from the Internet which only has a point-to-point access without introducing an intermediate link.

The centralized access of the traditional Internet e-commerce has drawbacks. It is essentially a point (i.e., through purchasing traffic) to center mode, and each click does not record and reflect the intermediate links (substantive contributors), such that the intermediate links have no willingness to make contributions because their values are not reflected; the traffic fee incurred from accessing the center is paid at the central platform, which is very high.

However, a social e-commerce such as Pinduoduo™ completes a transaction via multiple points; however, to join each point, it is needed to complete ordering and buying (commonly referred to as crowd-buying), then becoming an access point. Therefore, the value chain leverages multiple social forces, and the cost of joining is only code scanning or clicking, nearly free; this is why the value chain can become a new mode of e-commerce and e-retail.

Compared with conventional manners, the present disclosure enables nearly infinite points to access the mall (not only code-scanning access from product A, product B, and product C, but also consumer A1 scanning the code of product A, sharing and propagating it to consumer A2 and consumer A3; when A3 accesses the unified mall, consumers A1, A2 become the "value chain" of A3's access to the mall; therefore, A1 and A2's contributions may be rewarded after an agreed condition "when commodity buy completed" is executed). That is, code-scan access, sharing, and dissemination become important components of "circulation and dissemination residual value system," thereby improving the integration of the merchant's offline (multiple channel management manners including display on the product two-dimensional code, store brochure, etc.) and online (value chain dissemination), and unification of the real (store brochure as multiple channels to access the real world) and the virtual (unified mall), which solves the expensive traffic costs of e-commerce and implements a more effective pay-by-performance mode.

The heterogeneous drive traffic mode and the concept of unified mall are not limited to e-commerce platforms, and they may be applied to different industries which have their own independent systems (including, but not limited to, membership/level, reward points/digital coins, incentive policies, functional businesses, . . . ). For example, when obtaining introduction information by scanning code in a scenic spot or buying a local special product by clicking a hyperlink corresponding to an online two-dimensional code, an access route to further obtain other industrial information may be further provided to the user, e.g., redirect to a certain game or an e-commerce live streaming platform, or a social network, etc.

Based on derivations from the above mode, the coding information corresponding to the coding medium such as the two-dimensional code may be adjusted by updating the coding rule and the corresponding coding and parsing rule based on agreements between various parties, such that recognition of any coding medium may not only present the original information corresponding to the coding medium, but also may be further affixed with heterogeneous access information that corresponds to a heterogeneous access route via which "information corresponding to (one or more) coding mediums is obtained (directly or indirectly)." For example, obtaining the information (e.g., specific content or corresponding page, link address, etc.) corresponding to the other coding medium, or obtaining information or link address for accessing the backend server corresponding to the other coding medium, or interacting with a backend server corresponding to the other coding medium (to obtain specific content through interaction), or redirecting to the backend server corresponding to the other coding medium via other server, but not limited to the above.

In some specific embodiments, the traffic driven by heterogeneous access may be recorded and managed to quantize and grant rewards. Still with an e-commerce platform as an example, by recognizing the product two-dimensional code corresponding to the single product A, it is not only enabled to buy the single product A, but also enabled to add prompt and drive traffic link such as "load other commodity" or "recommend commodity" on the payment page such as shopping cart to direct the consumers to single products corresponding to other industries; assuming that the consumer is redirected to the page corresponding to the single product B and further completes information view and/or buy transaction with respect to the single product B, the operator of single product A may be rewarded to be granted a "cross-industry commission" based on the "heterogeneous access" contributed to single product B by the product two-dimensional code and/or corresponding page of single product A.

Therefore, each product two-dimensional code corresponding to each single product may not only act as the mall entry for its own product, but also may seamlessly access the unified mall to become a drive traffic entry for new e-commerce; as such, regardless of the operator of the single product A or the operator of the single product B, they will have more incentives to promote their own product two-dimensional codes, e.g., sticking more codes on product packages or more vigorously disseminate their products over online channels, which not only facilitate more transactions for their own products, but also enable them to win "cross-industry commissions" due to more changes of successful drive traffics, thereby forming a positive circulation and reflecting the idea of "distribution by performance, more gains from better performance."

The operations of quantizing the drive traffic to a single product through heterogeneous access and granting rewards may be performed by the operator of the single product (via the industrial code server), or performed by the backend server of the unified mall, or performed by cooperation between multiple parties (e.g., the industrial code server redirected from/to, the backend server of the unified mall, other third-party server, etc.).

The manner of promoting via various online channels via social network and social media (e.g., WeChat moments, point-to-point, official account, webpage) refers to attaching the product two-dimensional code and/or a hyperlink from the same source to various promotion pages, or images of disseminating the product two-dimensional code, or coding information of disseminating corresponding to the product two-dimensional code, etc., which is not limited herein. Moreover, besides the product two-dimensional code, a promo code (see other embodiments of the present disclosure) or a relevant form (hyperlink, etc.) may also be disseminated online/offline. Coding information of the promo code further incorporates recommender information over the coding information corresponding to the product two-dimensional code, e.g., identification information (preferably the digital human being identification information) of the recommender, but not limited to such information; then, similar to the corresponding product two-dimensional code, the promo code may serve as a mall entry for the corresponding single product or a drive traffic entry for a heterogeneously accessed unified mall or other single-product malls, and may also facilitate various parties (e.g., management of the unified mall, operator of the initial single product or new single product, and a supervision authority, etc.) to identify recommenders and if necessary, may trace back to each dissemination step of the whole chain.

The recommender may be extended to any person or organization (preferably a digital human being), e.g., the manufacturer, supplier, various stages of online/offline dealers including agents, franchisers, and self-operations (operators of the industrial code server, which can be the manufacturer or a dealer, etc.) of a product; for example extended to a circumstance in which a consumer accessing the mall page of a single product further recommend the product after viewing or shopping (the way for the consumer to access the mall is not limited, which could be access by recognizing the product two-dimensional code or a certain tier of promo code, etc., or being redirected to access by recognizing other product two-dimensional code, or direct access through the promo page of the mall or entering the network link address, etc.); or a circumstance in which a user obtaining the product two-dimensional code/a certain tier of promo code via various online/offline channels needs to further recommend the product to others (e.g., a secondary recommendation formed by forwarding a promo code of a friend on a social media); or a circumstance in which a passerby, tourist, audience or a supplier (operator, manager, etc.) of the online/offline channels such as the physical stores, the outdoor advertisement, or the TV media, who records (e.g., by capturing, storing, or recognizing via a mobile terminal) the product two-dimensional code/a certain tier of promo code presented on various places including a physical store, needs to further recommend the product to others.

The information (identification, action) of each link in the chain can be integrally recorded; therefore, these recommender may act as the "Globe grid partners" (see other embodiments and the descriptions below), and their contributions on the "dissemination link" are quantized during the whole process and traceable, thereby winning the drive traffic rewards distributed based on performance. For example, supposing that the operator of the single product A grants a link reward of 10% of the price 100 of single product A, which is equally shared among all recommenders on one dissemination chain, and further grants 7% of the price of single product as a direct reward to the latest recommender; the operator of the single product B grants a fixed amount of RMB 15 as the total link reward amount that is equally shared among all recommenders and further grants another fixed amount of RMB 13 as direct reward; the operator of single product C grants a fixed amount of RMB 6 as link reward, which is not equally shared, but shared as per proportions corresponding to recommendation stages, without a direct reward. Please note that the reward rules here were exemplary.

Supposing a dissemination link includes User A, User B, and User C. User C enters the unified mall, searching, viewing, and finally buying products A, B, and C. Then, based on User C's buying single product A, User A and user B may obtain the equal link reward corresponding to single product A, respectively, i.e., RMB 100*10%/2=RMB 5; further, as User B is the last link to facilitate the transaction, he may additionally obtain the direct reward of single product A, which is RMB 100*7%=RMB 7; based on user C's buying single product B, user A and user B may obtain the equal link reward corresponding single product B, respectively, i.e., RMB 15/2=RMB 7.5, and user B may additionally obtain the direct reward RMB 13 corresponding to the single product B; and based on user C's buying single product C, user A may obtain the reward corresponding to the first-tier recommendation in the link reward of the single product C, i.e., RMB 6*p %=6*25%=1.5, and user B may obtain the reward corresponding to the second-tier recommendation in the link reward of the single product C, i.e., RMB 6*(1−p %)=6*75%=4.5; user C directly places orders in buying the single products, he is not entitled to the link reward or direct reward granted for dissemination actions (this example does not focus on whether to grant rewards for direct order, which can be determined based on actual circumstances).

Supposing user A's profile has been bound to the industrial code servers of single product A and single product B, respectively, while has not been bound to the industrial code server of single product C, then user A may obtain the corresponding reward RMB 5+7.5=12.5; as the reward corresponding to single product C is in a pending state (a balance of the operator of single product C enters a to-be-distributed temporary pool), user A needs to first bind to the industrial code server of the single product C and then receives the distribution. Supposing user B's profile has not been bound to the industrial code servers of single product A and single product B yet, while has been bound to the industrial code server of single product C, then user B may obtain the reward RMB 4.5 corresponding to single product C, but as to the other rewards, user B needs to first complete binding and then receive the rewards.

Exemplarily, suppose user A in the above dissemination link is a merchant of a single product (e.g., single product D), who disseminates a product two-dimensional code or a corresponding promo page related to single product D. User B is a salesperson under the merchant (or from other promotion channel) or a consumer recommending the single product D, who disseminates the product two-dimensional code or the promo page related to single product D, attached with identification information indicating user B as recommender, or directly disseminates the promo code of the single product D (the coding information already includes the coding information corresponding to the recommender identification information). Suppose user C is a user who sees or receives the product two-dimensional code or promo code via online or offline, enters the mall page for single product D by code scan and identification, and then is redirected to the unified mall, buying other single products A, B, and C.

In another example, suppose user A in the above dissemination link is a consumer who has accessed the unified mall directly or via redirect, user B is the merchant of a single product (e.g., single product D); user A disseminates the product two-dimensional code (or promo code, etc.) regarding single product D, and user C is a user identifying the product two-dimensional code (or promo code, etc.) who first accesses the mall page of the single product D and is then redirected to the unified mall, buying other single products A, B, and C. Then, although user B does not directly distribute a two-dimensional code to user C for recommendation, he can still gain the link reward or direct reward granted by other operators due to heterogeneous drive traffic. For another example, after user C buys the single product A and is then redirected to the unified mall, he further views the page of single product D and is further redirected to the unified mall to buy single products B and C. In this circumstance, user A and user B, who are merchants of single products A and D, respectively, may gain the link reward or direct reward correspondingly distributed by the operators of single products B and C owing to their heterogeneous drive traffic contribution in the dissemination link, respectively. Supposing user C also buys single product D in this example, then single product A is entitled to a link reward or direct record from the operator of the single product D based on another dissemination link. It is further assumed that in some examples, the rules and proportions followed in reward distribution may be identical or different based on one or some attributes of any link in the communication chain, e.g., different identities (consumer, recommender, or operator of another single product).

For another example, user A, user B, and user C in the above communication chain are three consumers. User A directly sees or receives a product two-dimensional code (promo page or promo code, etc.) regarding the unified mall or a single product therein sent thereto from other people, further affixes his own recommender identification information, and then disseminates it; user B, recommended by user A, further affixes his own recommender identification information and then disseminates; user C, recommended by user B, accesses the unified mall and buys single products A, B, and C.

Suppose in an example, user A, user B, and user C are registered subscribers of a same social network (or user A and user B belong to the same social network, and user B and user C belong to another social network), who disseminate relevant product two-dimensional code or promo page via one or more social networks; the backend server of the social network (or between backend servers) may know the respective steps of recommendation operations on the segment of communication chain and specific performing users, such that the users needn't take trouble to affix their own identification information when performing communication and promotion; instead, the backend server of the social network provides the identification information to any interacting party which has the privileges and needs to know such information (identification and action) via backend interaction, such as the server of the unified mall, the industrial code server of the single product operation, and the third-party server, etc., for supervising corresponding links on the communication chain, or computing and distributing the communication rewards, etc., but not limited to these servers or purposes. Similarly, the timing and manner of knowing the identification information of each (or certain) link on the communication chain are not limited. For example, it may occur to various stages: before the communication, upon generating or communicating the two-dimensional code/promotion page, or after the communication, and for example, provided via user registration, binding, or directly provided, or provided by a party already knowing relevant information. For another example, the identification information at various links on a communication chain may be obtained in different manners and/or in different phases; or, a certain party only provides the identification information to his knowledge corresponding to the preceding link on the communication chain to other parties, and identifying and recording the whole communication chain may be performed through cooperation between various parties.

Hereinafter, an example of unified mall will be provided. The functions of a unified mall include: commodity management, merchant management, coupon management, promotion management, address management, payment management, order management, user management, statement management (e.g., commodity-level sales curve and comparison diagram), etc.

Preferably, the unified mall is compatible with WeChat, realizing WeChat payment, obtaining WeChat OpenID (user unique identifier), etc. Of course, in other examples, it may be docked with other third-party payment agencies, or may obtain the user digital identity identification information of other cooperation platforms.

The unified mall realizes multi-merchant operation management based on multiple operation systems. With the corresponding operation system, the merchant has its own management backend for managing its commodities and orders. The merchant may set commodities to support drop-shipping, such that these commodities may be sold on shelves of other merchants. Through permission management, permission configuration is enabled to the functions that can be used by the merchant; and the backend server of the operation system may set different levels of operators based on their privileges.

A list of operation systems may be invoked from the core server to facilitate the merchant's management. When the unified mall newly creates a merchant, it first selects an operation system, in which the merchant's short name may be set and the merchant may be associated with the operation system (it needn't return to the home menu in the case of already association); in the edit function, it is not allowed to modify the merchant's short name.

The commodity management includes: operation on commodity launch; for a promo of heterogeneous access mode, it is prescribed in this example that a commodity without setting a reward policy is not allowed to launch; that is, a commodity without setting a cross-industry commission reward policy will be given a notice to ask the operator to access the operation system for relevant setting.

When viewing a commodity, adding the commodity to a cart, and placing an order, the balance of the relevant merchant in the digital human being operation system will be checked; the merchant should keep a certain amount for paying various rewards such as cross-industry commissions; if the balance is below the set amount, a notice such as "the commodity has been withdrawn, unavailable to buy" will be presented to the user and the merchant.

The user order is completed within 7 days after receiving the goods; then, an order complete interface is invoked to distribute rewards such as cross-industry commissions. If the user fails to confirm receipt till the 15th day after the merchant ships the goods, the receipt will be confirmed automatically, and then the above operations are performed.

for the client end of the mall, it is required in this example that the client end shall have the shared short code to access the unified mall, for determining the communication chain. Exemplarily, the mall may be accessed via a value chain promo page. When a user accesses the unified mall via a digital human being system, single-point login and automatic two-side association (which refers to the industrial code server and the unified mall) is realized; in the case of multi-system access, the mobile phone as the unique identifier of the user is used in the associating process.

Digital coils may be used for buying commodities, reward points, and rewards; the operation systems may have their own independent digital coin systems, and the user can only the digital coin of the operation system via which he accesses. The personal center of the user may display the balance of the digital coins corresponding to the operation system.

When querying or using a coupon, the coupon associated with the mall owned by the user in the operation system is simultaneously granted to the user; the status of the coupon will be timely updated, such as whether it expires, whether it has been used, and whether it has been transferred to others, etc.; after used in the mall, the coupon's status is also updated in the operation system.

An interface of the unified mall related to the operation system is to implement the following operations:

- Create a Merchant: after the operation system creates a merchant, it sill synchronously creates a merchant in the unified mall, and the unified mall needs to record the operation system identification; it is not allowed to create a merchant with a duplicate name;
- Modify a Merchant: after the operation system modifies the merchant, the modified merchant profile shall be synchronized to the unified mall;
- Query Unified Mall Commodities: a list of currently on-shelf commodities may be queried as per merchant; this function is invoked by the operation system to generate a list when creating a promo page and coupon A relevant interface is provided for the operation system to implement the following operations:

- Obtain an access_token: obtaining an operation token before invoking other interfaces, as a credential for invoking other interfaces:
- Create a Commodity Order: this function is invoked after the user places an order and pays; the order details are added to the original interface: commodity ID, commodity name, unit price, quantity, sum, actual payment (sum—discount; the coupon amount is assigned based on the percentage of the sum amount of each commodity, and the last entry is calculated as discount— assigned amount), and rewarding rule;
- Complete Commodity Order: this function is invoked 7 days later or automatically upon receipt confirmation of the user order, so as to grant the reward (by the operation system);
- List of Available Coupons: to obtain available coupons and the correspondence relationships with the coupon types of the unified mall;
- Suspend Coupon: the coupon is suspended after the user places an order, and the frozen coupon is not displayed in the list of coupons;
- Unsuspend Coupon: after the user cancels the order, returns the commodity, and receives the refund, the used coupon will be unsuspended;
- Query User Digital Currency: when this function is invoked, the user's digital currency in the current server (operation system) may be queried;
- Suspend User Digital Currency: the user's digital currency is suspended after the user creates the order; and the suspended digital currency is deducted from the balance;
- Unsuspend User Digital Currency: after the user cancels the order, returns the commodity, and receives the refund, the used digital currency will be unsuspended;
- Bind Unified Mall Coupon with Discount Coupon: WeChat Coupon must be used to create a discount coupon in the unified Mall; after the WeChat coupon is saved, the association relationship is bound.

The operation system enables promo page management. For example, newly creating or editing a promo page for the merchant's commodity placed on the unified mall. The list of promotion pages enables management of all promotion pages established by respective merchants; the list records the captions of the promotion pages, templates they user, functional descriptions of the promotion pages, coupons allowed to use, names of corresponding commodities, launch dates and effective date of the promotion pages, etc., which allows operations of editing, previewing, and deleting the above contents and allows generating and viewing two-dimensional codes in one-to-one correspondence to respective promotion pages.

The effect (heterogeneous access) of the promotion pages may be accessed from Order Details in the operation system. Exemplarily, in the list of promotion pages, the order details are accessed by clicking "Amount" to view Order No., Order Status, Order Time, Payment Amount, to-be-distributed rewards and distributed awards corresponding to the operation system, the names, merchants, commodities, unit prices, quantities, and rewards for a single commodity (including average and direct rewards in the chain, computed according to set rules) of all operation systems involved in the order, the transaction amounts and rewards corresponding to respective commodities, and the transaction amounts and rewards corresponding to respective operation systems, etc.

The effect (heterogeneous access) of the promotion pages may be accessed by viewing Covered Population in the operation system, but this function might not be open to merchant backend. Exemplarily, the following information may be accessed: the transaction amount, date, and closing user ID corresponding to a certain order, the ID, nickname, and the granted direct rewards of the latest recommending user on the dissemination chain, who is regarded to directly facilitate the transaction, and the ID, nicknames, and respective granted average link rewards of all recommending users on the whole dissemination chain may be accessed (of course, in different examples, the number of users entitled to the average link rewards may be prescribed, e.g., the rewards are only granted to a certain number of recent recommending users, not all users in the dissemination chain, etc.).

For commodity management in the operation system, a summary page including the sales volume, sales amount, and rewards amount (e.g., represented by the digital currency of the operation system) corresponding to the on-sale commodities of a merchant may be accessed, and by clicking any item, the "Unified Mall Commodity Sales Quantity and Rewards" page may be directed to for more detailed information: in cases of a plurality of strike orders corresponding to the commodity, presenting the order number, order time, closing user ID, username, covered population, quantity of the strike commodity, amount, and corresponding rewards of each order. Here, by clicking "covered population," the page showing rewards distribution can be redirected to. For details, please refer to the example described above.

When a cross-system commodity is present in the order (e.g., the deal is closed by driven traffic based on heterogeneous access), corresponding sales rewards should also be distributed. In this example, the rewards standards are set when the commodities are put on sale, wherein a direct reward and/or a link average reward may be set for each commodity; for each strike commodity, the reward may be distributed according to the prescribed amount (preferably digital currency) or distributed according a prescribed percentage of the sales price, when setting each reward.

In an embodiment, relevant sales rewards may be distributed only to a bound user. For those users entitled to relevant rewards but having not been bound yet, their rewards are pending. The operating system records the sum of all to-be-distributed rewards based on the List of Pending Sales Rewards: e.g., providing the aggregate undistributed, distributed, and pending rewards amounts under all orders of a certain commodity of a certain merchant within a certain period of time, and the number of users matching the pending rewards; for each order corresponding to the commodity, providing the order number, the originated system (other heterogeneous accessed operating system and its merchant), order time, closing user ID and username, covered population, as well as the number of persons having received the rewards, the amount and rewards of the commodity under the order, etc.

For merchant management of the operating system, when creating/editing the merchant, it is required to provide the merchant name (if it is required to be consistent with the company name registered in the business license, providing the registration number on the business license), short name of the merchant, the Globe grid to which the merchant belongs (i.e., Globe grid name, serial number, and name of the Globe grid owner, etc.), and merchant logo (concerned image may be uploaded). In an embodiment, for a merchant that has been bound to the unified mall, when editing the short name of the merchant, the page would also display its merchant ID in the unified mall and would not display if it is unavailable; moreover, for the merchant bound to the unified mall, after the short name of the merchant is modified, the modification would be synchronized to the unified mall. Besides, the unified mall is designed with a super merchant right to issue discount coupons to other merchants in a card form.

With the List of Merchants, the merchant ID, merchant short name, contact information, whether to be a super merchant, rewards balance (for distributing rewards), number of managers, Globe grid ID, Globe grid name, and collection two-dimensional code may be accessed, and operations such as edit are allowed with respect to the managers of respective merchants and relevant channels, and reload or cashing are also allowed with respect to the rewards points.

Discount coupon management of the operating system, for example, includes: when creating/editing the discount coupons corresponding to respective merchants, displaying the merchant name on the coupon face information, setting coupon color, coupon name and subtitle (for example, describing the specific discount, the service or commodity name corresponding to the coupon, etc.), the unit price of the discount coupon (e.g., specific amount of the digital currency of the present operating system corresponding to the coupon), valid term of the discount coupon (e.g., a fixed date, or the expired data after receipt and valid within a certain number of days after taking effect, etc.), specifying commodities associated with the coupon, and/or discount coupon of the unified mall that can be associated with the coupon, and specifying whether to allow the super merchant to distribute the discount coupon (if yes, the super merchant with corresponding rights may invoke the coupon in the card and distribute the coupon).

In the list of discount coupons, the discount coupons corresponding to respective merchants may be queried and managed, e.g., searching based on the merchant, the coupon name, and status. In the list, short names of merchants, coupon names, valid terms, statuses (to-be-distributed, being distributed, and expired, etc.), stock of the discount coupons, and whether to allow super users to launch, etc., respectively corresponding to a plurality of discount coupons may be managed.

When the merchant issues a card in a manner of benefits, in the corresponding card management page, the name of the card-issuing merchant, card name, number of holders, card issuance time, corresponding digital currency, etc. are displayed, and the discount coupons (corresponding merchants, coupon names and quantities) may be added or deleted; when the super merchants selects a discount coupon, it first selects a merchant, and then selects the coupon allowed to be launched by the super merchant under the selected merchant; those merchants without available coupons are not listed; when a non-super merchant selects a coupon, such merchant can only select itself, and cannot select other merchant. The merchant may present the benefits distribution records such as the merchant, the name and number of discount coupons via the list of benefits.

Regarding the statement management of the operating system, for example, the merchant digital currency corresponding to a merchant within a certain period of time is queried to present the amount of digital currency corresponding to the merchant's short name, such as the stored value, payment collection, coupon sale, on-sale products, donation, rewards, cashing, reload, coupon verification, commission, lottery, card refund, card benefits, and Globe grid, and further viewing of relevant information is supported. For example, providing the digital currency bill of a merchant, presenting the merchant's short name, digital currency balance, aggregate income and expense, and further presenting details (e.g., including date, amount, class, involved users, and notes of digital currency change, etc.) of each digital currency change based on classes (e.g., stored value of the digital currency, payment collection, cashing, reward, access route, date, etc.)

In addition, through the statement management, details of the user's digital currency may be queried to present the user's ID, nickname, username, digital currency balance, aggregate won or expended digital currency amount, and further presenting of details (e.g., including date, amount, class, involved merchants, and notes of digital currency change, etc.) of each digital currency change based on classes (e.g., stored value of the digital currency, payment collection, cashing, reward, access route, date, etc.) is supported.

As to the merchant's official WeChat account, the shared activities may be presented in the list of promotion effects, including the quantity of shared contents, reads of titles of respective promotion pages (quantity), sharing (quantity), and various functions currently owned by the promotion page, e.g., attend (quantity), discount coupon (quantity), donations (amount), sale (amount), lottery (amount), reload (amount), external chain (quantity), and commodity (quantity), etc. Furthermore, a corresponding button may be set to allow access to a Supporter List. In the Supporter List, the number of helpers who have shared and read the promotion page, and corresponding nickname/name/hid/headshot and like information are presented on different tab pages; for the sharers and/or readers, corresponding digital currency rewards may be set and distributed, which are distributed after the sharer and/or reader is bound to the operating system of the merchant.

In this example, the user needs to bind his mobile phone number before accessing the unified mall via the promotion page; with the mobile phone number as the unique user identifier for the multi-operating system backend in the unified mall (it is not limited to use other information to identify the user in other embodiments), the unified mall may record the correspondence relationships between respective operating system (industrial code server) users based on the identification information such as the mobile phone number.

Exemplarily, based on different releases in the service account and the enterprise account, different list controls may be set for corresponding promotion pages, e.g., the promotion page under the service account has functions such as Promotion Effect, My Attendance, My Reading, My globe grid, Promotion Square, Expense Records, etc., while the promotion page under the enterprise account has functions such as Promotion Effect, Rewards Summary, Collection Records, Commodity Order, Write-Off Records, and etc., which may be docked with the corresponding operating system and the industrial code server to access data information related to these functions.

After accessing the user's personal page via the promotion page, mobile phone binding (entering name, mobile phone number, and sending a verification code, etc.); the user who has completed binding at the operating system (industrial code server) corresponding to the promotion page or at the unified mall, the name and mobile phone number information may be directly displayed; if it is compatible with a social platform such as WeChat, it may simultaneously autonomously invoke the information such as the user's headshot and nickname on the platform to update them on the page. The user may view the digital currency balance in his account, and for the details of digital currency, expense records, promotion rewards, cash refund records, order information, and address management, etc., they may be queried or managed by clicking corresponding buttons to jump to respective pages corresponding to the user in the uniform mall.

Hereinafter, an example of applying the Globe grid to the heterogeneous access route and the uniform mall mode is introduced.

Theoretically, a uniform mall may be docked to a plurality of industrial code servers; there can be numerous residing merchants under each industrial code server, numerous kinds of commodities may be put on sale under each commodity, while each commodity may simultaneously have numerous channels; the operating system facilitates an omni-channel management.

In this example, each merchant corresponds to a Globe grid, while the operator of the merchant corresponds to the owner of the Globe grid (i.e., Globe grid partner); then, the Globe grid owner may benefit from each transaction (e.g., sale of a commodity under the merchant) (in the case that the owner of the commodity is different from the Globe grid owner, the benefit includes a commission distributed by the owner of the commodity). Moreover, the Globe grid owner may benefit from each transaction of the merchant facilitated based on the heterogeneous access mode: for example, the user is redirected to access an on-sale product B corresponding to a further industrial code server via the merchant of Globe grid A or a page of a commodity under the merchant (the commodities of two merchants are presented in different sectors of the unified mall, such that redirected access is needed); when the user completes purchase of commodity B, the merchant of commodity B will grant a specific percentage of rewards (drive-traffic performance) to Globe grid A according to rules, i.e., Globe grid A has a value of drive traffic entry and is entitled to a transaction commission according to the performance.

If the user accesses the merchant of Globe grid A via a promotion channel corresponding to Globe grid A and is then redirected to purchase commodity B, each link on the promotion channel or the corresponding dissemination link may share the rewards (FIG. 13a); and the merchant of Globe grid A may manage the promotion and transaction effect of different channels through the operation system. The industrial code server manages the frontend sharing and dissemination, records the dissemination chain, and accesses the "unified mall" when an order is placed; respective industrial code servers actually access the unified mall from different "paths," and the accessing "dissemination chain" when purchasing commodities in the mall are also recorded; therefore, it may be set that each link in the dissemination chain is granted "transaction commission, purchase rewards" (e.g., "link average+direct rewards").

In the exemplary hierarchical relationship, as shown in FIG. 12, an industrial code server has a plurality of general dealers, under each general dealer are a plurality of second-tier dealers, while under each second-tier sealers are a plurality of merchants; each merchant has its own Globe grid, and under the merchant are commodities. For example, it may be agreed that for the benefits achieved by a Globe grid based on its own transaction and/or a facilitated transaction, one or more of the upper second-tier dealer, general dealer, operator of the industrial code server, and operator of the unified mall, may obtain proportional commissions (or it may be agreed that they have no commissions).

The product two-dimensional code corresponding to the commodity of the merchant of Globe grid A, and the promotion codes of various promotion channels and the dissemination chain of the merchant of Globe grid A belong to Globe grid codes. Relevant concepts of the Globe grid and the Globe grid code may further refer to other embodiments of the present disclosure. The industrial code server determines the criteria for distributing the corresponding Globe grids and controls the quantity of distributed Globe grids; it may also uniformly manage issuance of Globe grid codes of the affiliated merchants. Or, further exemplarily, a plurality of industrial code servers correspond to a core server of the uniform code issuance management center; the distribution of corresponding Globe grids code of various industrial code servers is known to, controlled, and managed by the core server. The Globe grids code of various industrial code servers may serve as subversions; and the core server further distributes a global Globe grid coding medium which corresponds to the Globe grid of respective industrial code server so as to share the profits from matters corresponding to respective industrial code servers. The transaction and transfer of Globe grid codes (corresponding to the special goods drawing rights) corresponding to the industrial code servers are uniformly managed via the server of the Code-Chain digital assets exchange.

Besides determining the distribution quantity of Globe grid for an electronic merchant at a virtual e-commerce platform, the industrial code server may also determine the distribution quantity of the Globe grids in the real world for example by region; exemplarily, the Globe grid distribution of industrial codes is differentiated and registered based on the physical stores (e.g., the corresponding building number) and shelves (e.g., the owners of the shelves may be different from those of the stores), while the earnings are also matched to the real stores/building numbers or shelves, which better reflects "science serves real economy" and thus facilitates revitalizing and quantizing the physical world resources in real economy, e.g., stores, city portals, traffic, shop assistants, and outdoor media, etc. Because an owner of the Globe grid (corresponding to the operator of a physical store or shelf) may not only voluntarily promote a Globe grid product by himself, but also may mobilize his buddies to promote together, such that the promotion performance of the Globe grid is more identifiable, corresponding to easily running a store (realizing cross operation); whole for the products associated with respective Globe grids, they find a free and diligent promotion partner (the owner of the Globe grid and its promotion channel). This pattern may revitalize social idle resources, e.g., every "physical world grid" (Globe grid) including idle booths in stores, desktop exhibition stands of fast-food restaurants, community property, back seats of high-speed trains, exhibition site of tour guider's breast plates, blank areas of posters, body or tail of each We Media article, can be likely revitalized, and every person can conveniently participate in this pattern, thereby promoting employment and driving domestic demands.

With community property as an example, if the "community X" is regarded as store X, access to the product/service promoted by community X via the unified mall is regarded as a commodity resided in the store (to obtain a two-dimensional code that may be associated with a value chain); the store corresponds to the Globe grid, the Globe grid owner corresponding to the operator of the store refers to the property management company of the community, and a proportion of the annual transaction amount of the community (store)/commodities is deducted as the Globe grid earnings. Each security guard in the community is assumed as a "promotion channel" who can access the promotion code associated with respective value chains, and the property management company of each community may manage promotions from different channels and the transaction effects via the operating management system. The effect of cross marketing lies in that: a resident accesses the unified mall via the two-dimensional code link of commodity A provided by security guard A and purchases commodity A; the security guard A's direct contribution may generate a value (promotion earnings); while the resident accesses the unified mall from commodity A to purchase product B from another store; based on the promotion reward (e.g., B %) of commodity B, the store to which commodity A belongs (i.e., the property management company of the community and security guard A) may share the earning B % from the drive traffic, reflecting the principle of "distribution by performance, more earnings from better performance."

A case of implementing the "share chain" promotion mode of unified mall access is sharing via promotion page: meta code; i.e., the original code of specific merchant 1 of the server is represented by code0:

$$(code0+ID1)=code1, ID2 \Rightarrow (code1+ID2)=code2, ID3;$$

where +IDX represents superimposition of the ID of relevant user X at each dissemination, wherein the users propagate with new promotion page (corresponding to the new code Codex), respectively. The above example indicates that the promotion page reaches user ID3.

After user ID2 and user ID3 access the mall, respectively, the recorded chain information is correspondingly expressed as:

$$(code0+ID11)=code1, ID12 \Rightarrow (code1+ID12)=code12, ID13;$$

where if user ID3 accesses the mall (Mall Commodities details page A) via the promotion page A, the following parameter is automatically substituted, "code11+ID12)=code12, ID13," if user ID3 purchases commodity A in the mall, the purchase behavior may be traced back to ID2 and ID1, who are entitled to the rewards/transaction commissions of commodity A (see FIG. 13a).

Figure 13B:
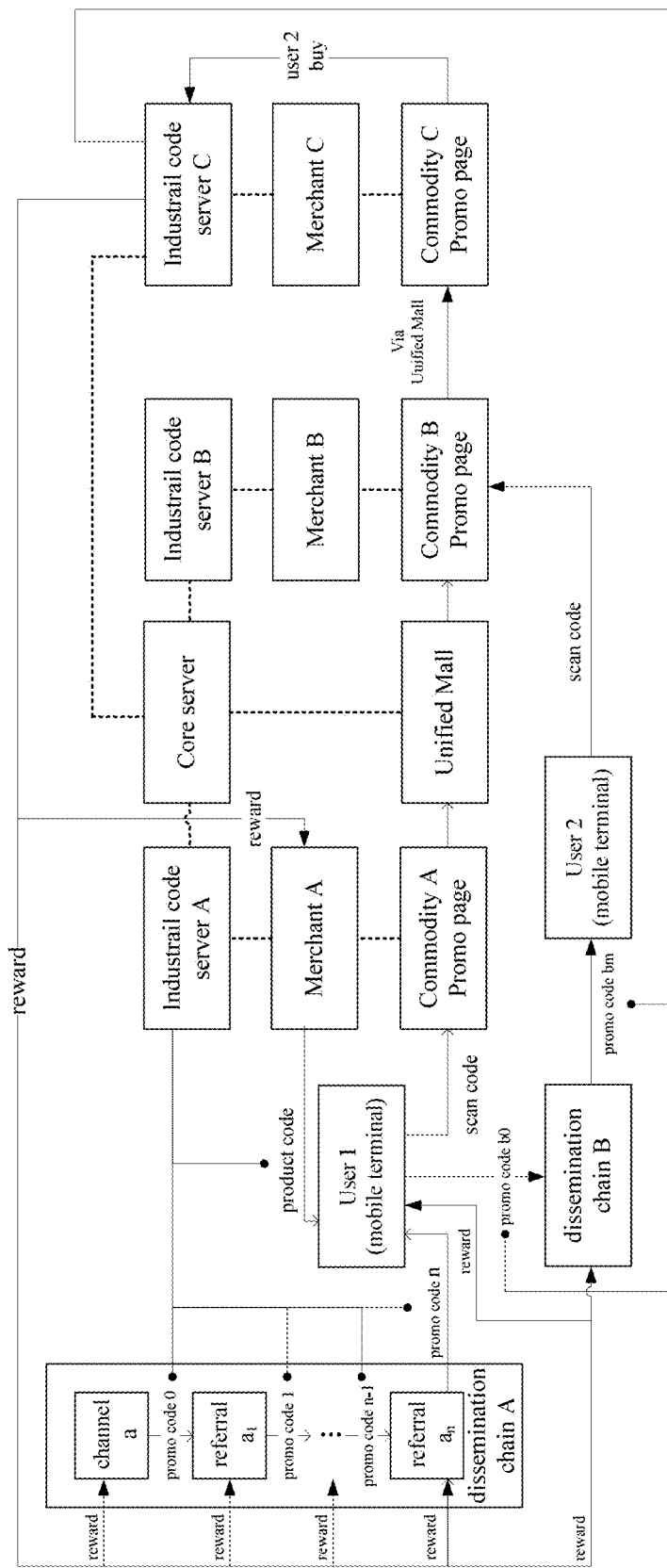

If user ID3 clicks commodity B in the mall, he is redirected to the details page of commodity B corresponding to another industrial code server (also with the parameter "(code11+ID12)=code12, ID13" substituted); meanwhile, when the further generated promotion page of commodity B (also with the parameter "(code11+ID12)=code12, ID13" substituted) is shared to user ID4, if user ID4 clicks the promotion page B to access the Commodity Details B and purchase the commodity B, the dissemination chain linking ID4, ID3, ID2, and ID1 may be traced, and the rewards may be granted to ID3, ID2, and ID1 (see FIG. 13b).

The above case embodies a new generation of "mass entrepreneurship and innovation e-commerce": for example, for ID1 and ID2 (and ID3 referring ID4), they needn't manage commodities and inventories by themselves, and they can share the earnings brought by the circulation and dissemination value chain from their promotion work.

Hereinafter, a mode of accessing the unified mall to realize "mass entrepreneurship and innovation e-commerce" will be introduced:

Exemplarily, supposing in the dissemination chain A, the mall page of commodity A is accessed and the mall page of commodity B is accessed (information containing the dissemination chain A is substituted, which information may be recorded) via the unified mall (where commodities A, B, and C are located in different sectors of the mall) to promote commodity B (the generated promotion page and/or corresponding promotion code may be associated to the information containing the dissemination chain A and the information of the current spreader), then when consumer X purchase commodity B based on the promotion, the dissemination chain A is also entitled to earnings; further, if the consumer X accesses the unified mall via commodity B and purchases any commodity, the dissemination chain A also shares the earnings;

wherein if the dissemination chain A only includes the information of user A (preferably a digital human being), then the user A is entitled to the earnings from all purchases after the others access the whole mall via the dissemination chain A; in this way, user A will have the motivation to distribute the appropriate commodity promotion page contents and the two-dimensional code of commodities A, B, C, D, containing his own dissemination chain A at places where the others may access, e.g., printing these two dimensional codes and sticking them on the show windows of physical stores, on coffee tables, or propagating on the social network.

Meanwhile, another manner is to integrate and aggregate the product two-dimensional codes corresponding to the products ABCD to generate for example one aggregation code (My Referral "Code"), corresponding to an aggregation promotion page that may be associated to the respective promotion pages (or the product two-dimensional code) of the merchants A, B, C, D or the detailed page of the mall; the exemplary aggregate promotion page may label the promotion pages of the commodities ABCD selected by the user A and be presented in the form of "Promo Page Read/Promotion Records" on the user's personal page; an aggregate promo code corresponding to the aggregate promo page (associated with the promo pages or product codes of the commodities ABCD) is generated based on user A's request, so as to promote the aggregate promo page via various channels such as user A's We Media official account, Weibo account, etc. A mini program may be accessed upon code scanning (e.g., a program loaded to the ROM of the mobile terminal to run) to present the aggregate promo page information corresponding to the aggregate promo code and support access to the respective promo pages of associated commodities ABCD or the respective detailed pages of the commodities ABCD in the mall. The aggregate promo codes, aggregate promo pages and mini programs may be operated and managed by exemplarily a structure of crossing multiple industrial code servers, e.g., the operator of the unified mall or a third party designated thereby, or by an independent organization (whose backend is docked to the backend server of the unified mall or docked to the industrial code server of the aggregated commodities/the operating platforms of the merchants), but not limited thereto.

A similar manner may be a labeling operation such as "liking" the detailed pages or promo pages of respective commodities (cross multiple industrial code servers) viewed by user A in the unified mall; the backend may create a list of (selected) "like" records of the user, facilitating the user to share the list, such that when another person clicks the share (in various forms of page/link/two-dimensional code), he may see the list of promo pages liked by user A and then may access to the corresponding promo pages or detailed pages of various commodities in the list. Further, an aggregation two-dimensional code may be created for the list; for example, a "My Likes" button is added to the "Promo Page," such that the user A dynamically update its "List of Likes" by clicking this button (share of the list may be embedded in a promo page of a setting button, i.e., the content obtained by each person accessing this button is superimposed based on personal dynamic).

In the above mode, under the precondition of "Code-Chain" access, the omni-channel (offline-online integrated link) access, dissemination, use, and recording of the Code-Chain are implemented with a specific 5 W (time-space expression of IoT) as the "start point" based on a specific theme (e.g., with the tourism assets digitalization of a certain region as the start point, covering food, boarding, trip, sightseeing, shopping, and entertaining around the tour). It not only forms a traceable "meta code/source two-dimensional code" (access grid of IoT world), but also generates and superimposes "a new two-dimensional code and/or hyperlink of the accessing digital human being" over the original two-dimensional code through the "two-dimensional code one scan" and "Moment tapping" of the social network, thereby constructing a new "digital human being new economy" system, which enables quantization and tracking of "the contribution degree of each link of circulation dissemination" and implementing "capitalization of the advertisement investment, valuation of circulation dissemination." In this way, a new mode of "digital human being economics" is formed.

Further, it may be prescribed that all purchases of a commodity in the region defined by the Globe grid are recorded as the earnings of the Globe grid according to a certain proportion. The location where the user/consumer first enters or accesses the mall for consumption serves as the home location of the user (the mobile phone number first subscribed may serve as the identification information corresponding to the user, i.e., irrespective of whether the tourist is at home, in other area, or at abroad, it is always regarded as the subscriber of the home server); later, the user accesses from other place and consumes at the mall corresponding to the industrial code server (and expanded to further industrial code server, computed according to the subscription time rule), which is regarded as "roaming" of the Globe grid; different earning recording proportions and/or commission distribution proportions for home location consumption and roaming consumption. Then, the local resident consumption, the outside tourists' consumption in the local place, and local residents' consumption in other areas can all be recorded. In this way, local merchants will be motivated to open/franchise (to become a merchant of the IoT mall or a client of promo page). All codes (information like digital human being identifications, time, and locations of various parties may be superimposed in the code information when necessary) are managed under IoT localization, such that all consumptions are whole-process traceable to each time-space point.

Although the various industrial code servers might not be directly connected therebetween, the CodeChain digital assets transaction platform (which will be detailed later) established at a higher level enables exchange of the digital currencies issued by different industrial code servers via SGR (special goods drawing rights), thereby forming interconnection. In this way, assets digitalized payments and e-commerce service applications (not limited thereto) may be constructed based on the CodeChain.

Figure 14:
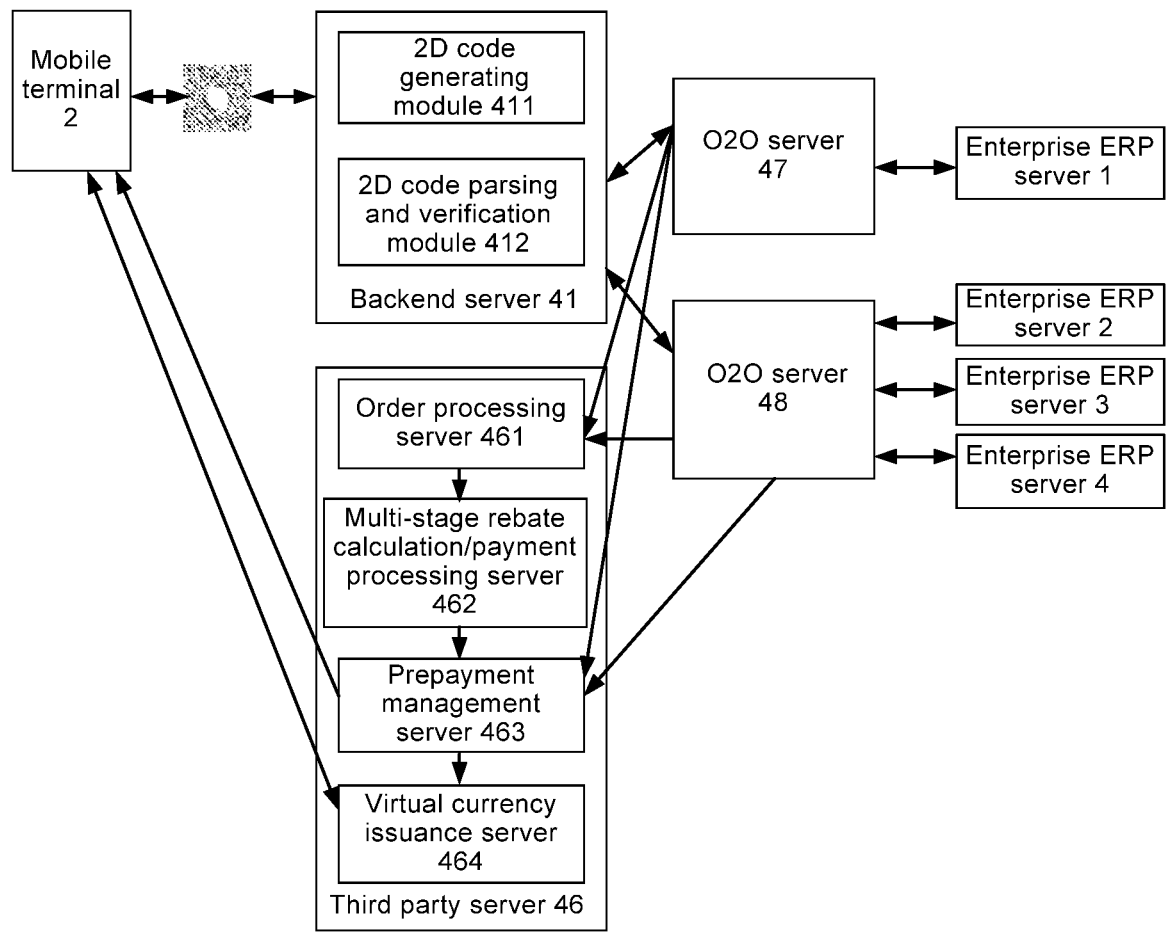
FIG. 14 is a schematic diagram with an O2O server as the industrial code server.

Hereinafter, an extended example of digital currency of unified mall (a digital currency generation mechanism based on production and sale of real objects) will be introduced, referring to FIG. 14. Supposing an enterprise already has an enterprise ERP server 1-4 (which realizes the whole process of procurement—production-sale-financial cost auditing and management), a highest cost-effectiveness may be achieved with a P4P mode. O2O server 47 and O2O server 48 are interfaces for the enterprise ERP server 1-4 to the backend server 41 and a third-party server 46. The O2O servers generally comprise a commodity synchronization interface configured to synchronize the commodity date provided by the merchant enterprise to the backend server 41; a commodity query interface configured to read commodity information for the mobile terminal 2 to query; an order generation interface configured to transmit order information to the enterprise ERP server after an order is placed at the mobile terminal 2; an order query interface configured to read the order information for the mobile terminal 2 to query; and a functional interface configured to transmit other (e.g., transaction) functional data of the mobile terminal 2 to the enterprise ERP server and feed back to the mobile terminal 2.

The O2O server 47 (independently owned by one enterprise) only supports one enterprise ERP server 1; the O2O server 48 is a third-party O2O server which supports a plurality of enterprise EPR servers (docked to the enterprise EPR server 2-4 in this example) via a cloud service. The O2O servers 47, 48 shown in the figure are two implementation solutions corresponding to the "industrial code server" of the same industry under the unified mall mode, which are generally used alternatively (not referring to the respective industry code servers of two different industries under the unified mall model).

The unified mall is a new unified access server (not shown), which uses a uniform two-dimensional code generation and parsing rule (i.e., a plurality of servers use a uniform code issuance management rule) and maintains interconnected with the O2O server 47 (or the O2O server 48) of each industry, thereby accessing all ERPs docked to various O2O servers to the same unified mall. The enterprise submits the advertising/marketing/commission fees to the "multi-tier rebate platform" of the third-party server 46 according to a percentage of its sales (i.e., the enterprise digitally quantizes a percentage of the to-be-sold goods into a digital currency, guaranteed by the enterprise credit); then each consumer is distributed by the platform according to the P4P mode based on their performance (the rewards may be based on the behaviors of the lower-tier consumers affected by scanning, forwarding, purchasing, and sharing). This may help the enterprise to establish a dynamic multi-tier marketing network, and finally obtains sales orders (the advertising network becomes sales outlets) while advertising for promotion and marketing (as long as a consumer scans and forwards the two-dimensional code via a mobile terminal, he becomes a member of the enterprise's marketing network; thus, the enterprise's advertising and marketing fees can be theoretically "capitalized" (a sales channel based on releasing a to-be-scanned two-dimensional code), which can be re-used, quantized, and assess the KPI); as such, the "sales outlets" may be regarded as real economy embodied by individual "Globe grids."

When a plurality of real-economy enterprises select this mode, one enterprise (e.g., a World Top 500 Manufacturer enterprise) may be regarded as an industrial code server; or, a plurality of enterprises of the same kind reside in a xx industrial code server, while a plurality of industrial code servers including the above two manners form links, thereby forming a "digital currency" alliance chain, i.e., the percentages of sales revenues/sales expectations extracted by a plurality of enterprises (embodied in a smart contract) are deposited in the "multi-tier rebate platform" of the third-party server 46 (the blockchain technology may be leveraged such that each server becomes a node of the alliance chain, realizing fusion between CodeChain and blockchain: the server 46 may manage the digital currency quota of individual industrial code servers, such that mutual exchange and settlement between respective parties may be done via SGR). This platform may issue "New Currency Matrix," implemented following the "Barter of Equivalents" principle. The basis for issuing the "New Currency Matrix" is the percentage of the sales amount/sales expectation extracted by the plurality of enterprises.

The emergence of "New Currency Matrix" exactly follows the "Barter of Equivalents" principle in Marxism, and is thus superior to all current sovereign currency issuance mechanisms. As the "New Currency Matrix" exactly follows "Real Economy Scale, Barter of Equivalents" principle, it becomes "an ideal super sovereign currency." The "New Currency Matrix" supports domestic transaction as well as a possibility of international transaction. The issuance mechanism of "super sovereign currency" is significant for a nation with real-economy advantages to break loose from over-issued currencies of other nations.

The issuance of the "New Currency Matrix" relies on a consensus in the alliance chain formed by respective nodes, wherein the total issuance amount and the quota of individual servers are determined by the unified code issuance center. If to analog with the note issuance of a central bank, the unified code issuance center is analogous to M0 issuance of the central bank; in this case, the industrial code server of each node is analogous to a commercial bank, which not only contributes an amount to the alliance chain, but also has the qualification to distribute this quota, except that each transaction, even attribute change of each digital currency wallet purse owned by each industrial code-based digital human being, will be recorded by the industrial code server and supervised and managed by the unified code issuance center, thereby implementing a mechanism that the data are private to individuals, but the consensus is shared across the network.

The New Currency SGR may be applied to offline real economy. The merchants defined in the O2O server (industrial code server) may open a "merchant assistant" in the system to generate a "merchant collection two-dimensional code"; then, use of "New Currency SGR" in the real economy is implemented by "code-scanning payment"; besides, the New Currency SGR may also be used in the unified mall; in this way, compared with "Bitcoin" which can only survive in the "virtual Internet world," the New Currency SGR is hugely more advantageous and practical.

Although the unified mall seems to be centralized (unified management), the "unified mall" does not have its own centralized entry, e.g., APP, or official account, or access via webpage; instead, it is accessed via individual value chains/two-dimensional codes issued by various "industrial code servers" by code scanning or hyperlink.

Hereinafter, an embodiment of implementing access to the unified mall via "real-economy purchase" will be described, in which an issuance mechanism of digital currency CCC of the "super sovereign current SGR" via Sharing and Propagation Create Value and sharing to mine based on the real-economy sales scale. Compared with mining of current encrypted digital currency, the code scanning/sharing under the unified mall mode embodies the value chain via dissemination; the whole human society shares, propagates, and creates value (the things significant to the human society, not power consumption from the machines of encrypted digital currency) via code-scanning access (light instead of electricity), and the value may be quantized. The anchor underlying the logic of Libra is a package of currencies, an "anchor without a real object."

The logic underlying the special goods drawing rights SGR in the present disclosure is based on "the human society's control of property rights" and is recreated and embodied through sharing: (mining)+real-object assets reservation (also including the nod server, i.e., the performance capability of the industrial code); the SGR embodies and covers daily consumption and daily activities (excluding financial speculation activities) of the human society, even including arts and creative writing.

With the 1-billion code-scanning population in China as an example, the aggregate retail revenues of social consumer goods in 2018 are expected to exceed RMB 40000 billion (while for code-scanning payment, nearly RMB 200,000 billion). Seen from the current statistical data of small-sample value chain mall (due to lack of omni-channel omni-scene access), 5%~10% of the reading can be converted to a purchase of RMB 1; 20%~30% of sharing can be converted to a purchase of RMB 1; further, by excluding bulk durable goods such as house, vehicle, and luxury products, the statistics corresponds to daily consumptions of mainly clothes, foods, and daily products, i.e., corresponding to the indusial segments corresponding to 3000 industrial codes; the number of times of reading (code-scanning access)/shared disseminations corresponding to the aggregate consumption amount in that year may be regarded as an anchor basis for a "stable currency" to the whole society.

In cases of fusing the all-product omni-channel omniscene accesses, it may be derived that if the e-commerce consumption amounts to 10% of the RMB 40000 billion in 2018, it should correspond to 40000 billion of times of reading and 10000 billion of sharing, thereby obtaining the SGR as the anchor of the stable currency, i.e., the "corresponding proportional relationship of the sharing as mining" corresponding to the consumption of 1 billion people.

The 40000 billion times of reading+10000 billion times sharing are distributed among 3000 industrial code server platforms, approximately 10 billion times for each industrial code server platform; we convert 100 times (not an arithmetic number defined by an algorithm, but calculated based on the number of times of labor of each individual in the real world) to 1CCC (Code Chain Certification), deriving that each industrial code server is authorized to distribute 0.1 billion CCCs. However, according to the distribution by performance principle of aggregating the manufacturer, consumer, dealer, and service provider into one code, the dealer participating in sharing (i.e., mining) obtains the CCC, i.e., the earnings from sharing the "industrial code" (corresponding to the earnings rights).

Then, for the 3000 industrial codes, it is proposed to issue 300 billion CCCs (SGRs) each year as the standard currency measuring unit/volume) in the digital economy ecological system, approximate to generating a sales revenue of RMB 100 for each time per reading and sharing, mining out one CCC; this is different from the measuring unit of one bitcoin as the quantization of consumption of computing power and electricity for each solution of an equation in blockchain bitcoin; CCC is different from the silicon-based civilization that relies on machines and robots, CCC is a mechanism totally based on human+society, which is a human-oriented digitalized management mechanism for human civilization.

The CCC increases with economy and consumption, corresponding to real objects and consumption activities. Therefore, it may avoid production waste and hyperinflation; more importantly, it corresponds to the real economy, avoiding explosion of global financial crisis and solving current economic difficulties. It further embodies the human-oriented oriental management thought.

3000 industrial codes (becoming the exclusive authorized operator in the industrial segment to integrate the upstream and downstream enterprises in the industrial segment across the country, including its own membership management system and digital currency system, etc.) in 300 cities are laid out across the country via the CodeChain digital economy "digital human being cloud platform" server. Each industrial code server has its own digital currency, which may be interconnected with the digital currencies of other servers by exchanging SGRs and may be used for purchasing and consuming in offline stores and online malls, thereby becoming a general digital currency.

There is no centralized entry for accessing the unified mall; instead, the access must go through advertising outlets, commodity exhibition, and personal dissemination for the value chain two-dimensional codes defined and issued by individual industrial code servers, wherein scanning code/ sharing is equivalent to mining (a theory that the value chain embodies circulation and dissemination of residual values); a single product is accessed via a value chain, (clicking)/ two-dimensional code A (scanning code) issued by an individual industrial code server, and then accessing the whole unified mall; if a purchase is completed, the value chain (clicking)/two-dimensional code A (scanning code) is entitled to a transaction commission (the rewards per se may be the digital currency of the server).

Regarding the digital currency quota is determined in the manner of alliance chain of the blockchain, where 100 servers become 100 nodes; bookkeeping is carried out between nodes and in the quota general ledger of managing code issuing, by pledging property rights or "guarantee of delivery rights of the industrial code server, i.e., special goods drawing rights SGR."

As each industrial code server is exclusive in the industrial segment, the upper limit of residing merchants may be set not to exceed 100,000, wherein each merchant is a "Globe grid"; 100 merchants correspond to 100 billion Globe grids; each Globe grid may be accessed and propagated via the value chain to create value (completing the transaction commission of uniform mall access, its own commodity and cross-marketed commodity).

Interconnection between different industrial code servers (digital human being cloud platforms) may be implemented through management of the unified mall (uniform code issuance, uniform digital currency quota); not only bartering, but also different digital currencies (platform tokens) of the different industrial codes may be exchanged via the unified mall.

Figure 15:
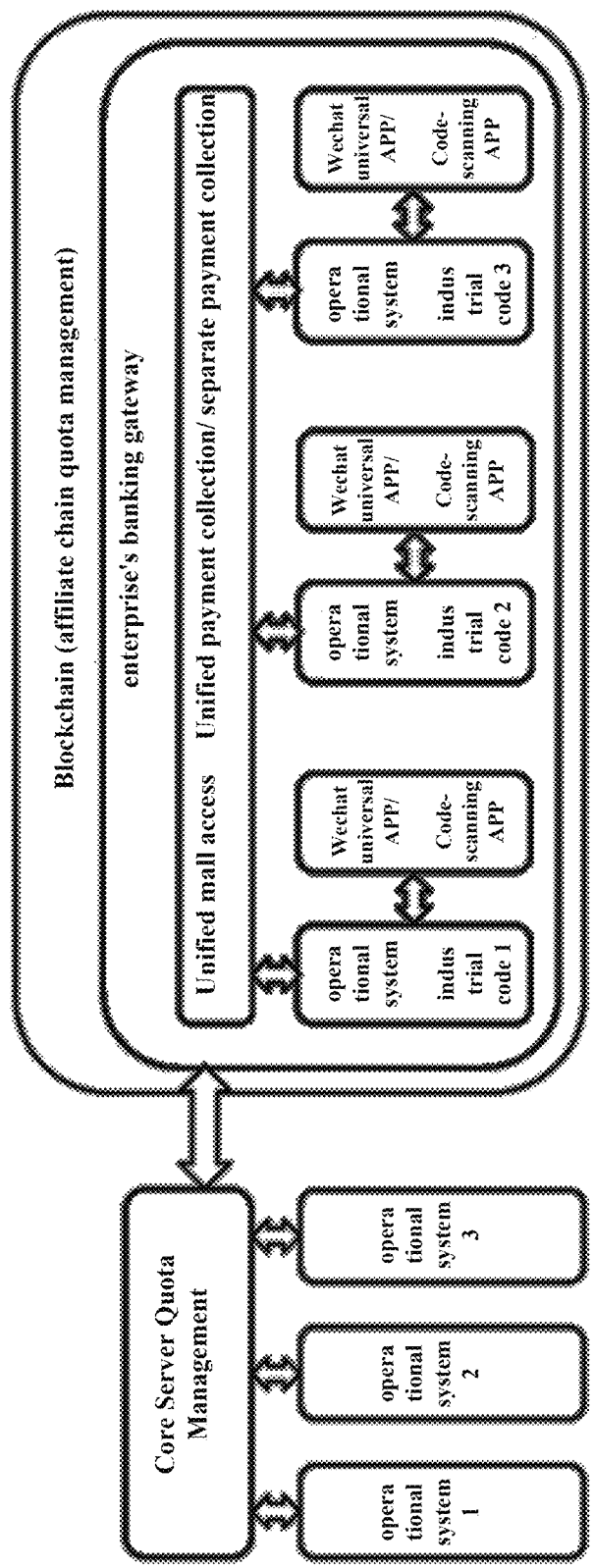
FIG. 15 is a schematic diagram of fusion of core server quota management with blockchain.
Figure 16:
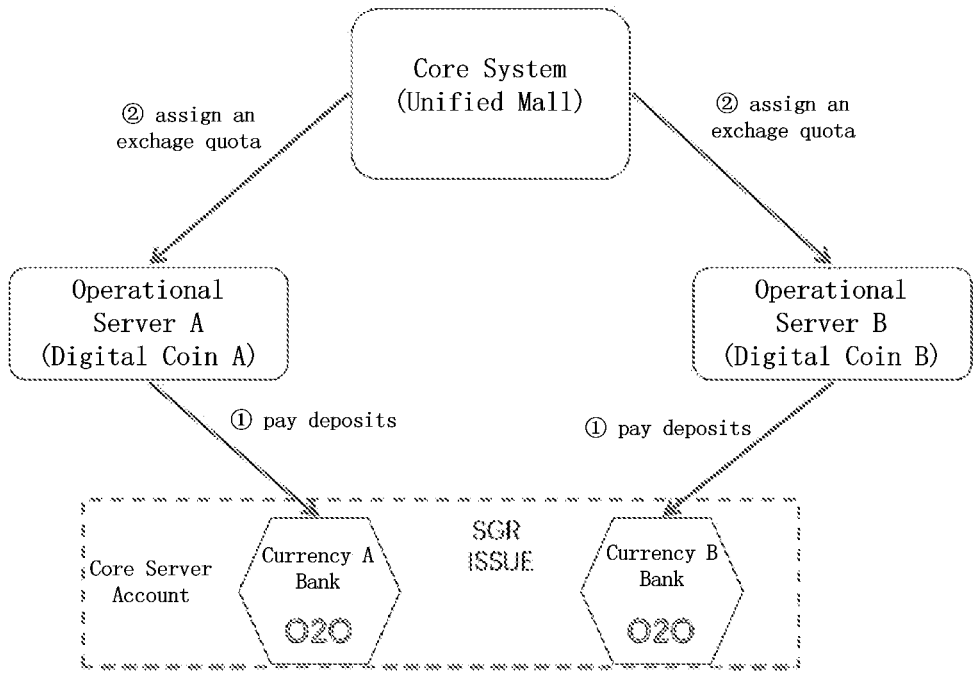
FIG. 16 is a schematic diagram of obtaining an exchange quota for SGR.
Figure 17:
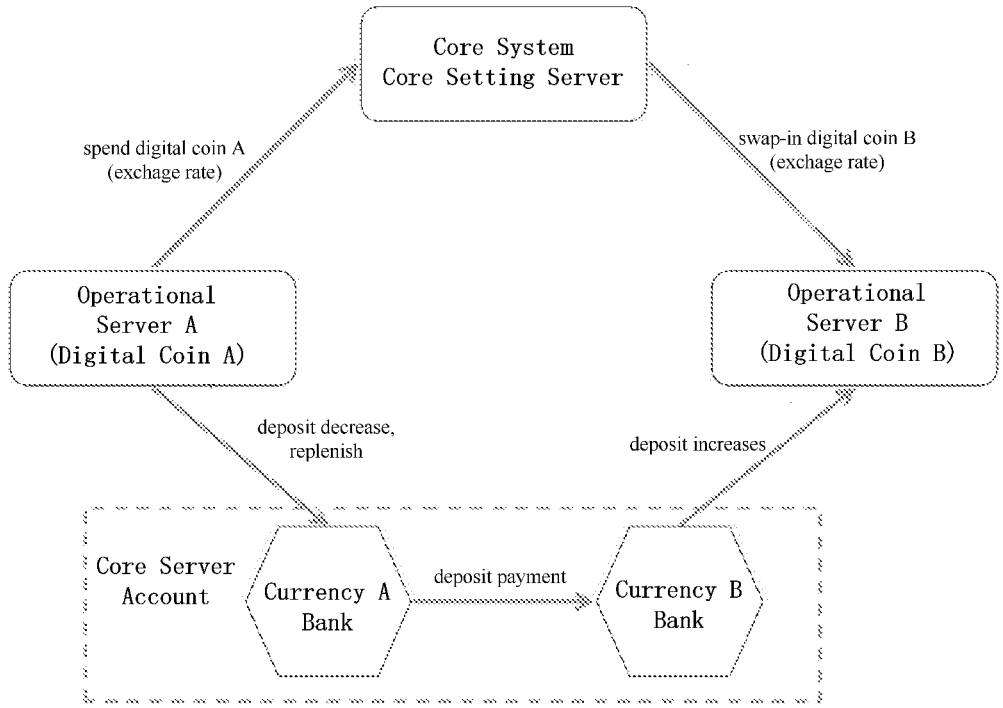
FIG. 17 is a schematic diagram of using a digital currency to exchange for SGR.

As shown in FIGS. 15~17, the core server (unified mall) and respective operating systems (industrial code servers) may confirm their respective quota via blockchain (e.g., in the manner of allied chain) and reach a consensus on the quota, such that the digital currency A of the industrial code server A may be exchanged to the digital currency B of the industrial code server B via the unified mall, Then, it can be consumed arbitrarily on server B; the exchange rate and exchange quota are managed with reference to FIGS. 16 and 17, wherein the exchange rate is adjusted in real time, and the quota is uniformly controlled; the merchants of respective industrial code servers have corresponding accounts in the core server, which are all deposited with a security fund, and the core server of the unified mall will grant them a corresponding exchange quota. When the SGR exchanged from digital A of server A is used in server B, the server A pays digital currency A, and the core settlement server of the unified mall exchanges it to digital currency B according to the exchange rate and debits it to server B; then the security fund in the account at server A is paid to the account at server B.

Based on the above mode, the servers of different industries in different regions may join the unified mall system. A larger-scale application is as such: for example, each industrial code server corresponds to the central bank of respective nations, which can issue their own digital currency (analogous to platform tokens) or uniformly exchange its own national digital currency into special goods drawing rights SGR; in cases of cross-border transaction, the merchants supported by the settlement bank may use the "digital currency of their own server" and "SGR."

Traditionally, the payment service refers to providing clients with collection and payment services for transaction-specific money. In China, the traditional payment service requires a payment license; in the electronic payment era, because collection and payment can already be implemented in real-time over the network, a so-called fourth-party integrated payment (i.e., the information service in the payment field) emerges. The fourth-party integrated payment does not involve control of money, just practice information transmission services between the client and the financial institution, which can provide more satisfactory and elaborate payment services to the clients while avoiding the qualification issue. The CodeChain technology may provide a most effective technical warranty for the payment service.

The electronic virtual asset (asset digitalization) is a new thing. Because it may be used as payment instrument (analogous to currency) in actual use, the electronic virtual asset is always confused with the currency, thereby generating some wrong concepts and ideas. The most typical electronic virtual asset is the single-purpose prepaid card. In order to reduce the operation cost, particularly the capital cost pressure, the merchant adopts a way of collecting pre-payment from the customers, i.e., first collecting cashes from customers and then delivering services based on customer demands. When the merchant collects pre-payment from the customers, it actually sells a customer service contract, which capitalizes this contract, such that the contract may be regarded as an electronic virtual asset. Supposing that the unit of the single-purpose pre-paid card is "point," the customer returns the number of points of the contract to the service provider while delivering the service.

Typical use flow of the single-purpose pre-paid card: first, the customer purchases the pre-paid card to obtain a number of points, and the regulatory institution extracts 20%~40% of the cash for preventing the merchant from evading fulfillment of the service contract; second, the merchant extracts the cash for improving services and stocking etc., which first pays costs; third, the customer comes to the merchant to consume and pays with a number of points, wherein the merchant delivers the service and determines its sales amount.

In the flow above, the first step is a payment process, wherein the customer pays money to obtain an electronic contract. The second step also involves payment; the merchant pays the money for improving services to its service provider. The third step is a bartering process, wherein the service is exchanged with an electronic contract; besides, it is also a process like payment.

Hereinafter, some variations in the flow are further analyzed. If the customer does not want the services after buying the pre-paid card, a traditional approach is that the customer has to go to the merchant for refund; in this case, because the merchant has paid the cost, this refunding activity would cause business difficulties to the merchant, thereby affecting services delivered to other customers. Therefore, an exchange service is designed. In other words, the customer does not pursue refund from the merchant, but sells the electronic contract of merchant A on the market to exchange for an electronic contact of his need, e.g., Merchant B's electronic contract. A typical example is Points Mall. Because the electronic contract has a price, this process also involves payment or quasi-payment.

The CodeChain digital capitalization based on a consumption smart contract includes the following contents:
1) using the "smart contract" to lock down a real right, wherein the unit of "measurement" of the contract is an individual "CodeChain two-dimensional code/CodeChain digital currency," i.e., a smart contract based on control of real right, simply referred to as a "special goods_drawing right" ("SGR") (which is universal in the industrial code servers and the franchising systems); each code may have another unit of "price."

A preferred example is that relevant information of the CodeChain two-dimensional code and its changes are all recorded and managed by a uniform institution. Based on different coding rule settings, relevant information of the CodeChain two-dimensional code may be directly obtained by identifying the CodeChain two dimensional code, or what is identified is the jump address directed to the server of the CodeChain management institution, and then the relevant information of the CodeChain two-dimensional code may be obtained via interaction with the server (some examples of the relevant information will be provided infra).

2) "one-time subscription" (a minimum sales policy may be formulated for the consumer's first-time charge) for the CodeChain two-dimensional code corresponding to the SGR is made over the "CodeChain digital human being platform" of the issuer (e.g., an issuance and presentation manner with the tourism resources of an area as the anchor), which is similar to the primary market of stock issuance. The CodeChain management institution (code issuance management center) binds the CodeChain two-dimensional code with the digital human being ID (also including 5 W information, Globe grid information) of the subscriber and records relevant subscription information during the whole process.

3) during the issuing process, the dissemination chain may be recorded via a CodeChain two-dimensional code; and "consumers with social humanistic care innovation" may be discovered and encouraged through 5 w, superimposed with additional value (including highlighting the 5 W information) based on the smart contract, thereby imparting a more humanistic additional value to the SGR; the additional information (e.g., records, comments, recommendations, etc.) provided by the disseminator for the CodeChain two-dimensional code and its corresponding SGR and/or the digital human being ID of the disseminator may be superimposed over the CodeChain two-dimensional code.

4) the one-time issued CodeChain two-dimensional code (the SGR of the smart contract of a specific server has been bound to the digital human being ID account) may be listed in a higher-level server (the "secondary market, i.e., CodeChain digital asset exchange,") which is a facilitated trade mode (which may be a bidding manner) to obtain liquidity premiums; for example, by seeking confirmation from various parties (exchange, transaction parties, industrial code server, digital bank, etc.), a CodeChain two-dimensional code that has a successful transaction history between digital human beings is confirmed, and the CodeChain management institution will accordingly adjust the binding information between the CodeChain two-dimensional code and the new digital human being ID and record corresponding transaction information.

5) for the actual consumption, CodeChain access-based two-dimensional code order and two-dimensional code write-off (offline code scan payment is equivalent to completing one time of smart contract consumption, providing the agreed goods or services, i.e., write-off; from the perspective of the consumer, the write-off is analogous to payment) may be completed via the CodeChain two-dimensional code payment system, such that the operation cost is effectively reduced via the CodeChain integral information technical means. If it has been confirmed to various parties that the CodeChain two-dimensional code has been written off, the CodeChain management institution will record it.

6) further, when the CodeChain two-dimensional code corresponding to this "special goods_drawing right" enables consumption transaction in more CodeChain franchisers, it may be further exchanged into the "SGR of further industrial code server" through "Code Chain Digital Asset Exchange", such that, for example, xx_COIN/xx_MATRIX may be used as a universal "CodeChain digital currency" (because it may realize enough bartering of equivalents).

7) while the CodeChain digital bank may be responsible for exchanging the universal SGR (the measuring unit of CodeChain digital assets exchange) with legal tender, bitcoin, and gold, so as to enhance the function of SGR as a universal equivalent. the CodeChain digital currency may be cashed at a digital currency bank (digital bank) into a designated other currency, point, bitcoin, etc. (the exchange rate can be fixed or floating, or may refer to a package of exchange rates of the market prices of different "CodeChain digital human being server").

8) the agency for insurance payout (bound to each SGR of a specific industrial code server) when the smart contract cannot be performed is referred to as a "digital insurance company."

Through the above analysis, it may be seen that a payment and quasi-payment process more complex than the payment activity for a common service transaction is present in the actual service process with electronic virtual assets. Compared with common payment, the CodeChain smart contract redemption is more analogous to fusion of supply chain management and finance, which is a real system featuring that the finance serves for real economy; it is also a manner of serving for the real economy, which revitalizes the sleep assets to the utmost extent, resolves debt issues of local governments, and realizes mass entrepreneurship and innovation in a high cost-effective manner; it is not a pure financial service, especially not a financial derivative which easily becomes extortionate and generates bubbles that cause financial crisis. However, application of the CodeChain digital human being is an optimal technical means to uniformly implement this process (i.e., integrating finance with physical transactions).

First, the CodeChain-based payment service is a comprehensive upgrade version of the fourth-party integrated payment, a most important feature of which is serving as an information intermediate for the quasi-payment process of bartering between the electronic contract and the service, in addition to serving as an information intermediate during the actual payment process. A second important feature is uniform bookkeeping for the payment and quasi-payment process, which avoids the information island caused by different exchange channels or payment channels. A third important feature is uniformly using the digital human being technology, which can guarantee information security during the payment and quasi-payment process (including, solving the problems of forging a collector, embezzling personal profiles of the payer, forging and tampering during data transmission, etc.).

Figure 9:
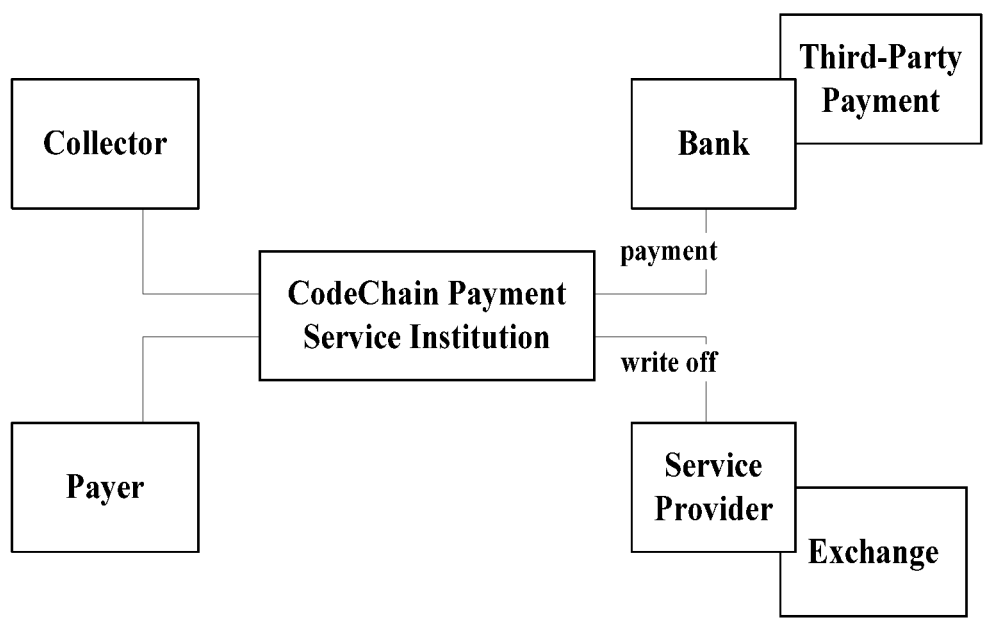
FIG. 9 is a schematic diagram of implementing payment and write-off via a fourth-party based on CodeChain.

FIG. 9 provides a brief summary of a payment service based on the CodeChain digital currency (SGR) and the CodeChain.

First, the CodeChain digital currency and the electronic payment tool are seemlessly combined. The CodeChain digital currency and payment are of a three-tier architecture, wherein the top layer is the issuer (unified code issuance organization) of the CodeChain digital currency, which can be a central bank, or a unified code issuance management organization, or a management foundation, etc.; and the second tier is analogous to a traditional commercial bank, embodied as "industrial code server" (respective industrial code servers access the unified mall); under the industrial code is a general dealer (analogous to a bank branch), and under the bank branch is a second-tier dealer (analogous to sub-branch bank), and under the second-tier dealer is a merchant (analogous to an enterprise), and under the merchant are a plurality of product and promotion management (analogous to the whole product sale process management of the enterprise); the third tier is a consumer, who may consume by purchasing a product (the consumer's digital currency or other equivalence enters the merchant's account, and the consumer may also user other equivalence to exchange for digital currency) or may circulate the dissemination to share the rewarded digital currency distributed by the beneficial merchant based on the circulation dissemination.

The CodeChain digital currency may combine centralized issuance and distributed ledger application, and the issuance and recouping are performed based on a binary system featuring "first-tier uniform code issuance mechanism (central bank)=)) second-tier industrial code (commercial bank) "; the central bank's digital currency system comprises the central bank's digital currency issuance base (unified code issuance mechanism), the commercial bank's digital currency bank base (SGR quota of the industrial code), and the user end's digital purse (CodeChain digital currency SGR/ingot account, which may access various industrial codes; the industrial code server corresponding to the digital purse of attribute changes of the digital human being's behaviors formed based on various actions of the digital human being records the digital human being's behaviors and the accompanied attribute changes of the digital human being's account).

The top-tier issuer issues the digital currency, which is analogous to the current MO issuance mechanism (e.g., abusively printing money), or issues the SGR (special goods_drawing rights); however, the SGR is not issued without foundation. The foundation for computing issuance of SGR is as such: supposing there are 3000 industrial code servers under the top-tier issuer, the association between the fixed-amount of "goods" that can be provide by each industrial code server each year according to the smart agreement (originated from the smart agreement and performance competence of the specific segment industrial code server) and the total amount needed for circulating in the digital economy ecological system of the industrial code server featuring integration of the manufacturer, consumer, dealer, and service provider on one code is quantized; preferably, the total amount of the SGR comes from the consensus of the allied link established by the 3000 industrial codes as nodes; the aggregate SGR available to each node may be originated from the amount of "assets reservation" or the amount of smart agreement performance of the "industrial code" (i.e., the ability of providing enough "goods"), which amount not only forms the total amount of the SGR of the unified code issuance center, but also is the upper limit for mutual SGR exchange between respective industrial code servers.

Further, each industrial code server may set, for example, 20% of the annual sales volume (20% of goods) as the source of the value of the circulation and dissemination system, i.e., the source of the circulation and dissemination created value, which is referred to as Code Chain Certification (CCC Token, or CCC); this CCC is the quantization indicator of digital economy, the biggest advantage of which is that it does not increase without grounds like assets reservation (e.g., accidental discovery of a large gold mine, or US dollars QE and other abusive notes printing); instead, it is issued with the economic development, which will not trigger inflation, and is thus the most reasonable mechanism embodying human labor that creates value (abusive not printing signifies deprivation of the people's rights of equality in creating value via labor, which goes against the human-oriented principle in social development); particularly, once the allied chain binds computational capacity as the anchor, the human society will fall into crisis, because machines will deprive humankind's basic rights of creating value through labor.

As such, the assets reservation or smart contract of each industrial code server joining the allied chain as a node is equivalent to be "tokenized," constituting a link of Code-Chain digital currency issuance, like issuance of everything from currency, stocks, to assets in the digital ledger. Assets tokenization refers to converting the rights of assets to digital tokens stored and managed on the blockchain (allied chain). In this way, we may work out a complete solution covering the whole life cycle of the digital assets in the CodeChain+Blockchain context.

Second, the payment system of the CodeChain digital currency is as follows:

By scanning code or clicking a value chain in the ecologic system of the digital economy constructed by the industrial code to access an industrial code server, a digital human being forms. the payment system of the CodeChain digital currency includes:

1) (generating SGR) based on unified code issuance management; access to various "industrial codes" by one scan of the two-dimensional code/clicking the hyperlink; and changes to the digital purse account attributes due to various accesses and various actions (the user end's digital purse includes: CodeChain digital currency SGR/ingot account under each industrial code server, records of digital human being behaviors by the industrial code server corresponding to the digital purse formed by accesses to various industrial codes and various actions, and accompanied changes of the digital human being account attributes).

2) A process in which the CodeChain industrial code server verifies and checks the data of payment behavior/merchant/company through access to the unified code issuance management and unified identity authentication.

3) the client has full control of the data of its own account via the CodeChain Digital human being Cloud Platform Management System provided by the CodeChain Industrial Code Server, effectively preventing the paid merchant/company from compromising the consumer's property security and data privacy.

4) the merchant is freed from the technical bindings imposed by the payment company, effectively preventing the payment company from restricting the merchant's businesses.

Preferably, both the collector and the payer are digital human beings; the CodeChain payment service institution serves as the fourth party to receive a request from the collector to ask a specific payer to pay and notify the bank; the bank confirms payment from the payer and transfers the money from the payer's account to the collector's account, and then notify the successful payment to the CodeChain payment service; the CodeChain payment service institution makes records and notifies the successful payment to the collector. Various kinds of specific information related to the payment, such as the payer information, payee information, amount, jump address of the server such as the bank, notifications, etc., may be obtained from the CodeChain payment institution after accessing based on the uniform CodeChain protocol (e.g., superimposing information such as the DNAs of respective digital human beings by identifying the code-chain two-dimensional code). The CodeChain payment service of the present disclosure adds the quasi-payment process of electronic asset write-off, such that the convenience and safety in customer use and reliability of government regulation are greatly guaranteed.

Product composition of Code Chain Payment Service:

A. basic payment products: based on the characteristics of the code-chain technology, basic code-scan payment products may be divided into four types according to the characteristics of code-scan payment and the use scenarios: code-scanning payment, code-scanned payment, code-scanning write-off, and code-scanned write-off. For examples, the four codes correspond to the following four products. The code-scanning party recognizes the code to access; and the code-scanned party presents the code for the counterpart party to identify.

B. combined payment product: to facilitate the clients to use, the payment and write-off are combined, i.e., a combination of write-off and payment is completed in one transaction. The product only supports code-scanning.

C. directional payment product: to support the merchant in using pre-collected fund and guarantees that the merchant uses the fund in a reasonable and legal way, the payment service provides a payment product of directional transfer.

Besides, to enable the customer to use the aggregated electronic contract products to the utmost extent, the payment service supports an electronic contract bi-directional transfer product.

An advantage of the CodeChain payment service includes a solid security based on the CodeChain technology. The mainstream code-scan payment product in the market is based on a static two-dimensional code, so it is hard to determine whether the two-dimensional code issuer is true, whether the payee is reliable, and whether the personal payment information would be embezzled, etc.

In this aspect, the CodeChain technology has the following features:

1. Dynamic Two-Dimensional Code Encoding:

The CodeChain server unitarily manages the scanned object. The two-dimensional code does not store the actual payment address; the smart device of the payer will obtain the service address of the actual payment service provider from the CodeChain server, thereby preventing serious security issues such as virus/embezzlement of payment code brought by illegal link, etc. If the device presenting the two-dimensional code is a smart device, the CodeChain server will regularly update the two-dimensional code so as to handle the issue of forging a payment scene by forging the two-dimensional code; it may also "limit" the use scene by defining one or more of 5 W (Who Says What In Which Channel To Whom With What Effect) in the IoT space-time in the code-chain two-dimensional code.

2. Transmit Sensitive Personal Information Via Digital Human Being Network

The third-party payment and the banking system are monitored by the central bank, which are believed technically secure. However, in the traditional two-dimensional code payment scene, the sensitive information including the payer's bank account number, identification information, and even the payment password are all transmitted via the payment network, and the merchant and the fourth-party payment in the network will obtain such information, thereby bringing a great risk to the customers. This problem can be perfectly solved by the CodeChain payment service; the CodeChain payment service does not decode personal sensitive information, but first encrypts the sensitive personal identification information underlying the digital human being and then directly routes the encrypted information to the bank, thereby effectively preventing the risk of personal information leakage.

Or, with "CodeChain" access at each smart terminal, a new two-dimensional code "CodeChain" superimposed with "digital human being information and containing various attributes" is newly generated to as to implement, "in the theme-based digital human being network," a "specific theme-based all-network consensus" mechanism similar to the blockchain so as to verify the identity of the accessing digital human being and "value use." If this terminal adopts the digital eyewear, it may realize a more secure payment manner based on 5 W features.

A machine-based consensus mechanism distinguished from the blockchain may bring disasters: when one point is broken, the whole system will be paralyzed. However, the human society's consensus should be based on the consensus mechanism of the humankind per se (a specific industrial code server, i.e., a server management system of a human society's behaviors based on a specific theme), rather than IP address-based machines. Code chain is means of efficiency enhancement, while the core technology of the CodeChain digital currency is a digital human being-based consensus mechanism, characterized by quantization, personalization, flexibility, and low cost.

3. Digital Human Being Activity Monitoring:

The CodeChain payment service enables uniform bookkeeping and uniform code issuing. To tackle the activities of forging a digital human being identity to practice illegal transaction and money laundering, the CodeChain payment service can effectively distinguish compliance activities and non-compliance activities based on digital human being activity records and activity analysis; for those non-compliance activities, measures including suspending transaction are taken according to merchant demand so as to reduce further damages. Particularly, the information management containing 5 W based on CodeChain access of CodeChain digital human being may prevent the deficiencies in current virtual currencies, e.g., anti-money laundering, e.g., KYC Know Your Client.

The traditional supervision runs like this: the payment company reports data and program under requirements of the supervision authority, which is a development-oriented technical process, insecure and inefficient, a non-economic manner without overall plan for a fundamental transformation.

In contrast, for the payment by access to the CodeChain cloud platform (industrial code server), the digital human being's behavior norms and analysis are autonomous behavioral data analysis formed by exchange of CodeChain payment data, wherein the data and algorithms aggregated from the analysis and behaviors of each digital human being in the CodeChain natually form an "Earth Brain" (AI big data analysis of digital human being behaviors based on unified code issuance management), which can surely prevent occurrence of illegal behaviors. The payment using the CodeChain cloud platform does not rely on a certain node or a certain company, but is based on the whole ecological system to judge synthetically; the payment using the CodeChain cloud platform may change passive supervision to active supervision, which may not only prevent various known illegal behaviors, but can also prevent those minor, not massively known risks, thereby preventing expansion of the risks. This payment is a really secure, reliably, omni-process supervised digital currency payment manner.

Compared with bitcoin blockchain, in the network constructed by CodeChain, the "CodeChain" technology and the CodeChain access protocol label the "real world" and the virtual world "on the Internet" as "object" with the CodeChain two-dimensional code, and superimpose the attribute and DNA of the CodeChain digital human being over the CodeChain two-dimensional code, thereby building a network implemented based on the CodeChain technology over the IP Internet virtual world and the real world IoT; this network may record (not purely transactions) of all human beings in a general ledger, which uses a "CodeChain access protocol" to implement "two-dimensional code scaning, O2O offline scene accessing" and "SNS-based dissemination chain tapping activity." In applications such as electronic payment and digital currency in the business field, the present disclosure provides a mobile business security policy, which offers flow convenience, identity authentication capability, anti-repudiation for transactions, communication security, information privacy, service availability, data integrity, and data confidentiality.

The CodeChain technology may solve the core problem of the blockchain technology more effectively over all advantages of the blockchain technology; therefore, it is referred to as an upgrade version of the blockchain technology. The information entity in the CodeChain is a digital human being (including records of the digital human being's behaviors), which is more flexible and cost-effective than a mining machine which consumes a considerable amount of power resources. The digital human being has a global uniqueness property (the same digital human being may have different digital human being IDs based on different themes, thereby offering traceability between different themes), which facilitates general ledger verification. The theme-based CodeChain (server) has a shorter life cycle (different from the life cycle of the blockchain bitcoin, the starting point of the life cycle of the CodeChain digital currency is the promised issue of smart contract (which may be determined by the code issuance center, executed by the CodeChain server, and redeemed by the digital bank) according to rules, and the ending point of which is when the digital bank cashes and trades as agreed. The digital bank needs to guarantee that the digital currency circulated in the principal CodeChain is anchored, and the anchor issued thereby is the legal tender such as Renminbi, or service provided by the service provider in the CodeChain, or other commodity or service with a counterpart transaction capability (the typical representation of which is "special goods_drawing right"); its functions in the CodeChain include: accepting a "request" from "a CodeChain principal server" to issue a check (voucher, special goods_drawing right, etc.), offer guarantee for issuance of digital currency, exchange and cash the digital currency (special goods_drawing right), thereby implementing that the completeness of the CodeChain is guaranteed by the digital bank.

In this way, the cost dilemma caused by the blockchain general ledger data chain and the amount of data constant increasing can be effectively avoided. The information dissemination efficiency is different from the mining incentives of the blockchain, wherein the CodeChain applies dissemination incentive. The digital currency as incentives is not bitcoin coming out of nothing, but an anchored digital currency, which is a reward based on the "circulation dissemination value system," and is thus more convenient for regulation, avoiding occurrence of money laundering and Ponzi Scheme; the blockchain is based on the RSA cryptographic algorithm, while the CodeChain may be based on quantum cryptography, which is thus more secure and efficient.

The code issuing center has a unique position in operations of the CodeChain system: 1) issuing service two-dimensional codes, including generation of the first meta-code. 2) verifying service two-dimensional codes. 3) recording CodeChains, and providing authoritative CodeChain transaction records and transaction authentication records. 4) guaranteeing the SGR quota; all of the above enable interconnection between the code issuance center and respective industrial code servers.

The code issuing center also offers important functions such as authenticating legal identity of digital human beings, providing a legal authentication on the CodeChain, and providing the integrity and fairness of CodeChain records. The CodeChain technology effectively solves the difficulties in regulation, particularly in the context of high-speed development of the Internet banking and hysteresis of the regulation system.

The CodeChain is the most active elementary economic unit; the equality between digital human beings guarantees the equal positions of various economic entities in the basic economic activities, but also offers an absolute service flexibility, which may handle various services. The technical innovations of the CodeChain lie in that: the code issuing center is under the regulation of relevant authorities, which guarantees that the real-name requirement in the Internet (CodeChain IoT) economic activities, the anti-counterfeiting of codes, verification, and authoritative records may effect prevent illegal activities such as faking in the information field. The digital bank is also under the regulation of the central bank, which guarantees the legality of the financial service in the Internet transaction environment to prevent financial risks.

For example, the traditional mode of pre-paid consumption has the following defects: 1) fund supervision issue; 2) limited use scope; 3) balance return difficulty; 4) restriction for cross-territory use.

The CodeChain mode may effectively solve the above issues: 1) the digital bank is liable for fund supervision; 2) with the CodeChain access protocol, any unit and individual may develop a service paid by the industrial code; 3) the automatic exchange service provided by the digital bank enables universality of the pre-paid voucher issued in various territories.

For another example, the supply-demand of the seafood fresh cold-chain in the traditional direct-marketing/pyramid scheme faces the following challengers: 1) the member fees of the traditional member-recruiting scheme cannot be eradicated; 2) the seafood warranty period and quality tracking rely on another system. The CodeChain scheme may solve the above problems: 1) quality tracking and transaction are performed on one system. 2) the pay-but-no-delivery issue can be technically prevented, which may effectively avoid the activity of illegal pyramid scheme such as signing people up. 3) the value of dissemination chain can be reflected, a digital human being propagating product value may obtain a consumption voucher (surplus value based on circulation and dissemination) to gain income from his contribution.

The CodeChain is further applied to the "CodeChain digital asset exchange" and the "special goods_drawing right." In contrast to the traditional blockchain digital currency, the "CodeChain digital asset" refers to the digital asset exchanges that utilize the "Code Chain Protocol", based on real-right control, converts a product chain agreement into a severable, tradable, transferrable, exchangeable, and trackable smart contract with the CodeChain "smart two-dimensional code" as the medium, to realize "digital asset tradability" for "property exchange" within the "CodeChain" alliance (which differs from securitization of reits (real estate investment trust) in that the CodeChain digital asset corresponds to the "thing" in the real economy that may be finally consumed, rather than financial "virtual bubbles").

The CodeChain digital asset may innovatively drive the consumer order reversely to work divisions in respective nodes of the value Internet till the distribution principle of the smart contracts tracing and locking down the production elements is clearly presented. Each actual consumer may not only lock down the consumption, but also may participate in investment premium and share value; thus, the CodeChain digital asset is a real embodiment of share economy. The CodeChain digital exchange comprises four systems: asset filing, review and documenting, credibility tracing, transaction exchange, the unit of bookkeeping of which is "Special Goods_Drawing Right" (SGR). It is a "unit of bookkeeping of CodeChain digital asset" created by the CodeChain digital asset exchange, which is available for members to balance regular trade settlement within the systems based on the asset digitalization of various "eligible enterprises/regions/countries." When a contracted member of the CodeChain union has an unfavorable balance of regular trade, it may exchange the SGR for other digital assets with other members in the system to settle the unfavorable balance or pay off the loans from the digital settlement bank; the SGR may also serve as international reservation like gold and freely exchanged currencies; however, because the SGR is not only a unit of bookkeeping, but also serves as a real payment means; its use must rely on the code-scan payment with the CodeChain two-dimensional code so as to be directly used for trade or non-trade payment. The constant value of "SGR" is linked with a package of "goods," but its market value is not fixed. Members of the CodeChain union may obtain any goods in the reservation package with the SGR to satisfy the rights of international balance of payment in regular trade.

Therefore, the "CodeChain" may implement a sustainable development of information society credit system and promote interconnectivity of the global value Internet; on this basis, the CodeChain helps the union of developing countries to exploit their abundant resources and unleash their potentials so as to solve their long-term problems such as insufficient payment capacity with respect to foreign exchange reserves in international trade, difficulty in financing for government PPP projects and cross-border settlement; therefore, the CodeChain can enhance the capacity of the union of developing countries in foreign payment, stabilize the exchange rates of their domestic currencies, and promote their foreign financing. The CodeChain may promote capital liquidity of global resources, perform effective configuration of resources, and unleash surplus productivity, so as to enable each individual person in each union, particularly the union of developing countries, to share the value dividends of globalized industrial chain work divisions, thereby avoiding becoming a victim of globalization.

The CodeChain union, which is interconnection based on different themes, is a union of various entities which set up individual "CodeChain cloud server" based on different principals to follow the same CodeChain access protocol and uniformly access the "code issuing center"; the CodeChain digital currency is a unit of measurement circulating between different principal servers; meanwhile, the principal servers are linked to the digital asset exchange via the code issuing center, such that the CodeChain digital currencies may cash "SGR" within the "CodeChain digital asset exchange" according to "a fixed exchange rate or a floating exchange rate" to thereby implement interconnectivity inside the union.

Traditional banks may be modified to become "digital currency SGR settlement banks: CodeChain digital banks." Code chain digital currency and code issuing center (i.e., the function of uniform "code-scanning payment settlement center": a variety of business models may be derived from "CodeChain"; the CodeChain may free the impoverished countries from "foreign exchange reservations." the CodeChain digital currency, "SGR" (Special Goods_Drawing Right, a "unit of bookkeeping of CodeChain digital asset" created by the CodeChain digital asset exchange) which is the most original "super digital asset" established based on "bartering with equal value," may not only surpass "bitcoin," but also exert the great advantage of the productivity output of various production countries to promote globalization of "digital currency" with real assets as unit of basic measurement, thereby implementing equality and fairness.

By building "a code-scan payment settlement center" and a uniform "code issuing center" under the framework of the Union of Nations, the "structured big data" may be controlled and "human-made financial risks" may be avoided because the CodeChain-based code scan is monitorable in the whole process (which may be uniformed to the CodeChain code issuance management center, i.e., the code issuing center).

The "digital currency" generated based on the "surplus value in the circulation domain" and the ways to handle and break the "monopoly position of printing notes" will be illustrated so as to implement globalization of the "national treasure and citizen wealth under the framework of the UN, which are measured with real assets."

Currency is originated from simple, individual, and ad hoc bartering. With development of productivity and expansion of commodity production, an augmented value is formed gradually. When a commodity specifically acting as an equivalent for any commodities is split from the commodity world, a universal value form emerges.

However, further development of productivity and further expansion of commodity exchange scope require that a universal equivalent should be fixed on a special form of commodity; then currency emerges. However, irrespective of value form, the value of a commodity has to be embodied on another real commodity. However, with advance of human civilization, particularly with popularity of the mobile terminal, in the era when a "mobile network" is "existent anytime and ubiquitous," which is ignited by population of mobile terminals including wearable devices, a "digital currency" emerges as a manifestation of any commodity.

Comparing with traditional theories of "surplus value" in "production sector" and "currency exchange," the "CodeChain digital currency" theory further illustrates a "value system in circulation and sharing"; the CodeChain implements a measurement standard which is "digitally traceable and quantifiable" measurement standard, i.e., a "digital currency" may emerge to become a "universal equivalent." It is named herein as "SGR" (Special Goods_Drawing Right, a "unit of bookkeeping of CodeChain digital asset" created by the CodeChain digital asset exchange).

"SGR" is originated from "circulation and dissemination," while use of the SGR is through the "CodeChain two-dimensional code system." The quantization reflects "state fortune, citizen fortune," further including new object-based human-oriented objective values of "national and regional credit, industrial code credit, and citizen credit."

From the perspective of human and with the digital human being (proxy of human in the digital world) as the basic network element, the CodeChain technology solves the problems of CodeChain network in relation to information sharing, information verification, information monopoly, and information tampering through decentralized data, and effectively lowers system operation costs. The CodeChain technology inherits the decentralized market innovative vitality from the micro perspective based on multiple principals, uniform code issuance, real-name authentication, and macro regulation (different CodeChains based on different principals constitute their own set of ecological systems), but also proposes a centralized management concept from the macro perspective (realizing interconnectivity in the macro sense), thereby solving various tasks in information supervision and verification as well as preventing illegal activities.

It is seen that the CodeChain is not only a big upgrade of the blockchain from the perspectives of ideas and technologies, but also implements a local decentralized model efficiently with a lower cost; while retaining the advantage of decentralization, the CodeChain also overcomes the core dilemma of blockchain technology.

Here is another specific implementation solution of Globe grid partner. Providing an industrial code server of a new product, which will be introduced below. This new product is a high-tech product such as a digital human being eyewear, which has applied for a patent; however, in the case that its market brand and functions have not been widely publicized, the Globe grid partner mode according to the present application will be adopted. Partners are recruited by signing up a lecture introducing functions of the new product, wherein earnings from tickets for lectures and training classes are invested in researching the software, hardware, and backend of the product to obtain the sample of the product, small-scale test, and batch delivery; the partners' on-site lecturing presents functions of the product and the promo page two-dimensional code with the CodeChain function (the whole process can be traced to record the whole dissemination process) and the partners propagate and forward the product functions and the promo two-dimensional code; as such, the product achieves a larger influential power and generates more sales; meanwhile, the performance of the disseminator may be computed (the performance of his own promotion+performance based on the CodeChain promotion mode of the whole company=performance of the CodeChain partner); on this basis, earnings are distributed to the partner (different from post-tax profits from stock bonuses, this earning is closer to the commission and rebate of first-tier dealer).

Therefore, the more dealers and spreaders, the more extensive the forms of dealership and promotion, such that there is no over-stock, and a new business model emerges.

Besides, a code-scanning accessed consumer not only obtains the use value from the consumption, but also participates in creating the value chain of the new product, which can also be quantized and recorded, enabling sharing of the distribution of the value chain of the whole system, thereby carving out a consumption value chain of a high-tech new product from idea, research and development, production, and to sale.

Meanwhile, the core manufacturing and design and the parts suppliers may also be incorporated in the whole value chain distribution system, and major suppliers such as Foxconn and Sharp may not only obtain orders, but may also share the sales revenues of Apple, thereby constructing a value system of an integrated supply chain.

In another specific implementation solution of Globe grid partner, an industrial code server based on a new product is provided, which enables concerted action to generate more mall consumptions. This new product refers to a new energy product such as graphene battery (not in mass production yet); when its market brand and functions have not been widely publicized (or possibly in a confidential state), the Globe grid mode as described herein is adopted. If a consumer purchases a certain amount of commodities (which may be non-new energy commodities; the supplier is willing to supply the commodities lower than the market average price so as to obtain a privileges to participate in the mode, e.g., continuous supply rights, preferred supply rights, etc.) so as to become an "Energy Matrix" Globe grid Partner of the industrial code server "Energy Matrix"; besides, new consumers are acquired by introducing the new products and promoting and displaying two-dimensional codes; the earnings from mall sales are invested to the research and development of the software, hardware, and backend of the new-energy product (so as to support a more flexible and stronger management function) to realize delivery of the product and the backend server functions; through the partner's promotion, dissemination, and forwarding, this new energy product will become more influential; moreover, each code may be bound with a product recommended by the partner, thereby generating more sales for the mall (analogous to cross-industry ally); while each sales revenue is associated with the partner, thereby building a new production relationship; the whole process including production, supply, transaction, promotion, shop exhibition, consumption access, and purchase is recorded, and the partner continuously obtains the benefits.

Therefore, distributing earnings among partners is different from distributing stock dividends as post-tax profits; the earnings according to the present disclosure are more like rebates to first-dealer sales. With more dealers and spreaders and more extensive dealerships and promotions, overstock and excess inventory are eliminated, thereby emerging a new business model.

Comparing with the traditional direct-sale system, the first batch of franchisees (partners) joining the Globe grid mall may develop merchants (which is not an individual as lower-level distributer in the direct sale, but a legal person merchant having a store and customer flows); besides, there is no restriction for the merchants to join the Globe grid mall, not like the traditional direct sale system which imposes a forcible sale of the commodities of a specific producer; further, because the two-dimensional code is posted in the physical store, the consumer may further access the mall by scanning code to pay and receive coupons, thereby becoming the "next tier" of the mall; such hierarchy is naturally formed, which may end when the consumption ends; for the Globe grid partner, if a certain store has a good marketing, or a good service, or a large customer flow and thus can develop more next-stages, such partner may have more earnings (the store also has earnings); then, the partner may organize all merchants he developed to promote the experience and attract more merchants to join and spread the mode; further, through heterogeneous alliance, the merchant may develop next-tier merchants: different from the direct sale which applied "individual developing individual," for example, at the start-up step, the merchant in the present mode selects to join a chain-store "meta code coffee and dining" (e.g., defining a specific region covered by the business), then a "meta code" of "coffee and dining physical store in the region" is generated, i.e., a two-dimensional code of the first CodeChain for each store in the region covered by the industry; the source of the income of the dining code-scanning payment collection (specific theme) serves as the entry point (e.g., a digital-person eyewear serves as the access device for generating the meta code including 5 W elements, then the meta code coffee shop is not only the place for promoting the digital-person eyewear, but also may provide a "digital-person eyewear" rental service, such that within the region covered by the meta-code coffee shop, the lessees may also use the digital human being eyewear to generate meta code in the stores in the region to obtain commissions of corresponding proportions based on the sources of code-scanning payments and Globe grid mall; for the same reason, the meta code is more than a store, it may also serve as meta code gallery (similar to a mobile phone gallery), function presentation, and use experience).

Therefore, this mode may be "individual to develop legal persons" (persuading the merchants to franchise from various perspectives, such as promotion, coupon, payment, and shopping, etc.), "legal person to develop legal person" (cross-industrial franchising between the store and nearby merchants to drive traffics to each other), or "legal person to develop individuals" (accesses by natural customers of the store, and due to the "roaming" function, the merchant has a motivation to grant the discount to the first-access consumer so as to attract more individuals to join); based on the direct-sale principles of "repeatable, surmountable, and inheritable," a brand-new business mode of "one for others, others for one; CodeChain access, all citizens become merchants" that breaks through the direct sale industry may be developed.

The products (unlike Amway which only sold the products of its own) sold by offline franchised gallery site of each Globe grid manor game (all of the sites have an in-CodeChain IoT mall, with an independent secondary sub-domain name merchant management on the digital human being cloud platform) may include the digital human being eyewear (gallery), or coffee (meta code main business 1) and CodeChain promo page (meta code main business 2, similar to advertisement promo page), as well as the cross-industrial alliance (products in the CodeChain IoT mall) covering nearby merchants, and the Globe grid code (qualification of dealership); the dealership under the offline franchised gallery of the Globe grid manor is also referred to as an on-sale product.

Furthermore, a code-scanning accessed consumer not only obtains the use value from the consumption, but also participates in creating the value chain of the new product, which can also be quantized and recorded, enabling sharing of the distribution of the value chain of the whole system, thereby carving out a consumption value chain of a high-tech new product from idea, research and development, production, and to sale.

Figure 5:
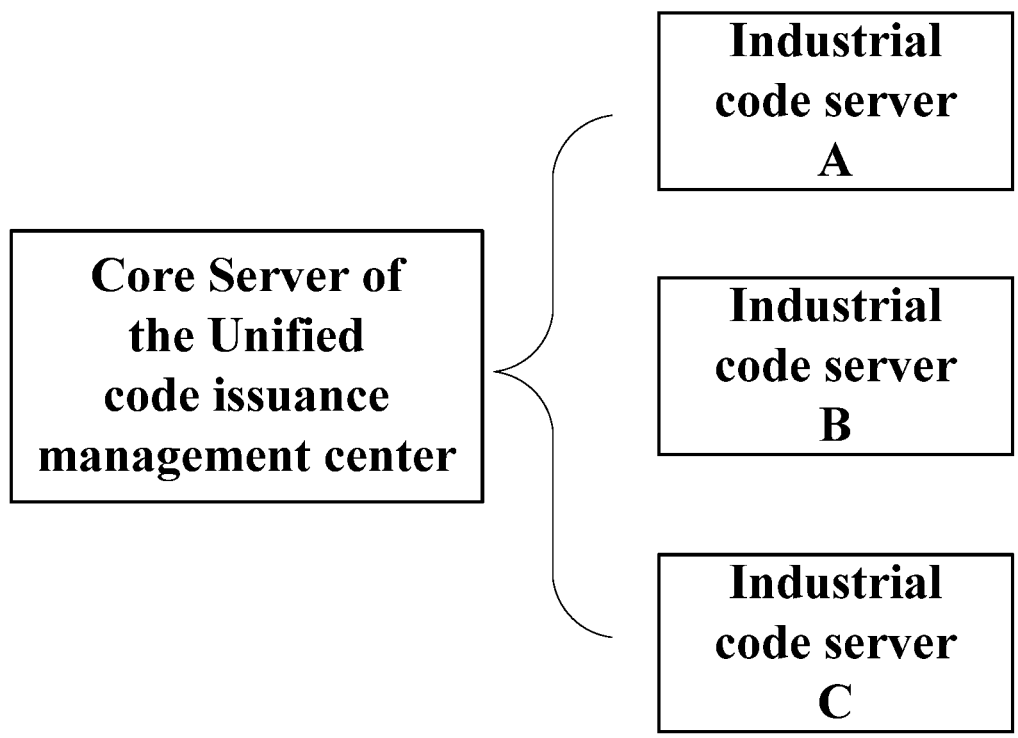
FIG. 5 is a schematic diagram of a relationship between a unified code issuance management center and an industrial code server.
Figure 6:
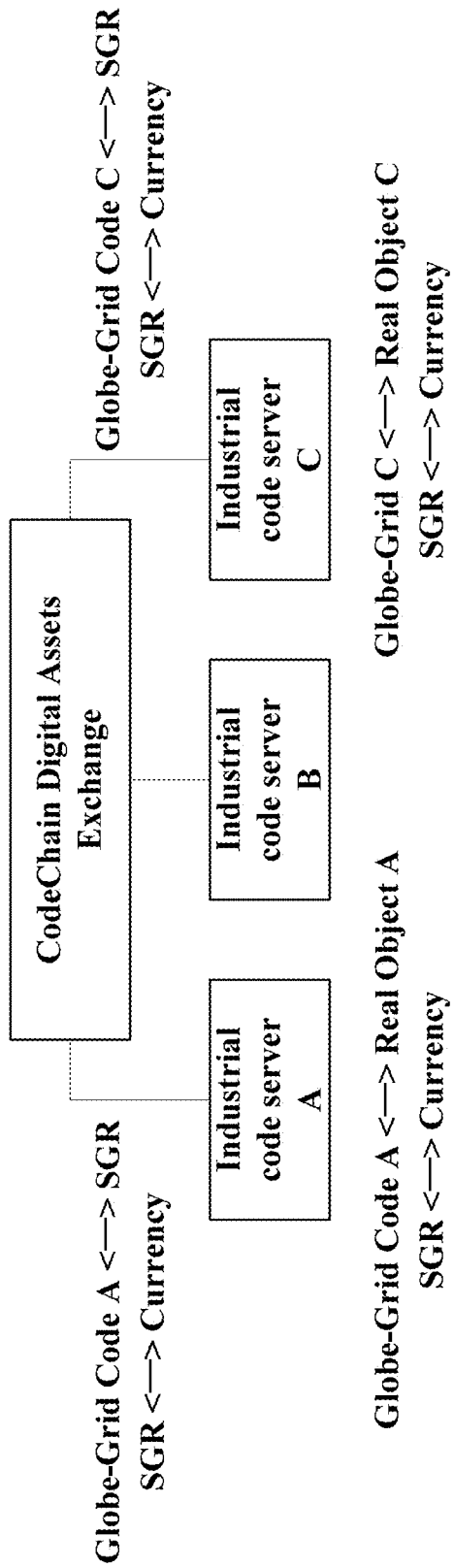
FIG. 6 is a schematic diagram of CodeChain digital asset transaction.

In a preferred embodiment, as shown in FIG. 5, distribution of all codes under the Globe grid partner mode (global or local range) is controlled and managed by a core server of a unified code issuance management center. That is, a single core server may correspond to a plurality of industrial code server within a specific range; the industrial code servers may correspond to (same or different) matters, wherein at least the distribution quantities of their respective Globe grid qualifications (corresponding Globe grids) are controlled by the unified code issuance management center. Furthermore, the meta code/Globe grid code is also controlled by the unified code issuance management center. Owing to the 5 W elements, the theme (specific industrial code) under specific 5 w (e.g., time, location, etc.) circumstances can be determined, i.e., a meta code/Globe grid code does not cross much industrial code servers, because the theme under a specific 5 w condition is relatively fixed.

In different examples, the total distribution quantity, distribution standard, and coding rule of the Globe grid qualification of a certain industrial code server may be formulated by the core server of the unified code issuance management center or the industrial code server; when the industrial code server determines that an individual has a partner qualification, it requests the core server to distribute a Globe grid corresponding to the partner; after the core server determines to distribute after confirming the balance of the Globe grid qualification corresponding to the industrial code server, the core server or the third-party server or industrial code server authorized by the core server generates a corresponding Globe grid code based on the preset coding rule, and the information needed to encode (e.g., Globe grid attributes, partner identification information, auxiliary information, etc.) may be transmitted from one party knowing such information to the party which specifically generates the Globe grid via interaction between relevant parties. Then, the industrial code server presents the obtained Globe grid code via the personal center of the digital human being platform or transmits the obtained Globe grid code to the (mobile terminal of) the partner.

Exemplarily, the promo codes corresponding to respective partners may be generated under control of the unified code issuance management center in a similar manner. Or, because it may be provided that the Globe grid qualification of the partner is not affected by whether a promo code has been generated, generation of the promo code may be authorized to individual industrial code servers in some examples. Then, the promo code may be generated by the core server, the industrial code server, or a third-party server authorized by the core server or the industrial code server based on a preset coding rule, then is presented via the personal center of the digital human being platform or transmitted to the (mobile terminal) of the partner; or, the terminal device of the authorized partner obtains or provides information needed for encoding (including Globe grid information, partner identification information, auxiliary information, and promo content, etc.) may generate a promo code based a preset coding rule. Dependent on differences in auxiliary information and/or promotion contents, the pattern of the promo code generated under each request of the partner may be dynamically adjusted; the patterns may be identical, but they may redirect to different promo pages matched with the auxiliary information and/or promo contents after actual parsing.

Exemplarily, the core server may be provided with a master service module (or master industrial code server), which uniformly distributes a "global Globe grid code" and has functions of managing the corresponding Globe grid rights. The plurality of industrial code servers corresponding to the core server are equivalent to subversions. The global Globe grid code may be associated with the industrial code servers of these subversions, having rights substantially identical to respective Globe grid codes of the industrial code servers of these sub-versions, e.g., entitlement to the earnings from the corresponding matters of the industrial code servers of all of these subversions according to proportional weights. Under different application examples, the "global Globe grid" may be set with functions or obligations similar to the subversion Globe grid codes (e.g., required to be spread or meet some conditions); or, the "global Globe grid code" may be set to lack all or some functions of the subversion Globe grid codes; or no obligations are set to the "global Globe grid code." The "global Globe grid code" may be distributed only to the core server, or distributed to the industrial code servers of various subversions which then become corresponding partners of the core server.

Exemplarily, the Globe grid (or entitlement to earnings) corresponding to the industrial code server may be transacted and transferred, unbound from or re-bound to the associated partner, such that the corresponding code item of the code information of the Globe grid code is directed to the digital human being identification of the new partner. Preferably, the transaction and transfer of the Globe grid code is under unified management of the "CodeChain digital assets exchange" affiliated to the unified code issuance management center.

Likewise, the meta code may bring benefits due to service of a specific theme at a certain store, e.g., payment, shopping, advertisement promotion, etc., such that it may also be listed and traded in the CodeChain digital assets exchange.

The CodeChain digital assets exchange uses the "CodeChain protocol" to transform the industrial chain contract to a severable, tradable, transferrable, exchangeable, and trackable smart contract based on real-right control with the codeChain two-dimensional code (e.g., Globe grid code) as the medium, thereby realizing "digital assets tradability" featuring "property exchange" in the "CodeChain" alliance (the CodeChain digital assets correspond to real "objects" in the real economy, not the pure credit or air coin; the CodeChain digital assets have a use value and are usable). In this way, the consumer order may reversely drive work divisions of respective nodes of the value internet till retrospect to pinpoint the production elements; such that each actual consumer may not only pinpoint the consumption, but also may participate in investment to increase value, and even share the earnings, thereby substantially embodying a sharing economy.

The CodeChain digital assets exchange involves four systems: asset filing, review and documenting, credibility tracing, transaction exchange, the accounting unit of which is CodeChain based "Special Goods_Drawing Right" (SGR). The SGR is available for members to balance regular trade settlement within the systems based on the asset digitalization of various "eligible enterprises/regions/countries." When a contracted member of the CodeChain union has an unfavorable balance of regular trade, it may exchange the SGR for other digital assets with other members in the system to settle the unfavorable balance or pay off the loans from the digital settlement bank; the SGR may also serve as international reservation like gold and freely exchanged currencies; however, because the SGR is not only a unit of bookkeeping, but also serves as a real payment means; its use must rely on the code-scan payment with the CodeChain two-dimensional code so as to be directly used for trade or non-trade payment.

That is, the Globe grid code may server as an embodiment of digital assets (smart contract of assets digitalization), the measuring unit of which is SGR. Supposing respective industrial code servers may be interconnected at the CodeChain digital assets exchange, then the equivalent barter-based measuring unit SGR of digital assets, once populated in the future, may be circulated and exchanged between respective industrial code servers, serving as a universal "CodeChain digital currency."

The insurance, e.g., accident insurance of the tickets, food safety insurance of dining, which is automatically superimposed to the code-scanning and/or clicking access of the CodeChain, is referred to as CodeChain digital insurance.

The listing and trading flow and system of partner qualification (similar to industrial code virtual franchising, embodied as Globe grid code) in the CodeChain digital assets exchange is as such: first digitalizing the assets to enter the listed trading state; then the specialized institution similar to the dealer primary market promptly lists it, entering the code issuance and subscription stage; the listed secondary market lists globally for bidding, facilitating the transaction, and discovering the investment value; the SGR exchange is made via the digital bank (SGR is the measuring unit of respective industrial codes, e.g., XX_MATRIX may be exchanged with the SGR), e.g., various XX_MATRIX may be exchanged with corresponding SGRs in respective servers; the mode and place for free exchange is the Code-Chain digital assets exchange, i.e., the XX_MATRIX 1 may be exchanged to SGR, while in the exchange, the SGR may be exchanged to XX_MATRIX 2, such that XX_MATRIX 1 and XX_MATRIX 2 (including other XX MATRIXs) realize interconnection; the exchange rate may refer to the market exchange rate of respective industrial code XX_MATRIX servers, or may be a fixed rate; the place for exchange between SGRs and various currencies is performed in the digital bank; based on the performance insusrance and smart contract, the agreed real objects/services are redeemed via SGR; the Globe grid rights set for the corresponding industrial code servers are obtained based on the Globe grid, or various currencies are exchanged with the SGRs.

Any transaction in the CodeChain has records and can be traced back, thereby avoiding the circumstance in which money transaction is not in compliance with the actual transaction. Therefore, the design problem of the information account is fundamentally solved, which avoids risks brought by free opening of the information account while maintaining innovative impetus in payment, finance, and entity business.

From the human-orientation perspective and with the digital human being (proxy of human in the digital world) as the basic network element, the CodeChain technology solves the problems of CodeChain network in relation to information sharing, information verification, information monopoly, and information tampering through decentralized data, and effectively lowers system operation costs.

The CodeChain technology inherits the decentralized market innovative vitality from the micro perspective based on multiple principals, uniform code issuance, real-name authentication, and macro regulation (different CodeChains based on different principals constitute their own set of ecological systems), but also proposes a centralized management concept from the macro perspective (realizing interconnectivity in the macro sense), thereby solving various tasks in information supervision and verification as well as preventing illegal activities.

The two-dimensional code related to in the present disclosure refers to the CodeChain two-dimensional code based on the CodeChain idea, wherein the code information of each CodeChain two-dimensional code includes an issuer (which must be a digital human being) requesting for code issuance and a service target list. Each identification (e.g., code scanning) of the CodeChain two-dimensional code represents a connection, such that the service provided by the issuer can be connected to the scanned digital human being, and the code-scanning digital human being may obtain the desired service through data exchanged between digital human beings.

The service that is available to all digital human beings and all object digital human beings obtaining each service constitute a "human-service connection matrix," which is referred to as Matrixlink (CodeChain Matrix). The Code-Chain not only records all previous links, but also records potential links based on the willingness of each digital human being, thereby preventing occurrence of the link (i.e., act) against the digital human being's willingness, and digging out the potentially desired service of the person.

The code uniqueness and association is implemented by calibrating the code via identification of the Globe grid (grids in the IoT world, which is managed in each specific industrial code server) based on location and time; by constructing a coordinate system between the digital human being eyewear/mobile phone code-scanning and the Globe grid, calibration to the digital human being's behavior is implemented, and supervision on the code behavior is completed; through coordinate transformation, a super association between the real world and the CodeChain digital four-dimensional world is constructed, thereby completing the code's reconstruction with respect to the three-dimensional code. Namely, through CodeChain access and forward, the digital human being may map the three-dimensional world observed and accessed by a human to a fourth-dimensional world (human-oriented IoT world) via CodeChain digitalization, thereby transforming the three-dimensional world into grids (associated with location, time, and digital human being identification).

A "digital human being earth" may be constructed through such multi-industrial codes-partner IoT code mode, i.e., the digital identification on the earth maps the three-dimensional world to the fourth-dimensional space with the Globe grid is not only a digital human being-based behavior, but also a digital system serving the digital human beings, and also has the attributes of human society; moreover, as the "digital human being earth" is jointly constructed by respective partners, the respective partners/consumers, i.e., digital human beings on the earth, are not only passive observers (from the perspective of the digital earth), but also active participants and constructors; besides, it has human-oriented attributes, laying a foundation to digital human being economics.

An exemplary industrial code server according to the present disclosure may be built via a digital human's server capable of managing the CodeChain cloud platform software of the "Globe grid code"; the server is equipped with necessary software and hardware which may support Matrixlink protocol, CodeChain access and "two-dimensional code ONE SCAN/eyewear ONE STARE/unified code issuance management," such that it not only supports tracing, but also supports the "Globe grid code" partnership, such that through accessing via each code, including, but not limited to, spreading an ad, receiving a coupon, the consumer may not only access the "CodeChain IoT Mall" (unified mall); wherein the CodeChain mall does not need a "unified centralized mall entry" (i.e., the unified centralized entry of an Internet e-commerce merchant); instead, the entry is distributed to respective "partners and the two-dimensional codes integrating online and offline," such that each access may be associated with the specific entry two-dimensional code, and each consumption in the mall may be associated with the "specific entry (Globe grid code) or meta code of the source code," i.e., each transaction will have a certain proportion of commission distributed to the meta code and the Globe grid code.

In an alternative embodiment, a unified centralized entry may also be adopted (wherein one of the meta code attribute may be defined as if a meta code has been generated for the store at the location, then the access is decentralized), such that the "unified value chain system" and "distribution based on labor performance" can be realized by recording the 5 W attributes of each access, specifically the territory attribute (such that the Globe grid value may be quantized based on the actual access). The Globe grid code may not only be embodied as an entry from the three-dimensional world to the fourth-dimensional world, but also may be embodied as the attribute of each behavior accessing each entry (a unique two-dimensional code is generated for each behavior based on the backend server); therefore, for each access, because the entry is different, the accessed world may also change, thereby implementing whole-process tracing and recording the performance-based value chain.

Through CodeChain access (e.g., code-scanning) and clicking forward, seamless connection between the offline real world (face-to-face code scanning) and the online virtual world (sharing, forwarding and clicking in a social network like WeChat) may be implemented to realize senseless communication (O2O, offline-to-online seamless link); besides, the whole dissemination process may be traced and recorded (digital human being tracing function);

In this way, the whole process from manufacturing, product release, advertising, tier-by-tier referral, sale, to purchase may realize digitalized distribution of "circulation-to-dissemination value system," realizing performance-based distribution; this is an innovative technology that cannot be realized by physical stores in the real world and the Internet e-commerce.

Digital human being Eyeglass Applications Based on CodeChain Technologies:

Currently, the two-dimensional codes are applied more and more widely. However, identification and processing of two-dimensional codes mainly rely on specific APPs in mobile phones, which are not only complex in use but also lack a uniform interface. The traditional approaches are far not enough to satisfy the requirements of mobile IoT. The present disclosure integrates a camera (chip) supporting a CodeChain IoT protocol into a smart glass. The smart glass may be used in a natural way, which is very convenient to identify a CodeChain two-dimensional code, freeing users from the troublesome process of using different APPs to identify and process different two-dimensional codes and of using mobile phones to capture two-dimensional codes, and enabling the users to identify any two-dimensional code as seen; in further conjunction with a backend uniform protocol and platform, the present disclosure facilitates faster development of the mobile IoT. FIG. 3 shows a schematic diagram of a connection relationship between a CodeChain-based smart glass, a smart terminal device, and a cloud backend.

In an example, the eyewear is bound with the mobile phone so as to implement definition of "digital human being" and start operation. The eyewear corresponds to a "two-dimensional code" which may uniquely identify the eyewear ID; the "two-dimensional code" is scanned and accessed by a mobile phone (e.g., the mobile phone camera or WeChat has a uniform code-scan access function), such that "the mobile phone" and/or the "WeChat" are bound with the eyewear (the eyewear ID and the mobile phone WeChat ID both become digital human being Ids). The "attributes" of code-scan access may be configured on the interface of "menu setting" in the mobile phone, e.g., language selection, voice volume, filter access, indoor or outdoor scene mode selection, etc.; then with the "ONE SCAN," and "ONE STARE, staring at an invisible two-dimensional code" functions of the "mobile phone/WeChat," the "mobile phone/WeChat," after scanning the code, may not only implement a "closed-loop transaction function" but also may generate "a new two-dimensional code and/or a hyperlink superimposed with the digital human being ID." First, functional realization (e.g., playing in real time, via a Bluetooth headset, the language corresponding to the two-dimensional code (in the case of multiple languages, according to the language automatically set by the eyewear/mobile phone); meanwhile, the "new two-dimensional code and/or hyperlink" is generated and presented in the mobile phone/WeChat, and the "code-scanning activity" is recorded, thereby realizing "whole-process trackability."

For example, a highway tollbooth collector wears the glass to "STARE," i.e., identifying the "payment code" of each driver or vehicle (which may start 4 or 5 meters away); based on the data obtained by code-scanning/staring to access the CodeChain server, verification operations such as "driving license and plate verification" can be simultaneously carried out; besides, an additional function of judging whether the driver is a chauffeur or a taxi driver may be implemented. the eyewear may automatically focus and identify the "payment two-dimensional codes" corresponding to respective vehicles or drivers; after the identification is done, the "payment picture" is displayed on the eyewear screen; and then payment confirmation may be performed through control with a set action (touch, key-pressing, voice, etc.).

This embodiment offers an advantage that: the "payment code" (including a non-http format command which is capable of executing a payment function at the cloud backend) may be generated through "uniformly issuing code" (including a uniform code issuing agency, a uniform protocol, but not limited thereto). After the eyewear scans and identifies the code to access, connect with the cloud backend via NB IoT (Narrow Band-Internet of Things, i.e., a standalone secure payment network), and the parameters of the eyewear (e.g., digital human being ID, scene, and action; if necessary, capturing the picture of execution while executing the code-scanning payment so as to record) are introduced to the cloud backend, thereby completing the payment function. Secure payment is realized, because the whole process does not require a website access through connecting, in the http format, to the DNS parse server with IP address as the core; instead, it is a network-specific "secure payment" access protocol dominated with the CodeChain access protocol with a recordable scene. A similar eyewear worn by the driver may also identify a collection code uniformly issued and access the cloud backend to execute payment.

Likewise, based on the "unified code issuance management," meta code may be generated for various stores such as dining stores through for example "LBS calibration identification of a map" (i.e., the "source code" generated for the first time including 5 W information of the store), and the "secure payment meta code" is deployed. Use of the meta code refers to using the digital human being eyewear; after capturing to identify and verify the information including, but not limited to, 5 W, to securely access the backend, the "secure payment" access is completed.

Meanwhile, this approach may avoid monopoly and define the conditions for "generating the meta code and taking effect," i.e., the digital human being eyewear is used on the site (determining the location), promotion is performed (whether a video interview has been made, whether the determining condition has been met), and actual operations such as labor on review and inspection have been performed, thereby embodying performance-based distribution and avoiding gaining without labor.

In a specific embodiment, the eyewear, watch, and mobile terminal in this example may all be embedded with a "sense core engine". "The sense core engine" is a software/middleware, which drives the optical camera to identify optical signals. The optical signal may be visible light, or an infrared ray, an ultraviolet ray, or an optical signal with light-shadow or frequency variation, or an optical lattice map. The read original optical information applies the CodeChain two-dimensional code coding/identification principle, and after undergoing classified identification, error correction, matching, screening and/or signal format conversion, operation instructions to the backend server are generated. The operation instructions are transmitted to the backend server by devices such as the mobile terminal, and by further processing based on transaction management according to corresponding rules, the following functions are implemented, such as download, opening APP, e-commerce, transaction and payment.

Figure 4:
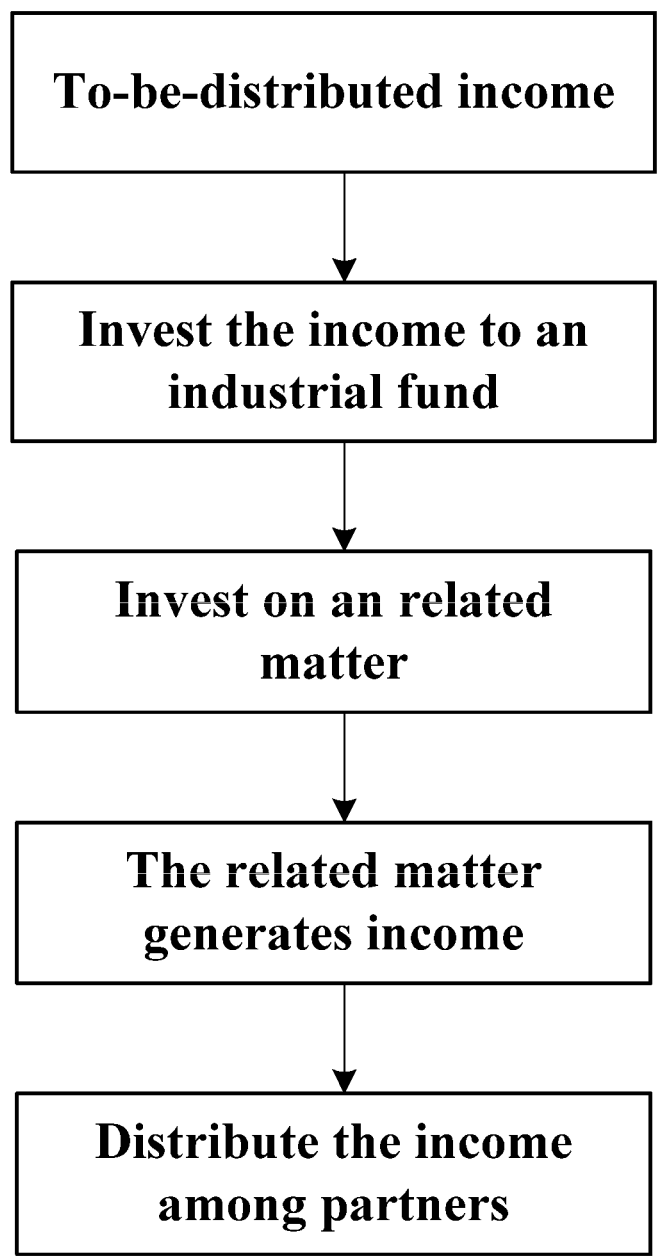
FIG. 4 is a schematic diagram of putting the earnings into an industrial fund for reinvestment.

The "light frequency" may control a play frequency to refresh the screen via a "plugin" so as to form an optical lattice map on various devices such as TV, computer and mobile phone screen, and e-book reader screen, etc. As shown in FIG. 4, the optical lattice map encoded based on the CodeChain technology may aimed and automatically identified with an AR digital human being eyewear, such that a terminal device such as mobile phone/computer connected to the eyewear via Bluetooth may receive a parsed operation instruction transmitted from the eyewear and drive the "plugin" or other "light frequency" application (e.g., performing an operation such as playing the captions of a video animation), etc. Or, a device such as an e-book reader may be connected to the eyewear via Bluetooth or connected to the cloud backend via WiFi/4G; after the AR eyewear aims the optical lattice map on the light-frequency e-book reader screen to identify, the e-boot reader may receive the parsed operation instruction transmitted from the eyewear, or the eyewear transmits the instruction to the backend server, such that the e-book reader is connected to the cloud backend via WiFi/4G and thus receive the instruction to drive the "plugin" or other "light frequency" application. In this way, when one wears the eyewear to view stories or video contents on the screen of the TV, computer, e-book reader screen, he may achieve an effect of synchronously play the associated content (those associated with a story or video content include "anime figures," barrages, comments, backend instructions, etc., but not limited thereto). Application of the "light frequency" may allow "an eligible developer" to upload in a DIY way like an "APP store," which, after being reviewed, may be downloaded by consumers in their respective mobile phones or computers; the "light frequency" application may be experienced in conjunction with use of an AR eyewear (although a similar effect may be achieved through digital voiceprint, playing of the voiceprint is inconsistent with the sight line, thereby generating a different effect): watching videos (e.g., via eyewear lens, flexible screens worn on arms, and the mini projector embedded in the eyewear, which projects on the page edge or corner of the book to enhance the book from texts to animation audio) while reading books with bared eyes. The charges to the DIY authors may be based on each invoking, view, use, and comment, thereby vitalizing widespread entrepreneurship.

As to the WeChat VS Apple Inc. regarding Apple's shut-down of WeChat's "Reward Function," with the CodeChain technology, after a consumer with eyewear aims the "Reward Two-Dimensional Code" presented in the WeChat and the eyewear scans, identifies, and parses out the instruction, the eyewear is connected to the mobile phone via Bluetooth (or the eyewear is connected to the cloud backend via NB IoT and issues an instruction to a specific WeChat pre-bound with the mobile phone) to thereby drive initiation of WeChat's payment program to complete payment.

By providing a light sensing control method, a terminal, and a chip, a wearable device such as AR eyewear may sense specific scene modes such as indoor, outdoor, go shopping, museum when automatically focusing and scanning to access (the specific scenes may be sensed automatically or via manual control, e.g., voice control, touch control, or menu control, etc.), to set up a parameter model based on light sensing intensity, tone variation, etc., thereby forming "a judgment function." For example, in a scene of library, head down to read a book (focused-mode two-dimensional code identification with a short distance of 20 cm) and head up to look at a person 10 m away (10 m focusing) can be controlled automatically with the eyewear, without additional controls such as button pressing, touch, voice, etc. And/or, as shown in FIG. 5, a ranging method may be used. For example, a camera or other device emits infrared light, supersonic wave, or laser to a to-be-identified object, and receive the light or acoustic wave returned from the to-be-identified object via the camera, which realizes ranging; and then the object distance is computed based on the ranging. With this technology, the "distance differences" between the signals fed back from various angular positions of the three-dimensional stereoscopic code (a three-dimensional stereoscopic code structure based on the CodeChain two-dimensional code encoding mechanism) formed on the object surface are processed to obtain a mechanism similar to scanning a planar two-dimensional code, thereby completing identification and access of the "three-dimensional stereoscopic code." The three-dimensional stereoscopic code, which is distinguished from the planar two-dimensional code; due to its three-dimensional stereoscopic feature, it may be identified by "light sensing" of the "CodeChain access" device; such access utilizing light sensing control is referred to as light sensing access.

In view of the above, there is provided a light sensing control device (or integrated chip), comprising an optical sensor, a register, a data processor, a memory, and a display (not compulsory). The light sensing control device may optionally comprise: a sensing array, a sample and hold circuit, an A/D converter, a function register, a data register, an index register, a control circuit, an I/O circuit, a processor, and a memory.

The sensing array acquires an optical signal; the sensing array is connected to the corresponding signal input end of the function register; various data signal ends of the function register are connected to the corresponding signal input ends of respective data registers; the data signal output ends of various data registers are connected to the data signal end of the index register; the signal end of the index register is connected to the signal end of the control circuit; the data signal output end of the processor as the output of the light sensing control device to control the application corresponding to the mobile smart device configured with the light sensing control device, or control the specific function module to identify and decode the captured two-dimensional code.

In an example, a "smart travel" headset (with a CodeChain access camera) based on CodeChain access is provided, which may view an invisible two-dimensional code (setting the personal attribute preference in advance) propagated by a multilingual satellite TV.

With a person walks on the street with the eyewear, the eyewear is like an accompanied tour guide, which, when identifying the flowers, grasses, trees and buildings (two-dimensional codes worn by other people, or hidden two-dimensional codes), would tell the histories and stories of the city (wherein the eyewear identifies the objects or accesses the hidden two-dimensional code, and the headset plays the histories and stories of the city in a specific language). People may escape from the world ruined by screens and experience the real world, entering the world with interpersonal interaction and person-object communication.

The multilingual versions of the voice communication are available for the headset to configure and select. For example, providing a good opportunity to learn Shanghai dialect and understand the history of Shanghai Bund, to vitalize historical values of announcers and dubbers (telling old stories of Shanghai) and the resources of old Shanghai people (historical accents and languages), give a play of the vitality of Shanghai histories and cultures, and build up city cultures, vitalize non-historical culture heritages, and build a "CodeChain museum" for smart travel and smart city. For example, reliving the history and culture of Silk Road, wherein local dramas such as storytelling, playing & singing, and Shaoxing opera would be presented. Through eyewear access and identification, backend services may be obtained and played via headsets, while the mobile phone may display various kinds of "newly generated CodeChain two-dimensional code, and/or hyperlink".

The eyewear has a setting configuration function, wherein the menu may be set through voice control: accessing and playing a video or recording by each time of code scanning; enabling continued play from the break point by scanning the code again; or, first finishing play of the previous content and then starting the next one. The menu may also be set in the mobile phone/WeChat by scanning code (uniquely corresponding to the ID of the eyewear) with the mobile phone/WeChat, thereby implementing a customized function.

Figure 11:
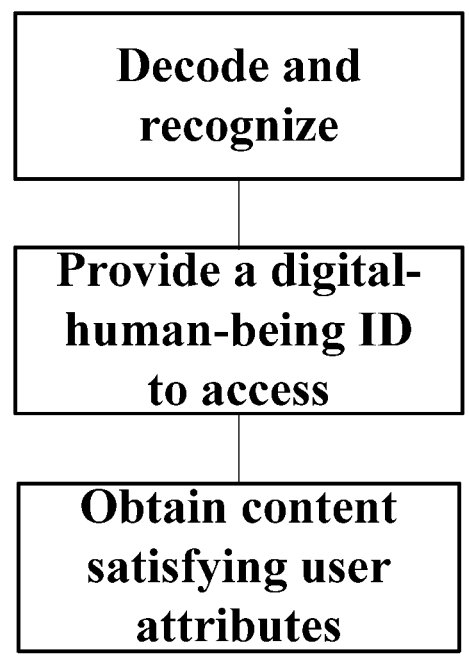
FIG. 11 is a schematic diagram of providing a service satisfying digital human being characteristics based on a digital human being identity.

FIG. 11 shows a schematic diagram of obtaining, different users, different contents based on a same two-dimensional code. Hereinafter, illustration will be made with another light sensing access manner and application scene as an example:

In an exemplary application of 5D theater, "an invisibal two-dimensional code" (e.g., a light lattice map generated in the form of light-dark variation, refurbishing frequency variation, invisible light, etc., which is invisible to bare eyes but identifiable by an eyewear) is superimposed in the shot movie; the audiences enter the theater with "modified 3D eyewear, i.e., the eyewear described above"; when the audiences watch the big movie on the big screen, based on their individual attribute settings (e.g., gender, preferences, desired movie ending), the eyewear scans the hidden two-dimensional code to access; and based on different attribute settings, "a small movie specific to each audience" is played on the small screen of the eyewear; the watched movie may not only include "gossip voice-over" but also may include a totally different "ending according to settings of preference attribute." Besides, after the eyewear scans the code and quickly identifies the two-dimensional code instruction, it may directly invoke gossip short clips about the movie, which are pre-stored in the eyewear; it may also contact with the backend in real time via a WiFi/5G communication module; the backend drives the mobile phone already bound to the "eyewear" to play and save a "play record" on the mobile phone for later check. The digital human being DNA of the user may also be superimposed with the mobile phone so as to share the obtained ending and other content to the SNS network for dissemination. An ideal mode is to instantly download and play the video introduction and other operation instructions to the eyewear without intervention of the mobile phone.

Similarly, "a hidden two-dimensional code" may also be superimposed on various static or dynamic objects in a scene such as museum, gallery, exhibition, etc.; corresponding information such as backend introduction and dynamically presented content may be obtained through eyewear identification and access; the content may be "audio played" via the Bluetooth headset of the eyewear to achieve a natural audio instant effect like human communication (i.e., every piece tells a story), but also may be displayed on the display device of the eyewear; it may also be recorded and presented in a mobile phone previously bound and linked with the eyewear. Moreover, the individual digital human being ID may be superimposed; based on the preset preferences, the obtained information can be more pertinent and personalized. Or, the hidden two-dimensional code may also be in a polarized light mode, i.e., "the display screen uses a polarized material." The AR eyewear may identify the polarized light such that the "0°, 90°" polarized light generates 0, 1 (i.e., a black-white alternating effect of a two-dimensional code) when being identified.

The display device may further comprise a flexible display screen, which is a flexible and bendable electronic circuit directly applied to a human body skin, e.g., implanting the circuit into skin to turn the skin into a touch screen. Such an electronic circuit comprises a flexible transistor, an organic LED, a sensor, and an organic solar cell, etc., which are connected by a malleable flexible wire. Of course, these components are made very thin and coated onto a flexible substrate to form a large-area electronic circuit resembling skin and then implanted into human skin. Such circuit has a very high sensitivity; even a slight fibrillation of muscle can be accurately sensed. Existing wearable devices cannot achieve such high sensitivity. Further, in conjunction with a quantum CodeChain material, access and display may both exhibit a non-silicon-based quantum entanglement effect, such that it is not only enabled to generate "a quantum entanglement effect" at the access instant via the tangled angel brain, but also enabled to feed back to the electronic skin through the quantum entanglement effect during the reading process, so as to further stimulate the sense organ, thereby obtaining a benign circle of positive feedback.

By controlling the flickering frequency of light (e.g., LIFI light) to cover and irradiate a real object, an optical signal capturing unit (camera of eyewear) is enabled to obtain an optical signal; through sensing and identification with an optical signal identification middleware, the optical signal capturing unit may be driven to identify the optical signal; the optical signal is decoded by a decoding unit and converts, after decoding the optical signal, the optical signal into a server operation instruction corresponding to the optical signal; a transmitting unit is configured to transmit the server operation instruction. In this way, a "LIFI (Light Fidelity) CodeChain access" is formed. with the festival light show in Shanghai Bund, the "LIFI CodeChain laser" may be played, such that the eyewear may access to generate a two-dimensional code (digitalization) superimposed with its own DNA and the picture video simulating the real scene, etc.

The LIFI ray covering a real object may also be implemented by controlling the flickering/refurbishing frequency (frequency of light, simply referred to as light frequency) of the imaging on the computer/TV screen: an optical signal capturing unit (camera of eyewear) is enabled to obtain an optical signal; through sensing and identification with an optical signal identification middleware, the optical signal capturing unit may be driven to identify the optical signal; a decoding unit is configured for decoding the optical signal and converting the optical signal into a server operation instruction corresponding to the optical signal; a transmitting unit is configured to transmit the server operation instruction. Based on the above technology, "light frequency chain access" may be realized.

Example of "light frequency chain access": an apparatus configured with the light sensing control device can perform automatic focusing and "capture or continuously capture" the coding medium based on the environment surrounding a mobile smart device and/or the state of the mobile smart device so as to identify the "two-dimensional code" existing in various pictures, thereby implementing a control effect of stepless amplification of "code-scanning access" similar to "multi-point touch" (i.e., the aiming and focusing actions of a common two-dimensional code scan without manual intervention), thereby becoming a standard function of the "smart eyewear" in this example.

An example: an AR eyewear accessed through "light sensing access" and "light frequency" access; an apparatus configured with the light sensing control device can perform automatic focusing based on the environment surrounding the mobile smart device and/or the state of the mobile smart device, and may be controlled by operations such as voice, touch, and menu. The display may project an image which has been adjusted by the lens on the nose pad onto the eyewear lens, and finally projects the AR effect using the light wave guide structure of the lens into the human eye (a micro OLED display may be built in the eyewear holder, to thereby implementing a control effect of stepless amplification of "code-scanning access" similar to "multi-point touch" (i.e., the aiming and focusing actions of a common two-dimensional code scan without manual intervention), such that display of the screen image may be manipulated through eyeball rotation. It may also be a "colored, flexible, skin-like display": the color on an ultra-thin nano structure surface may be changed by externally applying a voltage. Moreover, this ultra-thin nano structure surface may reflect the surrounding ambient light. A thin liquid-crystal layer is a sandwich structure made on a metal nano structure, resembling a shape of a micro egg case, which may absorb light of some wavelengths while reflecting light of other wavelengths. The reflected color may be controlled by applying a voltage over the crystal liquid layer. The interaction between the liquid crystal molecules and the plasma waves on the surface of the nano structure metal surface plays an important role in implementing a full-color-adjustable screen without polarization dependence. Combination with flexible and scalable nanometer material: the thin film-like nanometer material is formed by an interweaved and complex nano fiber silk screen, wherein the silk screen is attached to the solid matrix using an electroplating technology. Besides flexibility and extensibility, it also has properties of transparency and high conductivity; this nano silk screen may be created by electrospinning of polyacrylonitrile microfibers. First, the microfiber reel is wound around the solid matrix lap by lap to form a complex net structure, and then metal alloy is sprayed on the silk screen and copper plated. In this way, eyewear access, signal conduction, flexible display, and sensing control are integrally implemented.

With population of the above mode, in the real world, each person may be deployed with a "hidden two-dimensional code" to form an issuer for the "eyewear wearer" to identify and access, thereby obtaining matching information based on different attributes of the wearer or the different conditions set by the code issuer; for example, wearers with different attributes obtains different personal introductions of the corresponding issues (the elements accessed by the light frequency chain and the manufacturer of eyewear may be referred to as the introducer or accessing person and thus becomes part of the "value chain, value CodeChain"); at this point, after the eyewear scans the code and quickly identify the two-dimensional code instruction, it contacts in real time with the backend via a 5G communication module, the video instruction and other operation instructions are instantly downloaded and played without manual intervention or intervention of other devices such as a mobile phone.

Four-dimensional space class application in audio-visual teaching as a digital human being dissemination and propagation:

A teacher prepares teaching courseware of high level, middle level, and low level, and generates and displays a teaching two-dimensional code (which may be textual, or may be a screen display of ppt, or may be a hidden two-dimensional code on the teacher's face or body: the students pre-set a level based on their acceptance degrees, such that when different students access the courseware by scanning the two-dimensional with the eyewear, different contents can be displayed (on the eyewear screen) based on the different levels, which may also be displayed on the mobile phone in signal connection with the eyewear signal via Bluetooth, while the high, middle, and low levels may also be preset in the mobile phone; the contents corresponding to respective levels may be pre-stored in the eyewear or mobile phone, or may be obtained from the cloud end over network and correspondingly displayed according to instructions.

The present disclosure provides a method, apparatus, and system for generating an AR application and presenting an AR instance. According to the embodiments of the present disclosure, pre-fetching of local recognition and cloud recognition and a smart switching function are implemented through cooperation, and by pre-caching a local recognition packet having part of augmented reality instances, firstly performing local recognition with the local recognition packet, and then performing cloud recognition after failure of the local recognition, issues such as excessively occupying the storage space and too long network response delay are avoided. Besides, the recognition modes may be switched based on the user's needs in the real scene, which satisfies the versatility of the user scene needs. The present disclosure not only implements the recognition and tracking function of the underlying object, but also may provide functions of facilitating presentation of the augmented reality content, including presentation of video and 3D animation content. The present disclosure interprets and executes the script file through an interactive control submodule, thereby implementing a cross-platform augmented reality interaction definition mechanism, thereby being suited for multiple platforms and causing the user' interactive activities more flexible.

Eyewear Applications Based On Code Chain and Digital human being Eyewear Technologies The above modes may be widely applied to the real world and a real scene, but also may be applied to scenes such as movie, TV, stories, games for further dissemination.

In the digital mode, e.g., a star concert, a large poster including a hidden two-dimensional code is put up; with a designated AR-supported digital human being eyewear, the preset user head portrait may be superimposed on the star image photographed by the eyewear camera to synthesize a "close group photo"; or, in a simulation mode, while a video recording is shot by the eyewear in a natural landscape, the user may embed his head portrait image into the landscape. For such content integrating the content provided by the user with the short picture, after it is superimposed with the user's own DNA (digital human being ID), a CodeChain two-dimensional code is issued and shared to the SNS, or other networking service, such that reading, sharing, liking, rewarding, applying, shopping, and anti-counterfeiting tracing may be implemented in the Moment.

Exemplarily, with digital human being eyewear in conjunction with the LBS, particularly the landmark information, there is provided a mode of generating a CodeChain two-dimensional code bearing its own DNA (a kind of meta code, including location identity and landmark, etc.).

1) The digital human being eyewear captures to (analogously) identify information managed by the first backend server, such as a human face, an object, a scenic spot, and a landmark, etc.; or, in the field, a store object identification implemented by use of the digital human being eyewear in conjunction with "map LBS management" (under the precondition of communicating with the code issuance management center) is accessed to the first backend (marking location, time, and identity to obtain 5 W basic information), transmitted to "a second backend server" (i.e., the unified code issuance management center) to request for "code issuance" (i.e., "meta code," the first source code for anything and any matter).

2)"The second backend server" (unified code issuance management center) accepts the "code issuance request" to generate a new "code" (meta code, which may be tracked as source in the subsequent access) including the information managed by the first backend server; the code may be transmitted to the first backend server for being saved, and is meanwhile saved in the second backend; besides, the code also supports search, query, and analysis (the information identification by the first backend server includes identifying a human face/an object/a scenic spot landmark, etc., and the second backend may determine whether the landmark/human face/photograph is the same person, and then a determination result is returned to the digital human being eyewear/APP).

Exemplarily, the rights of generating the meta code for the first time may be defined such that accessing via code scanning is regarded as a partner interested in the theme; the digital human being identity as one of the 5 W elements for generating the meta code is automatically notified, and has a privilege to join in all groups based on the theme as established via code scanning.

Figure 10:
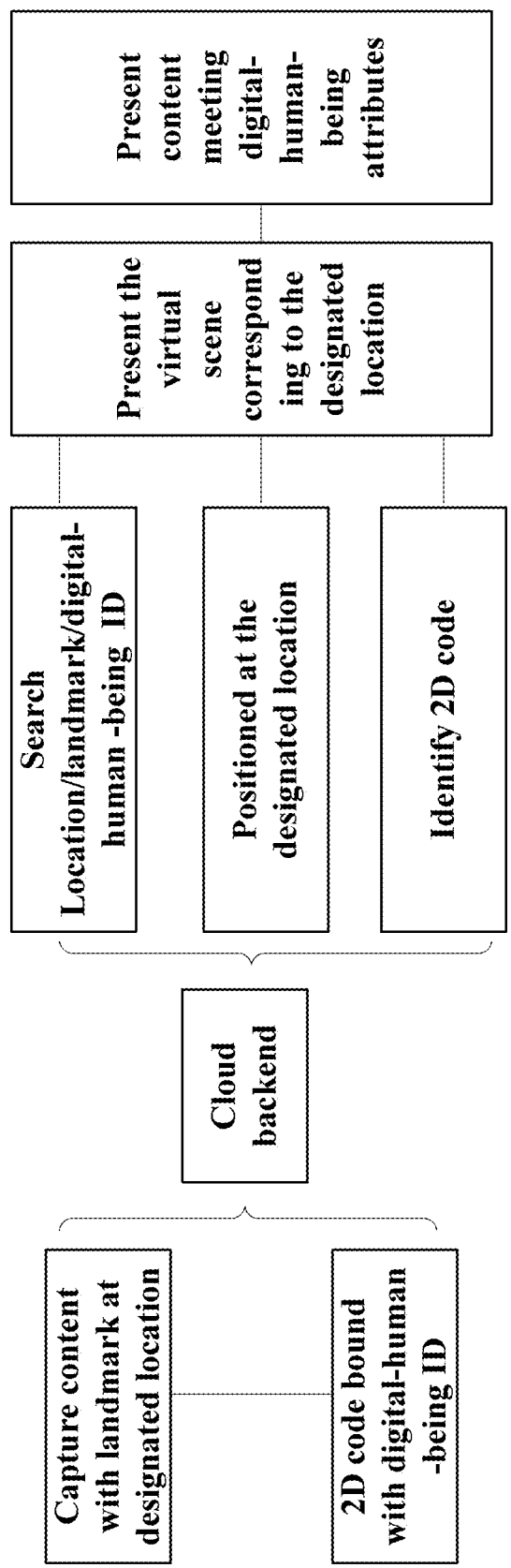
FIG. 10 is a schematic diagram of application of Code-Chain in conjunction with a scene in the AR/VR field.

As shown in FIG. 10, the AR eyewear has been bound with a digital human being ID; in a particular LBS scene, a video is shot or a LOGO including a landmark is captured; after the video/picture synthesized with the two-dimensional code bearing the DNA is uploaded to the cloud backend, the two-dimensional code may be searched according to a condition including: LBS, identification matching with the image superimposed with the landmark logo, the digital human being ID (time sequence of superimposition), and a state of the two-dimensional code being scanned or forwarded (superimposed with the LBS information). The person who uses the AR eyewear or the specific digital human being ID to upload the digital human being ID and generates a two-dimensional code (an application of meta code) is regarded as the "master of the landmark territory" (master of the Globe grid); certain rights are granted to the master, such that the physical world may be shot and scanned through for example a "Master APP" to establish a "digital human being kingdom" in the "cyber space" in parallel (encircling a ground), creating a mode of correspondingly mapping the real world to the digital world over a physical real estate model (including 5 W elements), which is a new mode of eliminating real estate bubbles and supporting widespread entrepreneurship and innovation; while the AR digital human being eyewear becomes a tool for creating value through labor production creativity. The IoT manor game is a specific implementation.

Moreover, by identifying the identity in the 5 W information, the digital human being may be transferred or donated to other person (e.g., Shanghai, as a poverty-relieving support city for Yunnan, may transfer the earnings in the economically developed city to the poverty region), thereby creating a brand-new poverty-relieving support mode to benefit local population; unlike the traditional real estates which exploit the resources of local people, this mode realizes taking from the people, returning to the people.

The AR-based Master APP client and application comprises: an AR engine layer module, an AR resource module, and a plurality of external application modules. The AR engine layer module is configured for loading an identification parameter into the AR resource module when receiving an AR function initiation instruction transmitted from an external application module; the AR resource module is configured for constructing a target AR scene "digital human being kingdom" with an AR resource package which has been successfully identified based on the identification parameter, and invoking a corresponding external application module based on the received interactive operation information of the target AR scene.

Method of using the APP client of the AR: scanning the "digital human being kingdom" two-dimensional code with the AR eyewear to enter AR scene access; or scanning the landmark logo in further conjunction with the LBS information (avoiding remote scanning) to implement the AR function at the Master APP client. This improves user experience and increases user loyalty to the APP client.

Further, the method of configuring the master further includes: superimposing GPS geographic location information based on the XML configuration file information, or superimposing landmark LOGO information; and shooting the scene and superimposing and synthesizing the master's own picture or animation figure to the picture or video, wherein a template paste image may be generated based on the original image or original video customized and uploaded by the user, and combined with a preset three-dimensional scene model; the combined image or video may be displayed by AR; the three-dimensional virtual-real combined display scene is combined with the user picture; meanwhile, the user may customize its own AR display scene. With this method, the user may customize the video or picture of the AR scene and meanwhile generate a two-dimensional code with his own DNA to be uploaded to the cloud backend. In this way, when other visitors match the LBS information by shooting the landmark (image identification and matching with the cloud end) or GPS positioning, they may know the information about the master of the digital human being kingdom; the superimposition may be controlled by a menu-type selection or voice recognition.

Because the master uses the digital human being eyewear to generate a master two-dimensional code/a hyperlink (meta code, generated for the first time for each person) and an image-text video, containing the master ID, landmark, and LBS information (including 5 w information), such that when a visitor wearing the digital human being eyewear to visit there, he may obtain the master two-dimensional code/ hyperlink and the image-text video based on 5 w (such as LBS) access; the visitor superimposes his own digital human being ID (DNA) on that basis (i.e., based on the meta code) and generates his own two-dimensional code/hyperlink and the image-text video, which is uploaded to the cloud end after being saved locally or directly uploaded to the cloud. Advantages of generating the meta two-dimensional code: it may not only be printed and stuck offline, or shared online, to facilitate visitors to access (similar to the LBS digital scene entry); it may even include the master's own DNA so as to provide more ways to access the digital human being kingdom scene. The digital human being kingdom (a new world reconstructed by the CodeChain) offers a digitalized expression, analysis, and utilization of a combination of various objects physically existent in the real world, various kinds of people, and activities of human beings. The master initiates this activity to generate a source two-dimensional code; with access and dissemination (the two-dimensional code may be generated repetitively and superimposed with various contents including new DNAs) of newcomers, the digital kingdom may be extended limitlessly.

The technical solution of repetitively generating two-dimensional codes becomes a basis for a practical social game, thereby implementing applications of IoT in real life. For example, an AR game method is extended from a master two-dimensional code 61, comprising: associating the master two-dimensional code 51 with yin-yang and five elements (ancient Chinese philosophy), Heavenly Stems and Earthly Branches (ancient Chinese chronological manner), horoscopes and Chinese zodiacs, and chemical elements, such that a visitor scans the master two-dimensional code 61 with an eyewear (or mobile phone), wherein the two-dimensional code 61 includes the properties (e.g., oxygen element) of the master A.

A visiting user B (with a property of hydrogen element) generates a new two-dimensional code 62 for the second time based on the two-dimensional code 61, wherein the two-dimensional code 62 includes a synthesis (water element) of the attributes of the master user A and the game user B. Further, a game user C may generate a two-dimensional code 63 for the third time, the two-dimensional code 63 includes a synthesis of attributes A, B, and C. There is no limit on the times of generating the two-dimensional codes. Of course, the generation issuer may arbitrarily set the attributes in the game (digital human being kingdom).

Exemplarily, there is provided a TV AR game system, comprising: a card, a camera, a set-on-top, and a TV; wherein the card is placed within a camera-identifiable region, the camera being connected to the set-on-top, the set-on-top being connected to the TV, and an image recognition library, a model related to the image recognition library, and a UI scene being stored in the set-on-top; wherein the camera is configured for acquiring video information in the identifiable region and transmitting the video information to the set-on-top; the set-on-top is configured for processing the acquired video information, identifying the card information, and matching the identified card information with an image in the image identification library, and in the case of successful match, invoking the model and UI scene associated with the image, and controlling TV display; and the TV is configured for displaying the video information acquired by the camera, the card-matching model and UI scene outputted by the set-on-top.

Exemplarily, there is provided a method of generating one or more augmented-reality AR object by a mobile device, the method comprising: capturing an image of one or more target objects, wherein the one or more target objects are positioned on a predefined backend; segmenting the image into one or more regions corresponding to the one or more target objects and one or more regions corresponding to the predefined backend; converting the one or more regions corresponding to the one or more target objects into a digital image; and generating, at least partially based on the digital image, one or more AR objects corresponding to one or more target objects.

In an example of dividing administrative divisions into Globe grids according to altitudes and latitudes based on the unified mall mode, the title of "Globe grid partner" is obtained according to a rule (e.g., requiring the user to scan code to access via digital human being eyewear and obtain the original Globe grid code with 5 W attributes); in this way, by posting the two-dimensional code in offline stores, not only an entry for natural persons to access the unified mall is obtained, but also the commissions from all partners' consumptions in the mall are shared.

Here, an embodiment of an Globe grid game and its access to the unified mall is provided (its difference from an Internet virtual game lies in that the Globe grid game implements 5 W correspondence, i.e., mapping the real world to the digital world), wherein for the store in the game, the elements at least including altitude and latitude as well as the digital human being DNA must be determined by the digital human being via "digital human being eyewear," such that the game map covering the streets, districts, cities, provinces, and countries is built based on altitudes and latitudes; besides, the digital human being DNA must be contained, such that the store owner at the corresponding position in the game is the digital human being (corresponding to the Globe grid master). Only with these conditions satisfied, can the "game store" reside in the street; therefore, both the street and the store include the concept/element of "Globe grid"; the street in the game needs construction (purchasing land, planning, building, and soliciting investors, etc.); the store needs to purchase commodities to reside in the street, and each commodity has a value chain/two-dimensional code that is accessible to the "unified mall."

When the consumer scans a code offline or enters the game online, he may click the store and then click the "value chain" in the store, such that a commodity detail page is presented; then, he accesses the unified store to complete purchase. Moreover, the consumer may access from store A and enters the unified mall to purchase a cross-industry commodity B; the purchase through store A's dissemination chain may be traced and recorded, such that store A (corresponding Globe grid) is entitled to a transaction commission from purchase of commodity B; residents or visitors' entering the game via offline commodity A or accessing the game via other channels to enter the store and purchase commodities (accessing the unified mall) can be traced to "source access value chain"; in this way, the "dissemination chain" is rewarded, including the dealers in the value chain, where the master rewards the dealers based on the transaction commission.

In this way, the originally offline traffic resource is conveniently and efficiently driven to the online game, and the origin of each drive traffic is rewarded based on the transaction commission; in this way, the offline store receives a performance-based distribution and has the incentive to refer; moreover, consumers have more scenes to access the game, and sharing can also generate a transaction commission, such that the game is more easily disseminated to various corners and more population.

Further, it may be prescribed that all purchases of a commodity in the region (e.g., city, street, store) defined by the Globe grid are recorded as the earnings of the Globe grid according to a certain proportion (compared with IoT region and population attribute, meta code is an individual original two-dimensional code based on 5 W, particularly LBS positioning). The location where the user/consumer first enters the mall for consumption serves as the home location of the user (the mobile phone number first subscribed may serve as the identification information corresponding to the use); later, the user accesses from other place and consumes at the mall corresponding to the industrial code server (the server of the unified mall), which is regarded as "roaming" of the Globe grid; different earning recording proportions and/or commission distribution proportions for home location consumption and roaming consumption. Then, the local resident consumption, the outside tourists' consumption in the local place, and local residents' consumption in other areas can all be recorded.

Supposing that the consumer obtains a partner qualification (equivalent to the first-tier dealership of the mall) by purchasing a specific commodity (reaching a specific amount) in the first issuance, the partner's purchase creates a profit for the mall; however, in this case, it may be provided that the share is not distributed, but enters the industrial fund matched with the industrial code server, which is invented to the industrial base (an associated matter) to achieve a more cost-effective product; then the product enters the Globe grid partner system of the present disclosure for recycled consumption; quantized by consumption weight based on regional details, the partner's earnings can continuously increase.

In this way, the following scene may be implemented: the earnings corresponding to the "Globe grid (store)" in the game may be quantized; therefore, the Globe grid, as the "property certificate/right-to-earnings certificate of the virtual real estates in the game," the Globe grid can be transacted; it may also be listed in the digital assets exchange or leased; when a sale occurs in the "IoT store," e.g., a commodity (value chain) of the residing store is sold, or a code-scanning payment collection occurs in the store, the earnings are all associated with the "Globe grid" master.

An exemplary manner of generating an Globe grid master in a game is illustrated below: When a consumer spots a store in an offline commercial street, he captures and records the house number and uploads it to the "service street"; then the service platform generates a specific two-dimensional code, including a label, house number, and geographical location information with identifiable latitude and altitude, and distributes the two-dimensional code to the consumer: the consumer approaches near the store, and uses a digital human being eyewear bound with his own digital human being DNA (e.g., WeChat number) to "ONE STARE" at the two-dimensional code (code-scanning identification); then, the location information (which is checked with the positioning system (e.g., GPS location) of the digital human being eyewear, and then the check passes), timestamp, and identity are generated at P backend (first backend) via the digital human being eyewear; the information is seamlessly transmitted from P backend to M backend (second backend, i.e., two-dimensional code generation management platform); the M backend generates a first two-dimensional code (i.e., an Globe grid code) including the altitude-latitude location information and the digital human being DNA information, transmits the first two-dimensional code to the Globe grid game backend (third backend); the game may open up the map in the "game" based on the "two-dimensional code" (including the altitude-latitude location information and the digital human being DNA information); in this way it is implemented that the "Globe grid" (four-dimensional world) master recording the house number is the consumer (embodied by the digital human being identity, e.g., WeChat number); if another person completes shopping via the "Globe grid" (by accessing the "industrial code server" via offline code scanning, or accessing the unified mall; or accessing the unified mall to shop via online promoted game), the Globe grid master may obtain a reward such as transaction commission, wherein the reward and transaction commission may be "presented" and "used" in the digital human being DNA account.

Further, a visitor may buy various kinds of agricultural means of production in some stores, such as crop seeds, pasture young animals, and feeds, to entrust a third party to plant or raise (cultivation and breeding based on true bases in the backend); upon harvesting, the principal may receive profits, self-use, or entrusted the third party to sell. In this way, the "commodity" in the "store" has one or more dealers in the game to help him to market and sell.

This game provides two perspectives: merchant and player, wherein the merchant includes a planting merchant and a non-planting merchant. The planting merchant mainly deals with cultivation and raising, and the non-planting merchant mainly deals with answer games and lotteries. The merchant is responsible for building a real store in the game, while the player is responsible for playing games such as nurturing games. The nurturing and other playing manners facilitate secondary interaction between the merchant and the player.

In the game, the merchant plays a role as the initiator of a game task, who simulates task setup and release through game elements such as farm, pasture, fish pond, question-answer, lottery, and etc.; while the player plays the game such as cultivation and breeding via the merchant's store in the game; when a certain task condition is met, the player may redeem the real merchant's discount coupons in the game.

The IoT game is an IoT game which integrated offline with online and links real world and virtual world, like a combination of "land enclosure" in the city of "Richman" game and "growing vegetables" in Happy Farm game; the IoT game is docked to the merchant-user interactive manner in the real world through playing game and the virtual elements in the game.

To enrich gameplays, the IoT game includes the following system control managements at the backend under an exemplary central theme to provide corresponding game elements:

Education System (player level growth, crop quality growth, manor construction growth, merchant store development growth, pet level growth, etc.); by recording the respective operations of the player and the merchant in the game, it may be determined whether they satisfy the growth standards for relevant items so as to update relevant attributes of the player and the merchant;

Farm System: which presents appropriate game elements for different scenes and the operations in the scenes, e.g., farm landscape, including grassland/beach/mountains; the farmland practices plantation, the pasture practices livestock raising, the fish pond practices feeding, and the vendor booth practices vending of fruits, etc.;

Friend System: which prescribes the manner of adding friend, e.g., guest add/search id add; the precondition for adding a friend is to obtain consent from the counterpart; and determine whether the player operation is standard;

Share System: which refers to sharing of game/value chain commodity, wherein the number of times of sharing, the scope of sharing, e.g., individual/group/moments, etc., are restricted.

Mist System: mist is preset for some territories in the game map and is unlocked after determining that the operation satisfies a rule; the system may set mist scope, e.g., provincial scope, or part of a farmland, etc., and set the condition of unlocking the mist, e.g., becoming a VIP, purchasing an eyewear, etc.;

Weather System: which involves setting and displaying corresponding weather at certain time in certain region of the game, and it may also be prescribed that different weather types may affect yields, etc.;

Construction System: which involves merchant construction, spending gold coins (docked to the currency system) to upgrade merchant store; if the user construction is involved, spending gold coins (docked to the currency system) to upgrade farm and manor construction, etc.;

Currency System: which involves currencies in the game and prescribes approaches of obtaining the currencies and redemption mechanisms, etc.; for example, the currencies may be differentiated into gold coins produced in the game and consumed in the game; and ingots obtained through sharing/recharge;

Vegeteal System: which involves vegeteal rules, e.g., vegeteal conditions/vegeteal restrictions/vegeteal gaining/vegeteal dropping;

Article System: which involves use, kinds, purchase (consuming gold coins), and piling (docked to the warehouse system) of articles;

Warehouse System: which involves warehouse capacity, type, maximum pile quantity; when it involves expanding the warehouse, consuming gold coins (docked to the currency system);

Answer System: which involves answer-embedded merchants, e.g., the merchant type is non-planting education, and involves settings of answer rule, e.g., consuming ingots (docked to the currency system) when requesting for prompting the answer, and limiting the number of times, etc.;

Lottery System: which involves setting of lottery rules, e.g., lottery refurbishing/lottery times, etc.; gold coins are consumed when drawing a lottery (docked to the currency system);

Pet System: which involves relevant settings of pets in the game: species of pets, level growth (attribute increase), pet attributes (e.g., satiety degree/capture odds/sleep time, etc.), and how to obtain a pet (e.g., donated/sold by the system/lottery/sign-up, etc.);

Task System: which involves relevant settings on the game tasks: kinds of tasks, e.g., routine tasks like daily sign-up, time-limited tasks released by the merchant, and green-hand tasks (tutorial courses for the user/merchant); and obtaining task resources, e.g., for a nurturing game, through planting/livestock raining; for a non-nurturing game, through answering questions/lottery/sign-up, etc.; for rewards of tasks, corresponding merchant coupons/experience and part of gold coins may be obtained from completing a task; and receiving tasks, e.g., through the merchant/system/official e-mall, etc.;

Mall system: which involves mall rules, e.g., displaying the coupons/seeds of all merchants; receiving a list of tasks of all merchants through the official e-mall, and redeeming the coupons at the e-mall, etc.; the e-mall sells gold coins, etc.;

Cross-Border System: which involves cross-border rules and conditions, e.g., unlocking according to the player's level, unlocking on a one-for-one basis; and it is prescribed that cross-border consumes gold coins, etc.

The various embodiments above indicate that, with CodeChain access and use manner, the present disclosure may implement effective evaluation and monitoring of the activity of each person by the whole society based on the social justice an distribution justice proposed by Hayek.

Further, by constructing an information society through CodeChain, it is the ultimate purpose of information development to realize transformation from the industrial society to the information society; the development of the above two stages is to create conditions for realizing this objective.

The information society is built based on the reality space and network space; therefore, it is needed to abstractly represent the social system of the reality space to the network space and through information development and construction, support an integral information execution environment of various trades and industries in the network space.

Its basic operation mode is to promote the social information activities (including information acquisition, processing, storage, transmission, and a process from problem to decision) to the network space so as to realize high-speed and efficient operation across time and space, and implementing the information processing result to the reality space, thereby realizing a precision and efficient implementation. Further, the human activity is digitalized and informatized for management and control; by converging "each digital human being" through "CodeChain," a Global Brain is formed; the CodeChain is physical convergence, while the Global Brain is thinking convergence.

Meanwhile, the IP-based Internet/IoT is currently constantly evolving, and the artificial intelligence extended therefrom has a development prospect: the survival and preference of an individual person is designed and satisfied by a sensor control system, which is equivalent to the case that the existence of the individual person is dominated by others. The present disclosure attempts to establish a model based on the idea of "quantum CodeChain" (cross-disciplinary product, crossing physics, life science, information science, financial economics, philosophy and social science, etc.) from another dimensionality and another way. In a sense, we are exploring a simple and computable low-cost dissemination model of credit information based on a belief that information uncertainty is fundamental to the society.

The CodeChain access is a "light in replacement of electricity" access based on 5 W (why, what, where, who, when) constituting the world, while the quantum CodeChain is a network mechanism which uses the "carbon-based double-stranded DNA" attribute (wherein the silicon base is single-stranded) to generate entanglement reaction and transmission quantum; according to the quantum CodeChain, a digital human being brain is also considered as a quantum computer; the coding medium (e.g., optical two-dimensional code) of the quantum CodeChain becomes an externally input stimulation to the brain synapses; various digital human beings become individual brain cells of the Global Brain by entangled link to the human brains. With the "quantum CodeChain" access and transmission (transmission of signals via the neural network), the quantum computer of each "digital human being" may excite the "thoughts of each digital human being" via the entanglement formed by quantum code access, causing the quantum CodeChain (retaining the structure of the information) may converge the information and energy of the whole human kind into "Global Brain."

The life biological mechanism of human-machine interaction is not a pure physical electric signal; instead, light is a very important medium. Light in replacement of electricity will become the mainstream in future link, because electricity only has a one-dimensional physical property, it can only serve as a medium; however, light has a multi-dimensional property including physics and information science (the structure of the information may be retained), such that entanglement is inherent in light. The link access of quantum chain with light in replacement of electricity is embodied as entanglement in the micro level, as coupling in the mesoscopic level, and as convergence statically in the macro level.

The optimum manner of quantum chain-based access is the "light in replacement of electricity" sensing access manner. With a quantum device such as "smart eyewear (digital human being eyewear)," uniform access to the "code issuing center" (quantum computer with more macro-management) is enabled through "reflection/dissemination" of light signal (the receiving device may sense quantum entanglement effect, but not limited thereto). Because the Globe grid has 5 W elements, the Quantum CodeChain access may implement "superimposing its own attributes over the 5 W Globe grid attributes, and increase/decrease attributes at the unified code issuance management center," and such increase/decrease is fed back to the digital human being's purse.

In this way, the Globe grid is distinct from the IP address-based Internet access mode. In this case, individual Globe grid may be regarded alternative to IPs in the IoT era, and a new human-oriented access manner bearing "value chain" at each access, alternative to the conventional TCP/IP access manner.

Smart digital devices are constantly enriched and developed: smart cameras, smart POS machines, automatic vendors, smart sensing devices, etc. (which can become constantly compound and smart). The population of mobile terminals and wearable devices enabling quantum CodeChain access and the advent of the new IoT age constitute the physical basis of the "digital human being." Example of the wearable device is smart eyewear (the material in use is a low-energy-consumption electronic device like Weyl fermions; due to its stable topological property, it plays a significant role in high fault-tolerant quantum computation).

Code chain is a digital model embodying basic human activities. The "code" in CodeChain may be embodied as a two-dimensional code, or a multi-dimensional code, a hidden two-dimensional code, or even any coding medium such as a "quantum code" which can be digitalized for sensing access, as long as it can record the information structure. Such recording may refer to recording in the "code," or a "record" with consensus based on "CodeChain" verification, or a recording through accessing the "code issuing center," as well as a combination of various manners above. The "code" in the quantum CodeChain is defined as such: code may be a data structure (service provider, service content, service state, source, associated service, and attribute, etc.) describing activities; until it is accessed (i.e., observed) to generate a collapse of wave function, can it be determined as a specific "state" from the qubit quantum liquid state (it needs support from quantum bit materials and quantum computers; thereby constructing a qubit world different from the silicon-based bit world). Human-service link protocol: forming an entanglement effect to generate a new code and a new link through "quantum CodeChain" access based on two-dimensional one scan, eyewear one stare, and thinking, etc., to construct a "quantum CodeChain." The quantum CodeChain ideology points out that to maintain truth and reliability of information dissemination, there requires human involvement, while the human involvement is on the basis of CodeChain model and embodied through accessing the CodeChain network via activities such as two-dimensional scanning, staring, and thinking.

The digital human being serves as a proxy program for personal entrustment, and a unique entry for network interaction between an individual and the network; the digital human being may automatically execute some actions of providing, filtering, and forwarding data according to the entrustment of the person. Extended Meaning of Code Formed in Combination of Digital human being: a repeated consumption voucher obtained based on human travel consumption activity, general delivery voucher-consumption code form obtained from human pre-paid consumption activity, and a logistic delivery voucher—logistic code form obtained from human warehousing and logistic activity.

Code Issuing Center: a globally trustworthy and unique data center for issuing a to-be-scanned code (including various sensing access) to perform uniform code issuance; the quantum computer is a best selection. According to the quantum CodeChain-based information processing network based on uniform code issuance, the method for the same, and the sensing access device, an issuer files a corresponding code issuing request with a core administrator (code issuing center), the core administrator or a code issuing agency authorized thereby generates a coding medium (the coding medium may be captured through "one stare" and/or "thinking" and is accessed and transmitted via quantum code), such that the accessing person can obtain the information matching the identified coding medium when recognizing the coding medium with an equipped quantum sensing access device (i.e., the probability state of the observed information qubit quantum state, the collapse of the wave function, is determined, becoming significant to the macro world), and further obtaining the following information provided by the issuer, including: information to be issued by the issuer, attribute state of the issuer, attribute state of an interacting party associated with the issuer, and information (qubit quantum state) obtained from identifying other coding medium with the quantum sensing access device equipped to the issuer. This access manner is referred to as "quantum CodeChain access."

Definition of the Digital human being: in the mobile network era, with population and promotion of "digital human being eyewear" and "quantum CodeChain," the activity transaction of each space-time ($5w$ IoT space-time) and node in life+space may be quantized, recorded, and full-process traceable (i.e., thinking and activity of human), and their actual social effect can be observed (the action and reaction of the digital human being individual against the human society).

Each digital human being is like "each brain cell"; the quantum CodeChain is like a brain neural network, the access point (two-dimensional code/hidden two-dimensional code) is like a brain synapse; the eyewear is equivalent to a neuron of transaction nerve; while the network formed by "digital human beings" of different principals via quantum CodeChain access is similar to a "brain functional region" with different functions; in this way, the individual "digital human beings" can converge to form an "Global Brain."

The CodeChain can be narrowly defined as an access manner of substituting the digital human being ID and transmitting it to the cloud service backend by two-dimensional code scanning (offline) and Moment tapping (online) to thereby implement full-channel access and full-process traceable management.

Difference and Relationship between Code Chain and Two-Dimensional Code: a typical "two-dimensional code" is a static code, which is not linked with the backend server or controlled by a code-scanning APP, while a "CodeChain two-dimensional code" is issued under the control of the backend server and accessed by code scanning by the APP under the control of the backend server, thereby forming an coordinated link of "two-dimensional code+server+code-scanning APP."

The brand-new CodeChain ecology system emerges: the digital human being eyewear is a personal access terminal like iPhone; the digital human being eyewear operating system and the CodeChain access protocol are similar to IOS system and Internet protocol access; the CodeChain server (including the B2B industrial code, similar to B2C smart travel personal customization) is similar to APPLE APP store (i.e., a server that may customize and release a plurality of services); the code issuance center is similar to the IP management center of a DNS root server; in this way, an entire CodeChain ecological system which is downwardly compatible the conventional IP Internet and replaces IP with code; the downward compatibility means that owing to code in replacement of IP, "light instead of electricity" real-time access in various scenes in the real world is enabled, such that what is obtained is what is seen, i.e., "ONE STARE" to access (like mouse clicking or finger touch to trigger access in the screen world).

The CodeChain is broadly defined as such: the accessing device is not limited to a smart phone, but further includes an digital human being eyewear mentioned herein and quantum CodeChain eyewear; the access protocol is not limited to one scan, tapping, and one stare, but further includes sensing access, thinking, and quantum CodeChain access (using the quantum condensed state qubit material, which generates quantum entanglement, i.e., wave function collapse, upon accessing); the code issuing center also uses the "quantum condensed state mechanism."

For example, a moral quality of a person can only be determined (i.e., collapsed) by a principal-specific observer based on "social network and previous comments." For another example, the value of a quantum CodeChain digital currency refers to the definition based on the digital human being network and the morality index at the instant of use, collapsed to a specific numerical value.

The Global Brain serves as part of "value" system of the human society; "advertising capitalization and circulation dissemination valuation" is only one of the applications of commercial activities of the digital human being network; every person lives in a "me-centered digital human being network system"; when he sees an advertisement (O2O access, he may verify its authenticity and perform value judgment through SNS search, and may allow comments for his friends' reference. All publicity points (the touch points of all merchants, i.e., what is seen is what is gotten, existent at any time and any place) constitute the neural synapses (O2O, offline2online, real world to virtual world) access points and the neural network dissemination (SNS value chain dissemination) of the Global Brain.

Each person is like a "brain cell"; the O2O two-dimensional code serves as the access point of the "brain synapses"; the digital human being network is the brain neural network; the morality index refers to the active degrees of different brain cells, which may derive different "brain active regions." The code issuance agency (i.e., code issuance center) will become a "brain center." In this way, an "Global Brain" is constructed; i.e., all digital human beings on the earth are regarded as various brain cells; the two-dimensional codes serve as the access points of the brain synapses; the digital human being network is a "brain nerve" of various attributes; the quantum CodeChain access is like a brain nerve reflex. The eyewear may adopt "a quantum condensed state access material."

The Global Brain is constructed differently from the manner of "mapping brain network graph using brain connection information" at the start. "The water molecules in brain tissues are constantly making a diffusion movement, which are not only affected by the eigen features of the tissue cells, but also affected by the internal structures inside the cells, e.g., white-matter fiber bundle. In a tissue structure with a fixed arrangement sequence, e.g., a neural fiber bundle, diffusion of water molecules in various directions is different, and the water molecules are more inclined to diffuse along the running direction of the neural fiber bundle; such direction-dependent diffusion is referred to as diffusion anisotropy."

Diffusion tensor imaging (DTI) may quantitatively assess the anisotropy of brain white matter, and may determine the principal direction of the brain white matter and then track the neural fiber bundle to obtain the anatomic connection information. This manner still dwells at the static structural recognizance.

The future of "brain science" lies in a dynamic process recognizance, which is the essential difference between human intelligence and artificial intelligence: the neural loop may be constantly reconstructed, while i the artificial intelligence chip or other chips, failure of one of billions of switches would possibly cause "crash."

However, the "angle tangled brain" does not rely on activities of any brain cell. The angle tangled brain is a dynamic whole structure, which needs a dynamic, holistic recognizance; the method according to the present disclosure may construct a model analogous to human brain and capable of explaining the group behaviors of human on the earth.

The digital human being eyewear may be regarded as a human evolution tool; CodeChain is an access manner, meta code including the 5 W elements in the real world is an access point; the present method including interaction among the three helps the human society to build a new production relationship in the four-dimensional space based on the three-dimensional world, which may provide a better guidance to human behaviors.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

I claim:

1. An access method, comprising:
configuring corresponding industrial code servers for multiple principals belonging to different industrial fields, respectively, industrial code server is used to manage relevant matters in a respective industrial field to which it belongs; the matters managed by each industrial code server include: information of a principal corresponding to the industrial code server; multiple principals include a first principal, and at least one other principal apart from the first principal, and other principals include a second principal;

configuring a first industrial code server corresponding to the first principal and to record behavior and identity identification information of each level of disseminator to form a traceable node;

wherein coding mediums associated with the first principal are propagated step by step through several levels of disseminators to form a propagation chain;

wherein the coding medium at each level of propagation is jointly associated with the information of the first principal and respectively corresponds to the identity identification information of the disseminator at this level; and identifying, using a terminal device of an accessing party, any propagated coding medium, accessing a first page corresponding to the first principal, obtaining information corresponding to the first principal, and obtaining first heterogeneous access information; the first heterogeneous access information corresponding to a first heterogeneous access route;

wherein the terminal device of the accessing party interacts with the first industrial code server and completes a transaction with the first industrial code server based on the obtained information of the first principal;

wherein the terminal device of the accessing party accesses a page corresponding to at least one other principal through the first heterogeneous access route, and obtains information corresponding to at least one other principal;

wherein the obtained information of the at least one other principal includes information of the second principal;

configuring a second industrial code server corresponding to the second principal wherein the second industrial code server has different operators from the first industrial code server; and wherein the terminal device of the accessing party interacts with the second industrial code server corresponding to the second principal and completes a transaction with the second industrial code server based on the obtained information of the second principal, generating revenue on matters managed by the second industrial code server;

wherein the second industrial code server distributes a share of revenue to the operator of the first industrial code server and disseminators at all levels who have propagated the coding medium associated with the first principal according to nodes recorded by the first industrial code server.

2. The access method according to claim 1, comprising:

the terminal device of the accessing party accesses a second page corresponding to the second principal through the first heterogeneous access route, and obtains the information of the second principal and the second heterogeneous access information from the accessed second page, and the termina device of the accessing party access a third page corresponding to a third principal via second heterogeneous access route corresponding to the second heterogeneous access information to obtain information of the third principal to a matter related to a third industrial code server or to obtain the information of the third principal and the third heterogeneous access information.

3. The access method according to claim 2, wherein:

the third principal refers to a further principal other than the second principal;

the third industrial code server corresponding to the third principal has different operators from the second industrial code server;

or, the third principal refers to a respective principal other than the first principal and the second principal; and the third industrial code server corresponding to the third principal has different operators from the first industrial code server and the second industrial code server.

4. The access method according to claim 1, wherein:

one of the following is implemented by the terminal device of the accessing party:

from a page corresponding to any principal, accessing one of a further page corresponding to at least one further principal other than a current principal corresponding to the page corresponding to the any principal via the heterogeneous access route corresponding to the heterogeneous access information:

and, from a page corresponding to any principal, accessing a unified page, via the heterogeneous access route corresponding to the heterogeneous access information, wherein the unified page includes access routes corresponding to a plurality of further principals other than the current principal so as to obtain information corresponding to a plurality of further principals, respectively.

5. The access method according to claim 4, wherein:

the unified page is managed by a unified management server of a core system; and the unified management server of the core system is in communication connection with industrial code servers corresponding to respective principals.

6. The access method according to claim 1, comprising:

one of the following is implemented by the terminal device of the accessing party:

by interacting with any industrial code server, at least one of accessing a page of the principal corresponding to the industrial code server, and obtaining information corresponding to the principal;

and, based on the information corresponding to any principal as obtained, at least one of interacting with a respective industrial code server corresponding to the principal, and accessing the page corresponding to the principal;

and, by accessing the page corresponding to any principal, obtaining the information corresponding to the principal, and interacting with a respective industrial code server corresponding to the principal.

7. The access method according to claim 1, wherein:

each industrial code server is also used to manage globe grid and grant globe grid qualification to eligible partners as confirmed by the industrial code server;

each industrial code server has one or more related matters, and each matter has a corresponding globe grid, and the globe grid represents a right to share an income from the matter.

8. The access method according to claim 7, wherein:

each industrial code server is also used to manage data information of the partners corresponding to the industrial code server;

each industrial code server has one or more related matters, wherein each matter is associated with at least one partner; and each partner has an identity for identification purposes.

9. The access method according to claim 8, wherein:

each matter has at least one associated partner, wherein information of a respective principal corresponding to each matter is under management of one of the associated partners.

10. The access method according to claim 7, wherein:

each page of each principal corresponds to one or more of its coding mediums;

and at least one of the following is implemented by the terminal device of the accessing party by recognizing the coding medium:

accessing the corresponding page of the principal corresponding to the identified coding medium;

obtaining at least one of the information of the corresponding principal and the information of the corresponding principal and the heterogeneous access information;

and, interacting with the industrial code server corresponding to the corresponding principal.

11. The access method according to claim 10, wherein:

the coding medium corresponding to the page of any principal includes the globe grid coding medium, and the globe grid coding medium is an associated form of the globe grid;

and by successfully recognizing any globe grid coding medium, the following information corresponding to the globe grid coding medium is obtained by the terminal device of the accessing party:

digital human being identification information of a partner corresponding to the industrial code server;

a matter corresponding to the industrial code server; and information representative of association between at least one of the partner and the globe grid and digital human being identification information of the partner and the globe grid.

12. The method according to claim 11, comprising:

disseminating the globe grid coding medium at least one of online and offline;

wherein one or more of the following information is further obtained by the terminal device of the accessing party by successfully recognizing the globe grid coding medium:

promotion content, which is related to at least one of the corresponding matter of the industrial code server and a theme specified by the matter;

time information corresponding to the partner;

location information corresponding to the partner;

digital human being identification information corresponding to a disseminator performing the disseminating step;

time information corresponding to the disseminator; and location information corresponding to the disseminator.

13. The access method according to claim 12, wherein:

the disseminator is one of a partner, and an entity other than a partner; and a plurality of stages of disseminators constitute a dissemination chain, wherein the industrial code server manages the dissemination chain corresponding to its related matter.

14. The access method according to claim 10, wherein:

a terminal device configured to one of successfully identify the globe grid coding medium, and interact with one of the industrial code server and a backend server authorized by the industrial code server based on the information obtained from successfully identifying the globe grid coding medium, and obtain data information which corresponds to the globe grid coding medium and is matched with user rights of the terminal device.

15. The access method according to claim 14, wherein:

the terminal device is at least one of: a smart phone, a tablet computer, a personal computer, a wearable device, and a smart home appliance; wherein the wearable devices includes smart eyewear.

16. The access method according to claim 14, wherein:

the globe grid coding medium is generated based on a preset coding rule, which is one of a bare-eye visible diagram and invisible optical lattice diagram, drawn, in a form of one-dimensional code, two-dimensional code, or multi-dimensional code, and is one of static, and changing with light-shadow ray or frequency; and the globe grid coding medium is one of a three-dimensional stereoscopic code whose surface has a three-dimensional stereoscopic structure formed according to a preset coding rule; and at least one of a digitalized optical wave, acoustic wave, a radio wave, and a combined wave of the above, generated in one of a specific rule and a specific frequency variation manner based on a preset coding rule.

17. The access method according to claim 11, comprising:

the terminal device of the accessing party obtaining access information to access a corresponding Code-Chain network by successfully recognizing the globe grid coding medium, wherein the CodeChain network is associated with one of the industrial code server and the corresponding matter of the industrial code server;

wherein when accesses the CodeChain network based on the access information, the industrial code server obtains the digital human being identification information of the partner corresponding to the globe grid coding medium to manage the matter, globe grid, profit distribution, and partner-related data information.

18. The access method according to claim 17, wherein:

when the terminal device of the accessing party accesses the CodeChain network based on the access information, the industrial code server further obtains at least one of the following information:

time information corresponding to the partner;

location information corresponding to the partner;

time information corresponding to an accessing party;

location information corresponding to the accessing party; and digital human being identification information corresponding to the accessing party.

19. The access method according to claim 11, wherein:

determination on whether specified conditions have been met is performed by at least one of the following servers:

the first industrial code server corresponding to the first principal;

a further industrial code server corresponding to at least one further principal;

a unified management server docked to industrial code servers corresponding to respective principals;

and, another third-party server;

and formulation of specified conditions is performed by at least one of the following servers:

the first industrial code server corresponding to the first principal;

the further industrial code server corresponding to at least one further principal;

the unified management server docked to the industrial code servers corresponding to respective principals; and another third-party server.

20. The access method according to claim 19, wherein: whether determining the specified conditions have been met includes at least one of:

determining whether any of the accessing party, the partner, and the disseminator has executed a specified operation; and determining whether at least one of the time information, location information, and digital human being identification information corresponding to any of the accessing party, the partner, and the disseminator meets the specified conditions.

21. The access method according to claim 20, wherein: when determining that the specified conditions related to the accessing party are met, at least one of the following are implemented:

allowing the terminal device of the accessing party to obtain the information corresponding to the first principal;

allowing the terminal device of the accessing party to obtain the heterogeneous access information; and allowing the terminal device of the accessing party to obtain the information corresponding to at least one further principal via the heterogeneous access route.

22. The access method according to claim 20, further comprising at least one of the following steps:

distributing, by the industrial code server, income corresponding to one or more matters to partners;

recording, by the industrial code server, all or a fractional of the income as income distributable to the partners;

distributing the income to the partners when the industrial code server determines that the specified conditions have been met;

adjusting the income distributed to the partners when the industrial code server determines that the specified conditions have been met; and distributing, by the industrial code server, the income among the partners one of evenly and on a pro rata basis based on set weights.

23. The access method according to claim 22, wherein: the industrial code server corresponds to a plurality of classes of partners, and distributes income to class levels one of evenly and on a pro rata basis based on set weights;

wherein the industrial code server distributes the income to partners of the same class one of evenly and on a pro rata basis based on set weights.

24. The access method according to claim 22, wherein: the income of one of the matter corresponding to the industrial code servers is not distributed to designated partners, but invested in at least one another matter corresponding to the industrial code server so as to obtain additional income from the another matter and then distribute the additional income to the designated partners.

25. The access method according to claim 7, wherein: each industrial code server determines a quantity of distributed globe grids with respect to the matter as per territory.

26. The access method according to claim 25, wherein: a plurality of industrial code servers correspond to one core server of a unified code issuance management center; and distribution of globe grid coding mediums of respective industrial code servers is solely controlled and managed by the one core server.

27. The access method according to claim 26, wherein: the globe grid coding mediums of respective industrial code servers serve as sub-versions; and the one core server further distributes a global globe grid coding medium, which corresponds to respective globe grids of the industrial code servers so as to share the income from the matters corresponding to respective industrial code servers.

28. The access method according to claim 27, wherein: transaction transfer of the globe grid coding medium corresponding to the industrial code server is under unified management of a Codechain server of a CodeChain digital asset exchange of the unified code issuance management center, wherein the globe grid coding medium corresponds to a Special Goods_Drawing Right (SGR), which is a unit of measurement for a real right-based smart contract.

29. The access method according to claim 7, wherein: each matter corresponding to the industrial code server includes a promotion page and setup of a mall corresponding to the promotion page; and a partner corresponding to the industrial code server is created by one of purchasing a commodity, becoming an agent, and having a designated identity.

30. A digital human being eyewear, wherein:
the digital human being eyewear captures and recognizes an object to access a first backend which manages information of the object, and provides, to the first backend, first basic information associated with at least one of current location, time, and identification information corresponding to at least one of the digital human being eyewear and its user, wherein the first basic information is used when the first backend requests a second backend to issue a meta code;

wherein the meta code corresponds to the information of the object managed by the first backend, or corresponds to the information of the object managed by the first backend and the first basic information; and the digital human being eyewear captures and identifies the meta code to access the first backend and provides, to the first backend, second basic information associated with the current location, time, and identification information corresponding to one of the digital human being eyewear and its user, wherein the second basic information is used when the first backend requests the second backend to issue a new code;

wherein the new code corresponds to the information of the object managed by the first backend and the second basic information; and wherein one of the meta code and the new code corresponds to the coding medium in the access method according to claim 10; and the second backend corresponds to one of the industrial code server the core management server linked to a plurality of industrial code servers.

31. The digital human being eyewear according to claim 30, wherein:

the first backend transmits the first basic information provided when the digital human being eyewear accesses to the second backend to request for issuing the meta code;

the digital human being eyewear captures and identifies the meta code to access the first backend, and the first backend requests the second backend to issue the new code when determining that the first basic information satisfies a predefined rule; and the second backend correspondingly generates at least one of the meta code and the new code according to the request transmitted from the first backend to issue at least one of the meta code and new code, saves the at least one of the meta code and new code, and transmits at least one of the meta code and new code to the first backend to save.

32. The digital human being eyewear according to claim 30, wherein:

when capturing and identifying the object for the first time, the digital human being eyewear accesses the first backend to provide the first basic information, wherein the basic information is used when the first backend requests the second backend to issue the meta code; and when capturing and identifying the object for the second time, the digital human being eyewear at least one of accesses the first backend to obtain information corresponding to the meta code, and provides the second basic information to be used when the first backend requests the second backend to issue the new code.

33. The digital human being eyewear according to claim 30, wherein:

the second backend supports searching, querying, and analyzing of at least one of the following information:
the information obtained from capturing and identifying the object,
the information managed by the first backend, the first basic information, the second basic information,
the information corresponding to the meta code, and
the information corresponding to the new code.

34. The digital human being eyewear according to claim 30, wherein:

the object includes a human face, an article, a landmark, and a house number including a store sign.

35. The digital human being eyewear according to claim 30, wherein:

a core server of a unified code issuance management center corresponds to a plurality of industrial code servers;

release of the globe grid coding mediums of respective industrial code servers is solely controlled and managed by the core server; and the digital human being eyewear corresponds to a terminal device configured to one of successfully identify the globe grid coding medium, and interact with one of the industrial code server and a backend server authorized by the industrial code server based on the information obtained from successfully identifying the globe grid coding medium, and obtain data information which corresponds to the globe grid coding medium and is matched with user rights of the terminal device.

36. A method of applying the access method according to claim 1, comprising:

obtaining, by an accessing party, information of a commodity corresponding to a first merchant via a mobile terminal and heterogeneous access information;

wherein a promotion code of goods associated with a first merchant is promoted online, and/or offline, or placed on the goods or their packaging for promotional purposes;

wherein the heterogeneous access information corresponds to a heterogeneous access route; and the mobile terminal of the accessing party obtains information of a commodity corresponding to at least one other merchant via the heterogeneous access route; and after the terminal device of the accessing party views or conducts transactions on the information of the other merchant's goods, the first merchant receives the share distributed by the other merchant;

wherein the first merchant corresponds to the first industrial code server;

wherein the at least one other merchant corresponds to at least one further industrial code server, the first industrial code server and the at least one further industrial code server being docked to one unified management server.

37. The method according to claim 36, comprising:

obtaining, by the mobile terminal of the accessing party, an access route for obtaining the information of the commodity corresponding to the first merchant via a dissemination chain including a plurality of stages of disseminators;

wherein any promotion code associated with the goods of the first merchant is propagated after being bound with the identity information of the current disseminator; and the promotion code being a globe grid coding medium.

38. The method according to claim 37, wherein:

each industrial code server corresponds to one or more merchants;

each merchant corresponds to a globe grid; and each globe grid is associated with at least one partner;

when a specified condition is met, the industrial code server one of grants an income to a globe grid partner, and grants an income to a disseminator included in the dissemination chain corresponding to the Globe grid;

wherein determining whether the specified condition is met includes:

determining at least one of whether any accessing party, partner, or disseminator has executed a specified operation; and whether at least one of time information, location information, digital human being identification information corresponding to any accessing party, partner, or disseminator satisfies the specified condition.

* * * * *